(12) United States Patent
Naganawa et al.

(10) Patent No.: US 12,722,127 B2
(45) Date of Patent: Sep. 1, 2026

(54) METHOD OF FORMING A LIQUID-LIQUID MIXING PHASE CHANNEL GROUP, METHOD OF CONTROLLING THE FORMATION AND EXTINGUISHMENT OF A LIQUID-LIQUID MIXING PHASE CHANNEL GROUP, AND MODULE THEREFOR

(71) Applicant: Japan Atomic Energy Agency, Naka-gun (JP)

(72) Inventors: Hirochika Naganawa, Nakagun (JP); Tetsushi Nagano, Nakagun (JP)

(73) Assignee: Japan Atomic Energy Agency, Ibaraki (JP)

( * ) Notice: Subject to any disclaimer, the term of this patent is extended or adjusted under 35 U.S.C. 154(b) by 1235 days.

(21) Appl. No.: 17/220,100

(22) Filed: Apr. 1, 2021

(65) Prior Publication Data

US 2022/0016582 A1 Jan. 20, 2022

(30) Foreign Application Priority Data

Jul. 20, 2020 (JP) ................................ 2020-123843

(51) Int. Cl.
*B01F 23/41* (2022.01)
*B01D 11/04* (2006.01)

(52) U.S. Cl.
CPC .......... *B01F 23/41* (2022.01); *B01D 11/0496* (2013.01); *B01F 23/4105* (2022.01)

(58) Field of Classification Search
CPC ......... B01D 11/04–0496; B01F 33/302; B01F 23/453
See application file for complete search history.

(56) References Cited

U.S. PATENT DOCUMENTS

2011/0016967 A1 1/2011 Tonomura et al.

FOREIGN PATENT DOCUMENTS

JP 2007-222849 A 9/2007
JP 4867000 B2 2/2012
JP 2013204116 A * 10/2013
JP 5376602 B2 12/2013
JP 5564723 B2 8/2014
JP 2016123907 A * 7/2016
JP 2018-192834 A 12/2018
JP 2019-13911 A 1/2019

OTHER PUBLICATIONS

Machine Translation of JP2016-123907A. Jul. 11, 2016. (Year: 2016).*
Machine Translation of JP2013-204116A. Oct. 7, 2013. (Year: 2013).*

* cited by examiner

*Primary Examiner* — Stephen E Rieth
(74) *Attorney, Agent, or Firm* — Crowell & Moring LLP

(57) ABSTRACT

A method of forming a liquid-liquid mixing phase channel group, which has the steps of: ejecting the first liquid as droplets into the phase of the second liquid in a two-liquid phase system in which two immiscible liquids oppose each other at an interface; incorporating the droplets of the first liquid into the phase of the first liquid, accompanied by the second liquid around the first liquid by allowing to collide the jet of the droplets with the interface; and forming a continuously connected microfluidic channel group in which the space between the layered droplets of the first liquid are filled with the second liquid in the liquid-liquid mixing phase that grows from the interface as a starting point.

4 Claims, 62 Drawing Sheets

FIG. 10

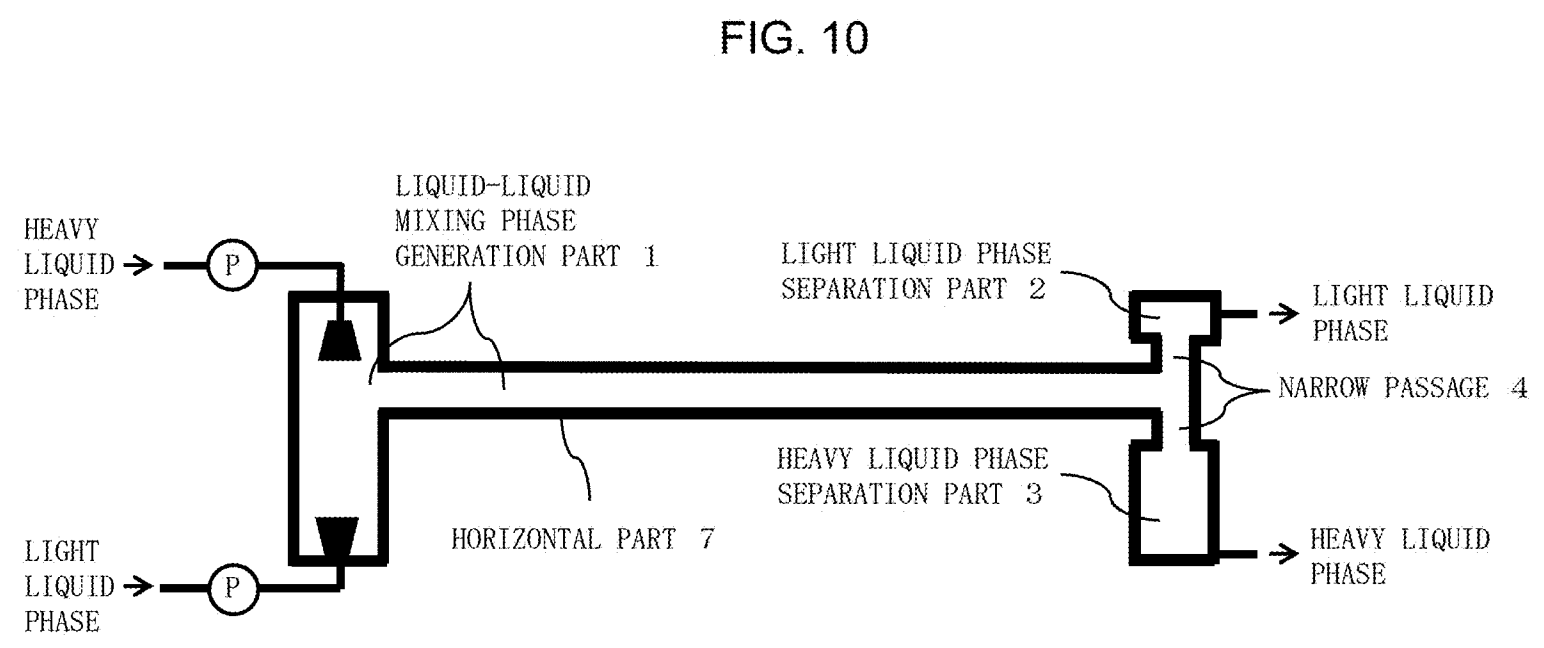

LIGHT LIQUID PHASE
NARROW PASSAGE 4
HEAVY LIQUID PHASE
LIGHT LIQUID PHASE SEPARATION PART 2
HEAVY LIQUID PHASE SEPARATION PART 3
LIQUID-LIQUID MIXING PHASE GENERATION PART 1
HORIZONTAL PART 7
P
P
HEAVY LIQUID PHASE
LIGHT LIQUID PHASE

FIG. 11

LIGHT LIQUID PHASE
HEAVY LIQUID PHASE
4
3
7
2
1
P
P
HEAVY LIQUID PHASE
LIGHT LIQUID PHASE

LIGHT LIQUID PHASE
LIGHT LIQUID PHASE SEPARATION PART 2
HEAVY LIQUID PHASE
P
NARROW PASSAGE 4
CENTRAL PART 5
LIQUID-LIQUID MIXING PHASE GENERATION PART 1
LIGHT LIQUID PHASE
NARROW PASSAGE 4
HEAVY LIQUID PHASE SEPARATION PART 3
HEAVY LIQUID PHASE

LIGHT LIQUID PHASE
HEAVY LIQUID PHASE
LIGHT LIQUID PHASE
HEAVY LIQUID PHASE
1
2
3
4
5

LIGHT LIQUID PHASE
HEAVY LIQUID PHASE
CENTRAL PART 5
P
LIGHT LIQUID PHASE SEPARATION PART 2
NARROW PASSAGE 4
LIQUID-LIQUID MIXING PHASE GENERATION PART 1
LIGHT LIQUID PHASE
NARROW PASSAGE 4
HEAVY LIQUID PHASE SEPARATION PART 3
HEAVY LIQUID PHASE
LIGHT LIQUID PHASE
HEAVY LIQUID PHASE
5
1
4
2
4
3
LIGHT LIQUID PHASE
HEAVY LIQUID PHASE

FIG. 31A

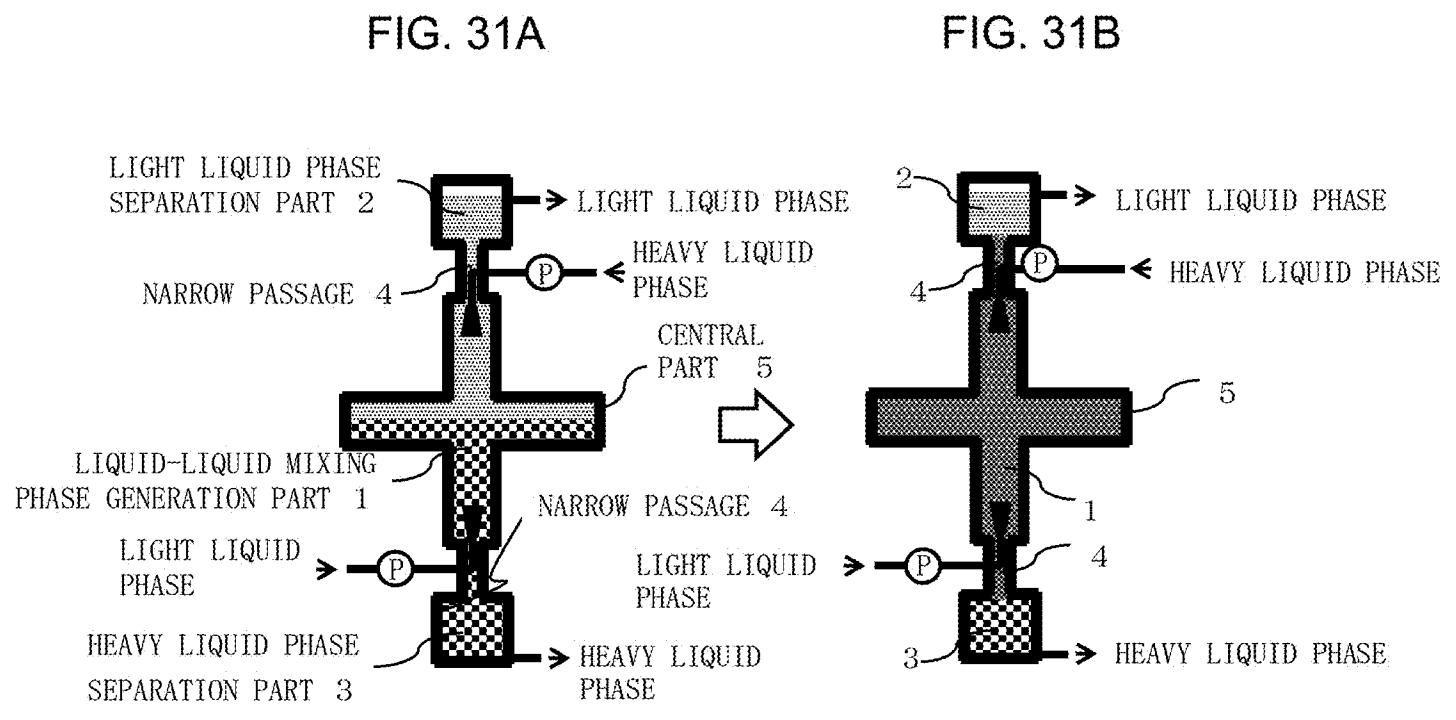

LIGHT LIQUID PHASE SEPARATION PART 2

NARROW PASSAGE 4

LIQUID-LIQUID MIXING PHASE GENERATION PART 1

LIGHT LIQUID PHASE

HEAVY LIQUID PHASE SEPARATION PART 3

LIGHT LIQUID PHASE

HEAVY LIQUID PHASE

CENTRAL PART 5

NARROW PASSAGE 4

LIGHT LIQUID PHASE

HEAVY LIQUID PHASE

LIGHT LIQUID PHASE

HEAVY LIQUID PHASE

5

1

4

LIGHT LIQUID PHASE

HEAVY LIQUID PHASE

P

LIGHT LIQUID PHASE
HEAVY LIQUID PHASE
P
LIGHT LIQUID PHASE SEPARATION PART 2
NARROW PASSAGE 4
CENTRAL PART 5
LIQUID-LIQUID MIXING PHASE GENERATION PART 1
LIGHT LIQUID PHASE
HEAVY LIQUID PHASE SEPARATION PART 3
LIGHT LIQUID PHASE
NARROW PASSAGE 4
HEAVY LIQUID PHASE

LIGHT LIQUID PHASE
HEAVY LIQUID PHASE
2
5
1
4
3
4
HEAVY LIQUID PHASE

FIG. 33A

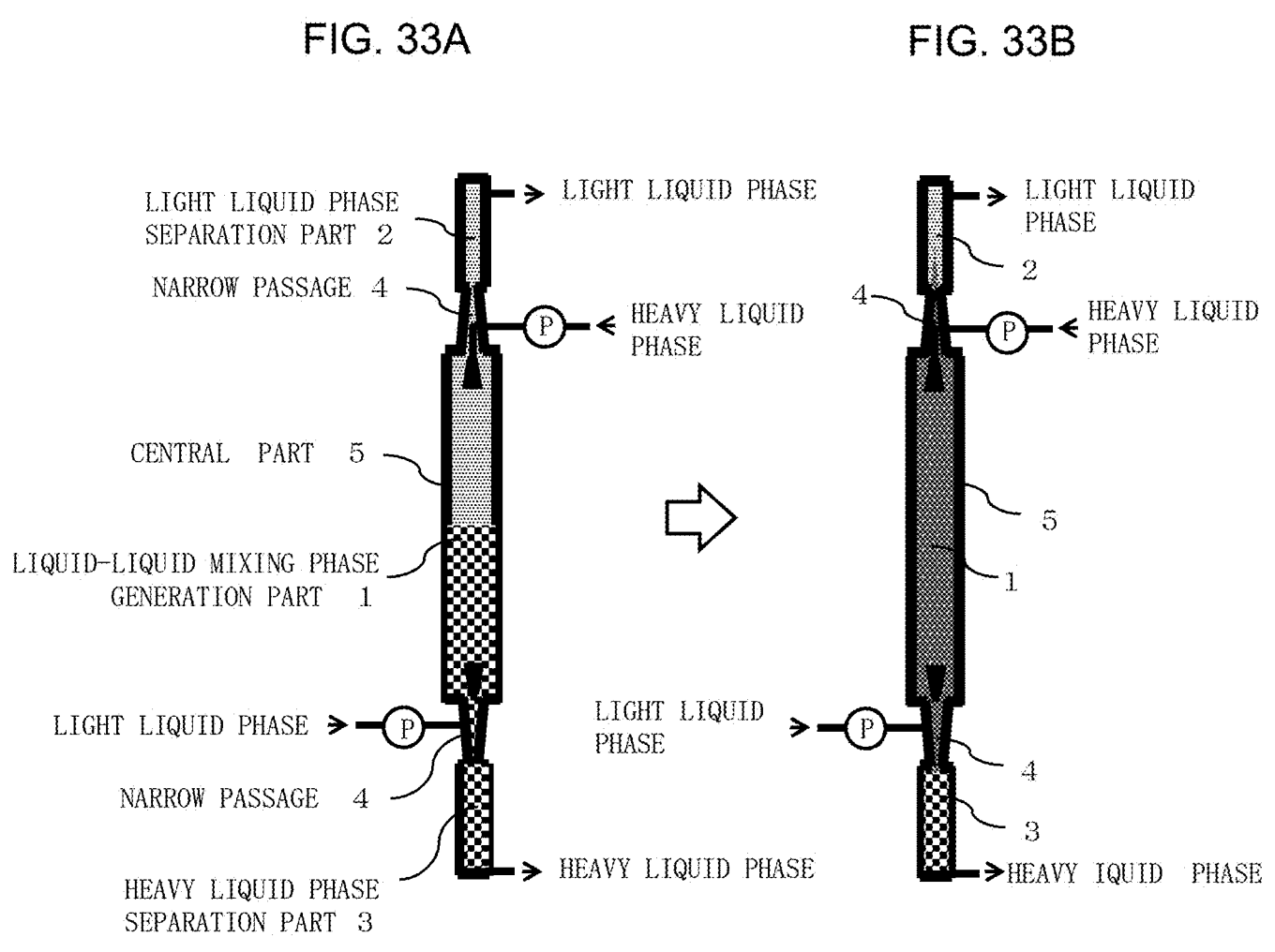

LIGHT LIQUID PHASE SEPARATION PART 2
NARROW PASSAGE 4
CENTRAL PART 5
LIQUID-LIQUID MIXING PHASE GENERATION PART 1
LIGHT LIQUID PHASE
NARROW PASSAGE 4
HEAVY LIQUID PHASE SEPARATION PART 3
LIGHT LIQUID PHASE
HEAVY LIQUID PHASE
P
LIGHT LIQUID PHASE
P
HEAVY LIQUID PHASE

FIG. 33B

LIGHT LIQUID PHASE
2
HEAVY LIQUID PHASE
P
5
1
4
4
3
P
HEAVY IQUID PHASE

FIG. 34A

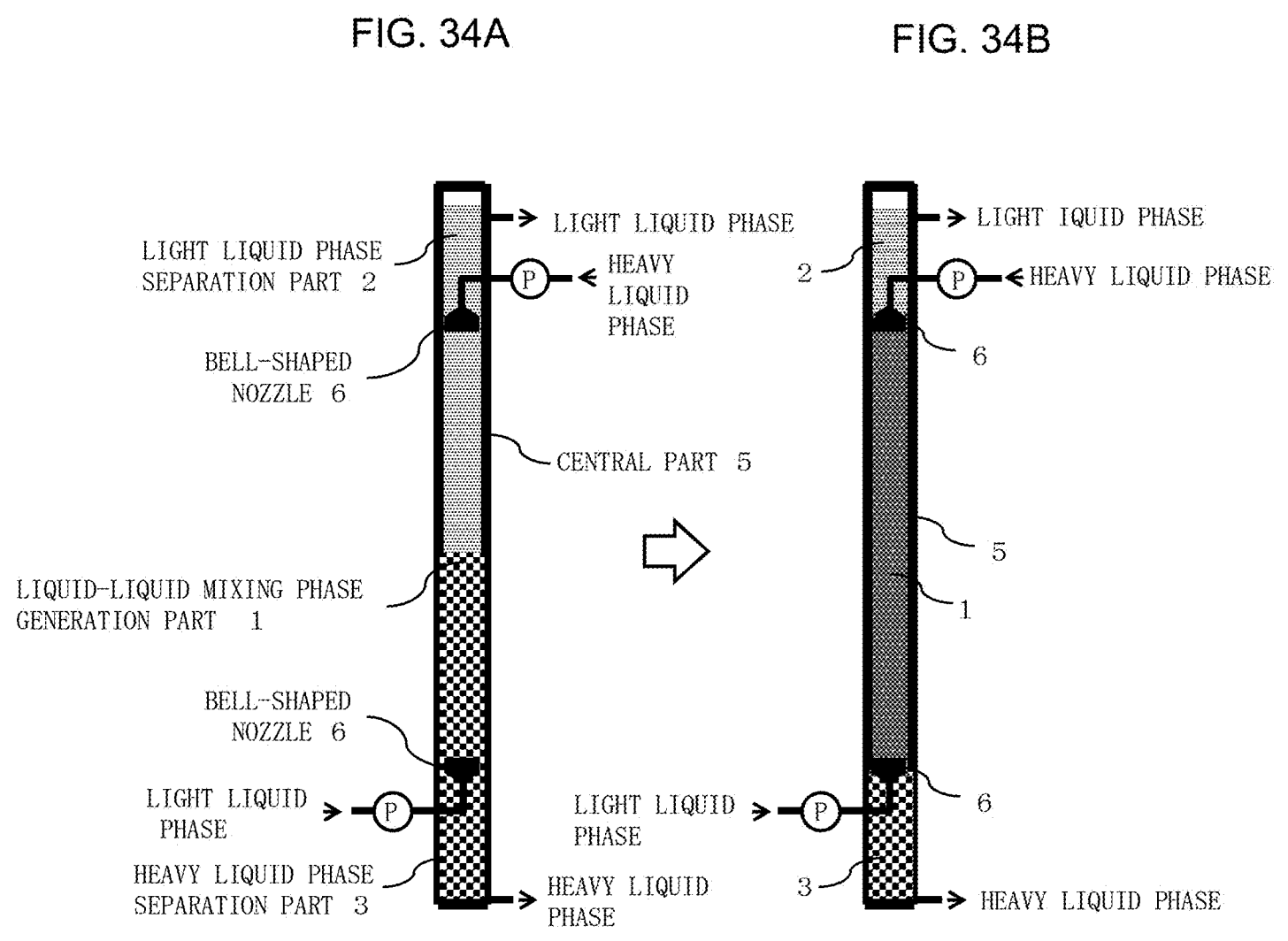

LIGHT LIQUID PHASE
HEAVY LIQUID PHASE
P
CENTRAL PART 5
LIGHT LIQUID PHASE SEPARATION PART 2
BELL-SHAPED NOZZLE 6
LIQUID-LIQUID MIXING PHASE GENERATION PART 1
BELL-SHAPED NOZZLE 6
P
LIGHT LIQUID PHASE
LIGHT LIQUID PHASE
HEAVY LIQUID PHASE
HEAVY LIQUID PHASE SEPARATION PART 3

FIG. 34B

LIGHT IQUID PHASE
HEAVY LIQUID PHASE
P
6
5
1
6
HEAVY LIQUID PHASE
2
P
3
LIGHT LIQUID PHASE

LIGHT LIQUID PHASE SEPARATION PART 2
LIGHT LIQUID PHASE
HEAVY LIQUID PHASE
P
NARROW PASSAGE 4
LIQUID-LIQUID MIXING PHASE GENERATION PART 1
HORIZONTAL PART 7
LIGHT LIQUID PHASE
P
NARROW PASSAGE 4
HEAVY LIQUID PHASE SEPARATION PART 3
HEAVY LIQUID PHASE

2
LIGHT LIQUID PHASE
HEAVY LIQUID PHASE
P
4
1
7
LIGHT LIQUID PHASE
P
4
3
HEAVY LIQUID PHASE

FIG. 39A

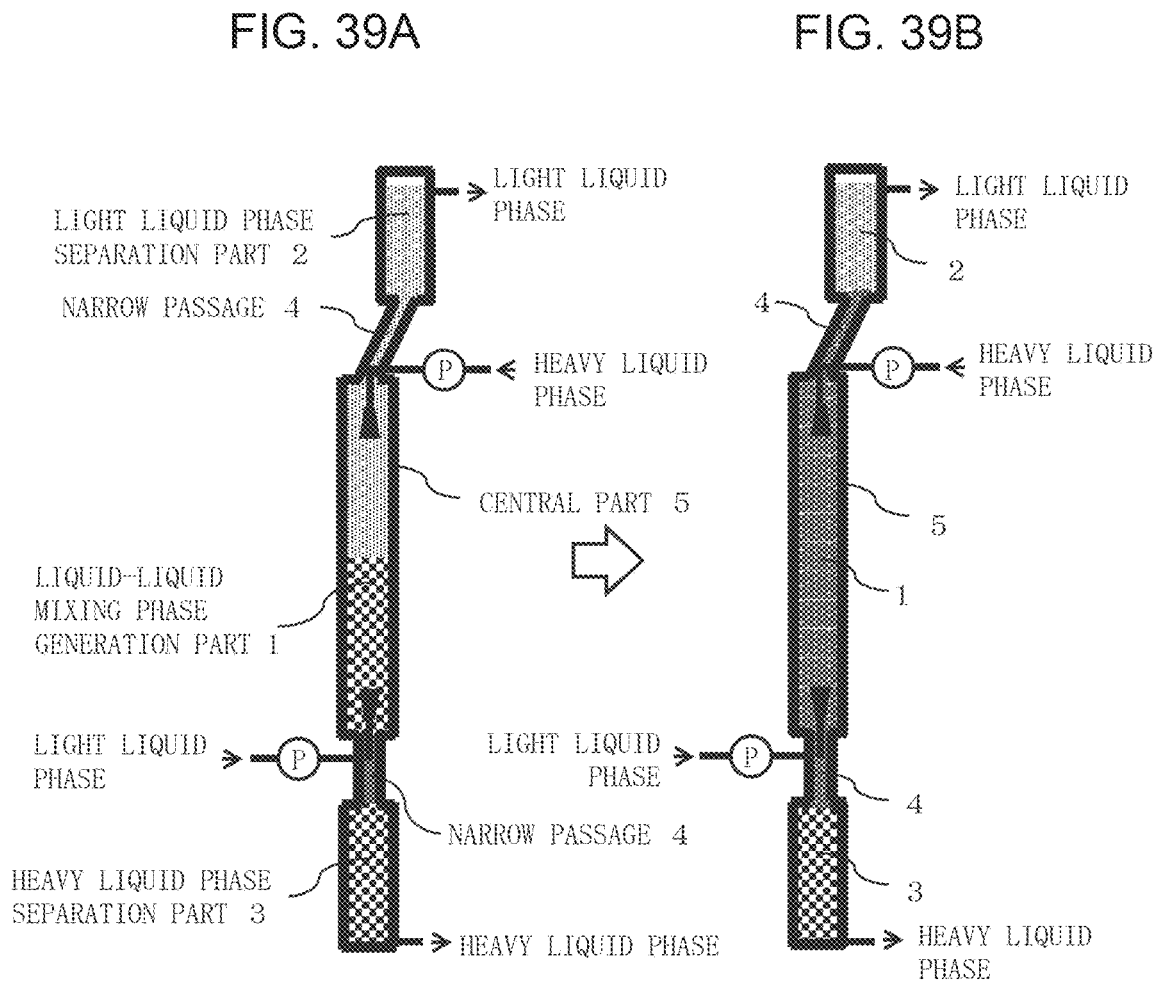

LIGHT LIQUID PHASE
LIGHT LIQUID PHASE SEPARATION PART 2
NARROW PASSAGE 4
HEAVY LIQUID PHASE
P
CENTRAL PART 5
LIQUID-LIQUID MIXING PHASE GENERATION PART 1
LIGHT LIQUID PHASE
P
NARROW PASSAGE 4
HEAVY LIQUID PHASE SEPARATION PART 3
HEAVY LIQUID PHASE

FIG. 39B

LIGHT LIQUID PHASE
2
4
HEAVY LIQUID PHASE
P
5
1
LIGHT LIQUID PHASE
P
4
3
HEAVY LIQUID PHASE

LIQUID-LIQUID MIXING PHASE GENERATION PART 1
LIGHT LIQUID PHASE SEPARATION PART 2
HEAVY LIQUID PHASE
P
LIGHT LIQUID PHASE
BELL-SHAPED NOZZLE 6
LIGHT LIQUID PHASE
LIGHT LIQUID PHASE
BELL-SHAPED NOZZLE 6
HORIZONTAL PART 7
HEAVY LIQUID PHASE SEPARATION PART 3

HEAVY LIQUID PHASE
2
1
LIGHT LIQUID PHASE
6
6
HEAVY LIQUID PHASE
LIGHT LIQUID PHASE
3
7

HEAVY LIQUID PHASE SEPARATION PART 3
LIQUID-LIQUID MIXING PHASE GENERATION PART 1
HEAVY LIQUID PHASE
LIGHT LIQUID PHASE SEPARATION PART 2
LIGHT LIQUID PHASE
HEAVY LIQUID PHASE
NARROW PASSAGE 4
LIGHT LIQUID PHASE
HORIZONTAL PART 7
NARROW PASSAGE 4

HEAVY LIQUID PHASE
2
LIGHT LIQUID PHASE
1
3
4
HEAVY LIQUID PHASE
4
7
LIGHT LIQUID PHASE

FIG. 46A

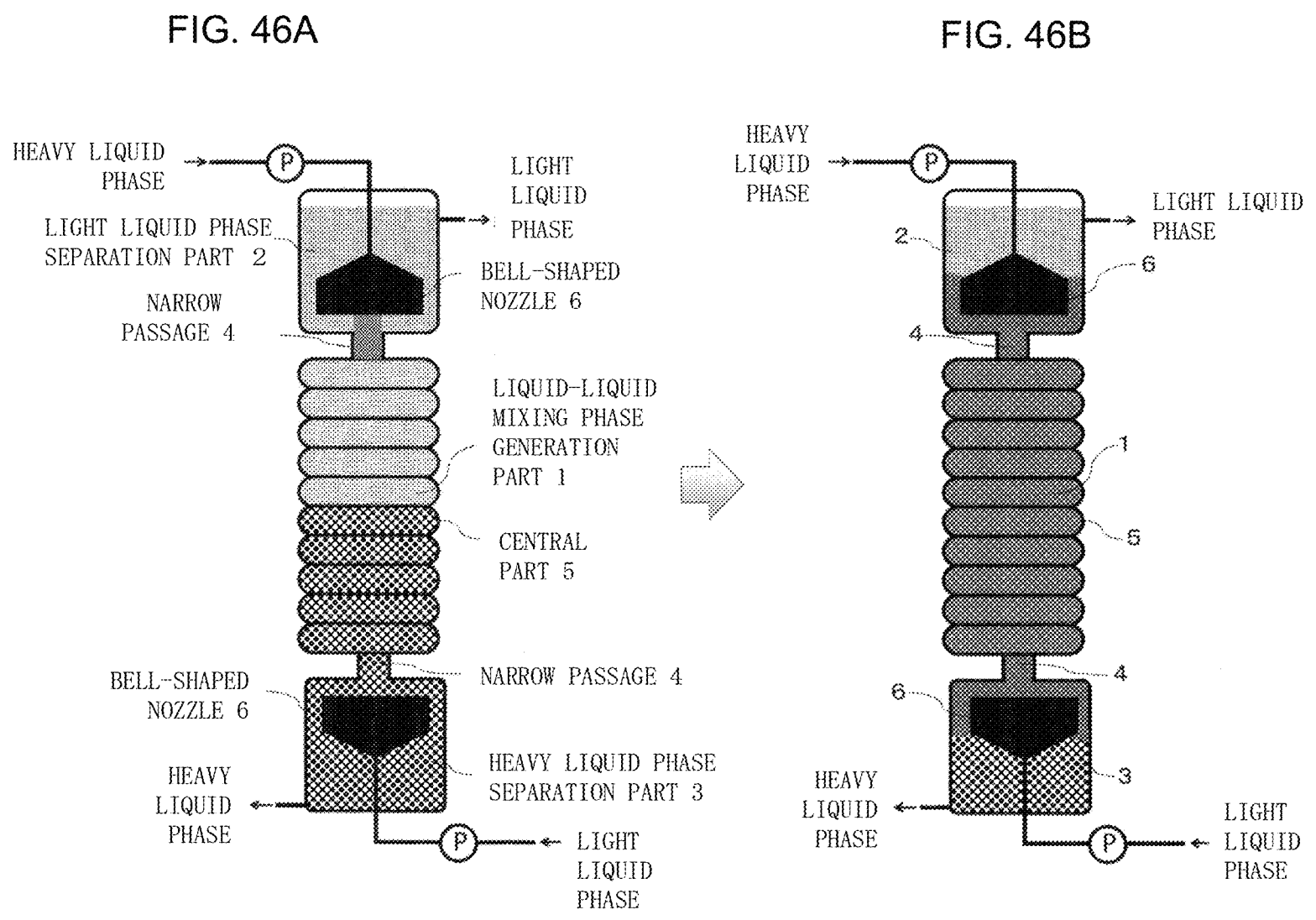

HEAVY LIQUID PHASE
P
LIGHT LIQUID PHASE SEPARATION PART 2
NARROW PASSAGE 4
LIGHT LIQUID PHASE
BELL-SHAPED NOZZLE 6
LIQUID-LIQUID MIXING PHASE GENERATION PART 1
CENTRAL PART 5
NARROW PASSAGE 4
HEAVY LIQUID PHASE SEPARATION PART 3
P
LIGHT LIQUID PHASE
BELL-SHAPED NOZZLE 6
HEAVY LIQUID PHASE

FIG. 46B

HEAVY LIQUID PHASE
P
2
4
LIGHT LIQUID PHASE
6
1
5
4
3
P
LIGHT LIQUID PHASE
6
HEAVY LIQUID PHASE

FIG. 47A

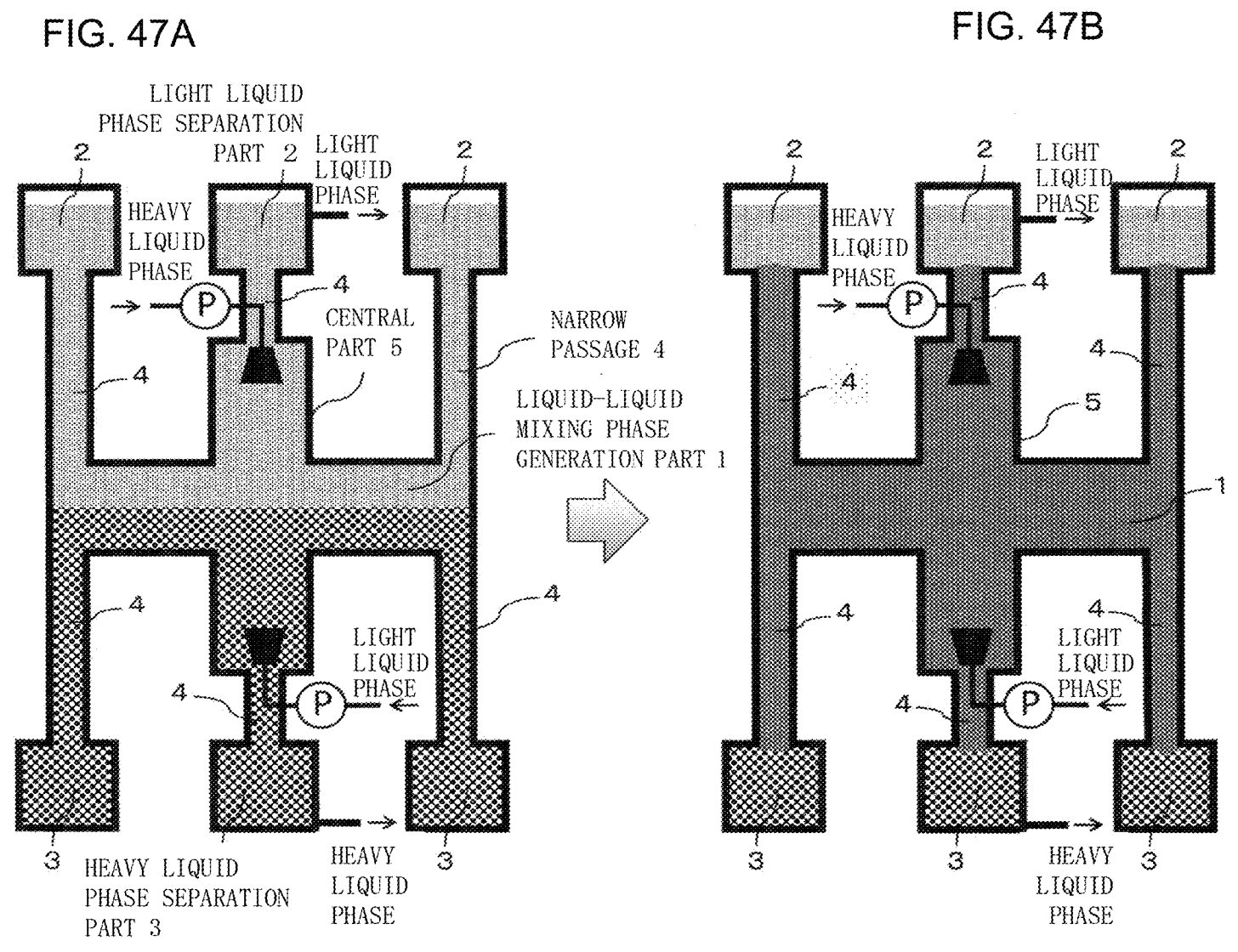

LIGHT LIQUID PHASE SEPARATION PART 2

HEAVY LIQUID PHASE

LIGHT LIQUID PHASE

CENTRAL PART 5

NARROW PASSAGE 4

LIQUID-LIQUID MIXING PHASE GENERATION PART 1

LIGHT LIQUID PHASE

HEAVY LIQUID PHASE

HEAVY LIQUID PHASE SEPARATION PART 3

HEAVY LIQUID PHASE

LIGHT LIQUID PHASE

LIGHT LIQUID PHASE

HEAVY LIQUID PHASE 1 2 2 2 3 3 3 4 4 4 4 4 4 5

FIG. 47C

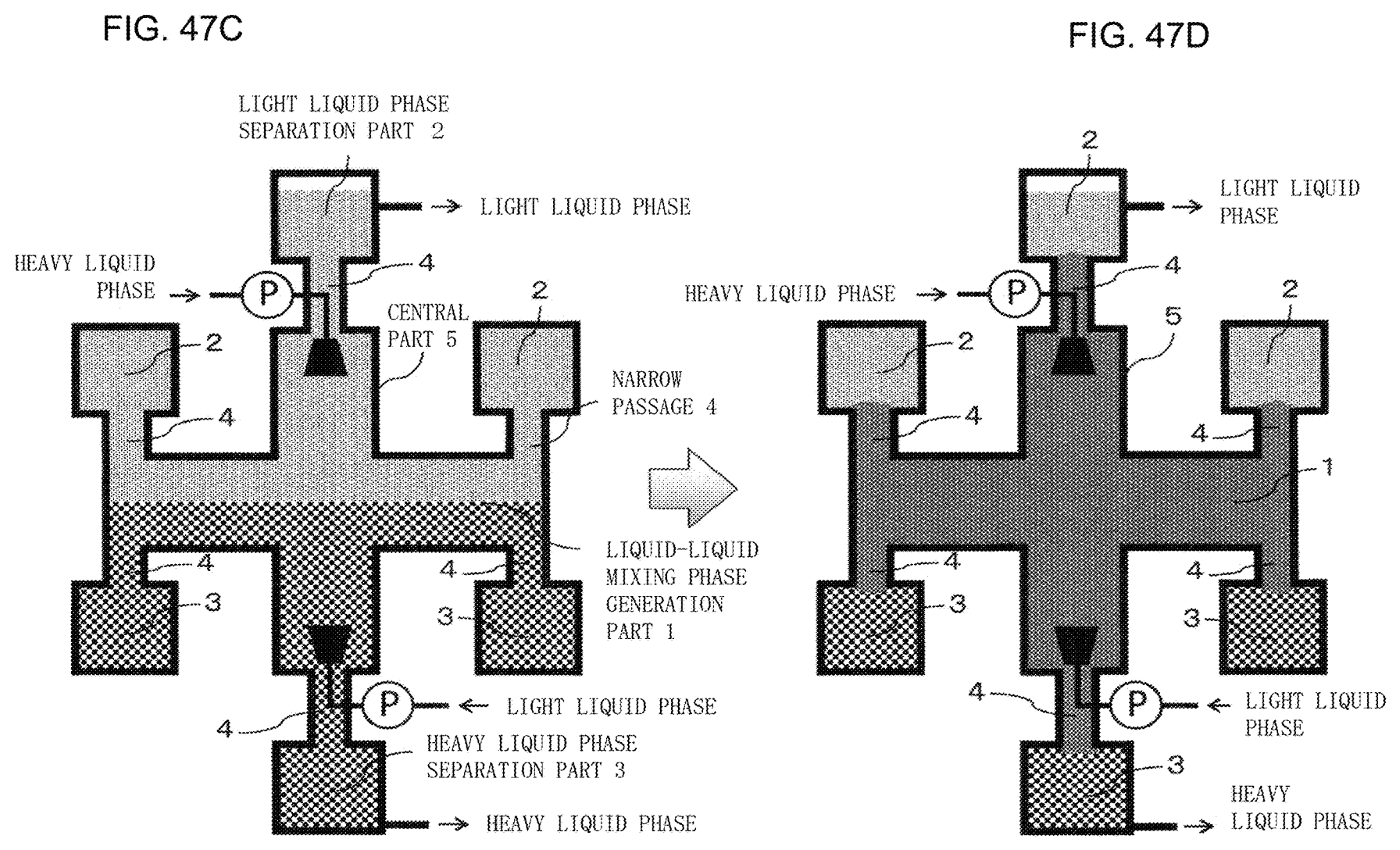

HEAVY LIQUID PHASE
LIGHT LIQUID PHASE SEPARATION PART 2
LIGHT LIQUID PHASE
CENTRAL PART 5
NARROW PASSAGE 4
LIQUID-LIQUID MIXING PHASE GENERATION PART 1
LIGHT LIQUID PHASE
HEAVY LIQUID PHASE SEPARATION PART 3
HEAVY LIQUID PHASE

FIG. 47D

HEAVY LIQUID PHASE
LIGHT LIQUID PHASE
LIGHT LIQUID PHASE
HEAVY LIQUID PHASE

HEAVY LIQUID PHASE
LIGHT LIQUID PHASE
2
1
7
LIGHT LIQUID PHASE
HEAVY LIQUID PHASE
3

HEAVY LIQUID PHASE
LIGHT LIQUID PHASE
2
1
7
LIGHT LIQUID PHASE
HEAVY LIQUID PHASE
3

METHOD OF FORMING A LIQUID-LIQUID MIXING PHASE CHANNEL GROUP, METHOD OF CONTROLLING THE FORMATION AND EXTINGUISHMENT OF A LIQUID-LIQUID MIXING PHASE CHANNEL GROUP, AND MODULE THEREFOR

BACKGROUND OF THE INVENTION

The present invention relates to a microfluidic channel group having a continuously connected three-dimensional network structure, which is formed at an extremely high density (population) in a liquid-liquid mixing phase (the phase in which two liquid phases are mixed) in which minute droplets caused by droplet ejection are densely layered. In the following description, the fluid and flexible microfluidic channel formed between the micro droplets are referred to as "being soft", that is, "a soft microfluidic channel". The soft microfluidic channel can be naturally generated, for example, only by the liquid sending by a general-purpose pump, and can be completely extinguished by a simple change in container shape. Therefore, various chemical reactions can be modularized with an extremely simple mechanism, and their appearance and disappearance can be freely and easily controlled by a continuous flow. Also, unlike conventional "hard" microfluidic channels, which are engraved in resin, metal, etc., soft microfluidic channel are not affected by solid contamination, deposition or gas generation. Therefore, it can be used in all chemical plants as a quickly transformable microfluidic device that can handle complex reaction systems, mass processing, and large-scale and mass production.

A microfluidic device composed of microfluidic channels can be used as a reactor including a large number of reactors for chemical reactions such as synthesis, extraction, absorption, and adsorption in a gas-liquid system, a liquid-liquid system, a solid-liquid system, and the like. Microfluidic devices have a kinetic advantage because they can increase the contact area per unit volume. Further, for reactions that occur sequentially, unstable intermediates can be immediately sent to the next stage in a continuous flow manner, and the heat capacity is small, so rapid heating and cooling are possible. In addition, there is an advantage that precise reaction control is possible without resulting in unevenness during mixing.

In fact, microfluidic devices are extremely effective for analyzing and sensing extremely small amounts of samples and synthesizing small amounts of organics efficiently and quickly, leading to technological innovations as microsystems such as lab-on-a-chip and wearable micro devices. On the other hand, applications to large-scale systems such as chemical plants for mass processing and mass production have not progressed.

Numbering-up, which parallelizes by increasing the number of reactors instead of scaling up, has the advantage of being able to increase the size under the conditions of laboratory equipment. However, when the number of channels is significantly increased at the time of numbering up, the effects of narrowing and blocking of the channels due to the mixing or deposition of solids and the sudden loss of the channel contents due to the generation of gas become remarkable. For example, in order to solve the problem of channel blocking, the channel shape (annular slit, deep groove type channel, etc.) that is less likely to be blocked and the blocking suppression based on rapid mixing by a convection vortex have been proposed. However, these are not a fundamental solution (patent documents 1 to 3).

Therefore, it is necessary to monitor and diagnose the channel narrowing and blocking due to the mixing and deposition of solids, and to suppress and control the loss of the channel contents at once due to the generation of gas. Although technological development for that purpose is underway (patent documents 4 to 6), an increase in cost is inevitable. In addition, practical problems such as the use of an expensive ultra-low pulsation pump because it is high performance and the difficulty of accurate flow control at the branch point also create restriction limit from both technical and cost aspects. These are essential and inevitable problems because the channel is extremely fine.

PRIOR ART DOCUMENTS

Patent Documents

[PATENT DOCUMENT 1] JPA 2018192834
[PATENT DOCUMENT 2] JPB 4867000
[PATENT DOCUMENT 3] JPA 201913911
[PATENT DOCUMENT 4] JPB 5376602
[PATENT DOCUMENT 5] JPB 5564723
[PATENT DOCUMENT 6] JPA 2007222849

BRIEF SUMMARY OF THE INVENTION

Minute channels with micrometer order diameters (1 mm or less) are called microfluidic channel, and are used in various fields such as chemistry, biotechnology, medicine, and environment, because they integrate chemical operations such as mixing, extraction, and separation, enabling faster reactions, smaller devices, and more multifunctional systems. On the other hand, the microfluidic channel has some problems that it is liable to be narrowed or clogged (blocked) by a solid component, and the contents of the channel are pushed out at once by a reaction in which a gas is generated. In particular, when increasing the number of reactors and arranging them in parallel (numbering up) to increase the capacity for the purpose of mass processing, large-scale and mass production, the narrowing and blocking occurs in any of the many channels. When it does occur, the whole thing may stop working.

Therefore, it is necessary to constantly monitor and diagnose narrowing and blocking of the channel, and to suppress and control the occurrence of the gas. In addition, in order to prevent the narrowing and blocking due to adhesion of reaction liquid to the channel and dirt, periodic cleaning is necessary, and the work related to breaking-up, cleaning, and assembly accordingly is inevitable.

In the conventional hard microfluidic channel, in addition to the above-mentioned problem of narrowing and blocking of the channel and loss of contents all at once due to gas generation, there are also problems such as the need for an expensive ultra-low pulsating pump and the difficulty of accurate flow control at the junction. Thus, there are many problems related to both technical and cost aspects.

The present invention relates to a microfluidic channel formed in a liquid-liquid mixing phase (the phase in which two liquid phases are mixed) in which minute droplets caused by droplet ejection are densely layered. They are microfluidic channels engraved in a liquid with fluidity, and in that respect, they are different from the conventional microfluidic channels engraved on a solid (resin, metal, etc.) without fluidity. Since the microfluidic channels in the liquid are fluid and flexible, they are called "soft microfluidic channels", and the microfluidic channels based on a conventional solid are called “hard microfluidic channels” in contrast to the soft microfluidic channels.

A soft microfluidic channel path is the assembly of high-population microfluidic channel (called soft microfluidic channel groups) that form continuously connected three-dimensional network structure formed between densely layered and filled micro droplets. Therefore, unlike the hard microfluidic channel engraved on conventional resins and metals, it can be changed in a fluid and flexible shape, so it is not affected by the mixing and deposition of solids and the generation of gases. Accordingly, a system for monitoring and diagnosing channel blocking and suppressing and controlling the generation of the gas is not required, and work related to the cleaning of the channel (disassembly, cleaning, and assembly) is also unnecessary.

In the numbering-up performed for the purpose of mass processing, large-scale and mass production, the amount of processing and production are increased by simultaneously sending liquid to a large number of reactors arranged in parallel by branching the channel. In a conventional hard microfluidic channel, the difficulty of accurate flow control at this junction becomes a problem, but the network-like soft microfluidic channel group (assembly of soft microfluidic channels) formed between densely layered and filled micro droplets has an ideal branching structure, so to speak, an ideal branching structure by nature. That is, the channel group formed by the accumulation of droplets is a group of dense branch flow routes, which can be developed in three dimensions in all directions.

In this way, the soft microfluidic channel can solve all the problems that the hard microfluidic channel has had for many years while maintaining the features and advantages of the conventional hard microfluidic channel. In particular, problems such as the narrowing and blocking of the channel due to the mixing and deposition of solids which become prominent in numbering up, the loss of contents due to the generation of gas, the difficulty in flow control at the junction, etc., cause a significant increase in costs due to the need to implement monitoring and diagnostic systems. Therefore, it is significant that these problems will be solved.

In addition, soft microfluidic channel is characterized by the fact that it is formed by a simple method using an extremely simple mechanism without the need for microfabrication, and can realize overwhelmingly low cost. That is, it is possible to create a soft microfluidic channel group formed at an extremely high density (population) by forming a three-dimensional network structure at the necessary position by pumping liquid into a container below a simple structure. In addition, since there is no need for channel cleaning, it is close to maintenance-free. In addition, since soft microfluidic channels are formed at extremely high population, the processing capacity with large capacity can be realized.

In addition to its fluidity and flexibility (softness), the soft microfluidic channel is characterized in that the method and mechanism for forming it are extremely simple and the generation and extinguishment of channels are at will. That is, since the soft microfluidic channel occurs naturally by the liquid sent by a general-purpose pump and disappears naturally only by a simple change in the container shape, its generation and extinguishment can be easily controlled by an extremely simple mechanism.

In other words, in the case of a soft microfluidic channel that occurs naturally only with liquid sending liquid, it is not necessary to engrave the channel on the base material. That is, unlike conventional modules subjected to micro-fabrication, the module of the soft microfluidic channel is established only with a nozzle that generated minute droplets and a simple shaped container. Further, after the intended chemical reaction is finished, the microfluidic channel itself can be extinguished, so that the substance after the reaction can be recovered in an instant. For example, the soft microchannel group can be extinguished each time one chemical reaction is completed, and the fluid in the microchannel can be immediately aggregated and collected, and sent to the next soft microfluidic channel group. Such unique properties of soft microfluidic channels, which generate and disappear at will, are very effective in constructing modular devices that combine multiple chemical reactions. The channel length and channel diameter of the soft microfluidic channel depend on the droplet size and the population of the droplet. In addition, droplets having different particle sizes can be accumulated to form a channel. That is, a more complex channel design is also possible by generating and accumulating droplets having different particle sizes.

The above-mentioned feature of the soft microfluidic channel corresponds to the property of the liquid-liquid mixing phase which includes the soft microfluidic channel group of the network-like shape. That is, when a liquid-liquid mixing phase state is reached by the ejecting of minute droplets, a soft microchannel group is formed inside the liquid-liquid mixing phase state. Further, when the state of the liquid-liquid mixing phase is resolved and the phase is divided into two liquid phases, the soft microchannel group also disappears.

When the liquid-liquid mixing phase generated by the droplet ejection passes through the container whose cross-sectional area increases in the vertical direction, the coalescence of droplets due to the deceleration of the linear velocity of the droplets constituting the liquid-liquid mixing phase. As a result, the liquid-liquid mixing phase disappears rapidly and completely separates into a heavy liquid phase (in many cases an aqueous phase) and a light liquid phase (in many cases an oil phase). That is, the generation and extinguishment of a fine liquid-liquid mixing phase leading to the emulsified state can be freely controlled by an extremely simple container structure in which only its cross-sectional area is increased in a vertical direction.

On the other hand, it does not cause the phase separation even if it passes through the container with a reduced cross-sectional area. Conversely, since the line velocity of the droplets increases due to the decrease in cross-sectional area, the coalescence of droplets is suppressed. That is, by guiding the liquid-liquid mixing phase generated by droplet ejection to the container part where the cross-sectional area decreases, and then guiding it to the container part where the cross-sectional area increases, the generation and extinguishment of the liquid-liquid mixing phase can be more sharply and precisely controlled, and the magnitude of the container part for extinguishing the liquid-liquid mixing phase can be reduced, so that the volume of the entire reactor can be greatly reduced.

Further, since the liquid-liquid mixing phase is a fluid, its size and shape can be freely designed. That is, the size and shape of the soft microfluidic channel group are decided by the container that generated the liquid-liquid mixing phase.

The soft microfluidic channel caused by dense lamination of minute droplets can be regarded as a network channel naturally engraved as a path of another liquid phase in the liquid phase forming minute droplets. That is, while the base material of the conventional hard microfluidic channel is a solid phase (solid) such as a resin or metal, the base material of the soft microfluidic channel is a liquid phase (liquid)

which consists of minute droplets. Since, different from the solid phase, many substances can be dissolved in the liquid phase, so in the soft microfluidic channel, the base material can be used as the field for holding, supplying, or recovering the generated substance. This point is also a feature of the soft microfluidic channel that the conventional hard microfluidic channel cannot have.

The fact that the base material for engraving the microfluidic channel can be used as the field for holding, supplying, or recovering the generated substance is an advantage of the soft microfluidic channel, but it can also be a disadvantage in terms of complicating the system. In such a case, a fluorous solvent (inert and low toxic fluorine-based solvent) that hardly dissolves substances other than fluorine-containing compounds (excluding some gases such as oxygen) is effective. That is, the fine droplets (base material) of the fluorous solvent are less likely to be a reaction field for substances other than fluorine-containing compounds.

In addition, fluorous solvents do not damage cells and can provide oxygen efficiently due to the high solubility of oxygen. Therefore, soft microfluidic channels using fluorous solvent as the base material are expected to be used in the bio-field such as cell culture.

As shown above, soft microfluidic channel can solve all of the technical problems when applying microfluidic devices to large systems such as chemical plants, while at the same time achieving overwhelmingly low cost and maintenance free.

More specifically, the method of forming a liquid-liquid mixing phase channel group according to the present invention comprises the steps of: ejecting the first liquid as droplets into the phase of the second liquid in a two-liquid phase system in which two immiscible liquids oppose each other at an interface, incorporating the droplets of the first liquid into the phase of the first liquid, accompanied by the second liquid around the first liquid by allowing to collide the jet of the droplets with the interface, and forming a continuously connected microfluidic channel group in which the space between the layered droplets of the first liquid are filled with the second liquid in the liquid-liquid mixing phase that grows from the interface as a starting point.

Further, the best mode of the method of controlling the formation and extinguishment of a liquid-liquid mixing phase channel group according to another aspect of the present invention includes the steps of: guiding the liquid-liquid mixing phase in which said liquid-liquid mixing phase channel group is formed to the narrow passage, which is arranged or formed vertically so as to move in the vertical direction at the point where the liquid-liquid mixing phase extends ahead, and extinguishing said channel group by further guiding said liquid-liquid mixing phase to the part where the cross-sectional area is increased than the narrow passage. Where, the liquid-liquid mixing phase is formed by using the method of forming a liquid-liquid mixing phase channel group comprising the steps of ejecting the first liquid as droplets into the phase of the second liquid in a two-liquid phase system in which two immiscible liquids oppose each other at an interface; incorporating the droplets of the first liquid into the phase of the first liquid, accompanied by the second liquid around the first liquid by allowing to collide the jet of the droplets with the interface; and forming a continuously connected microfluidic channel group in which the space between the layered droplets of the first liquid are filled with the second liquid in the liquid-liquid mixing phase that grows from the interface as a starting point.

The best mode of the module for performing the above-mentioned method according to a further aspect of the present invention includes a narrow passage having a smaller cross-sectional area than the other passages and a cross-sectional area expansion part larger than the narrow passage, wherein the liquid-liquid mixing phase in which a liquid-liquid mixing phase channel group is formed is guided to the narrow passage, which is arranged or formed vertically so as to move in the vertical direction at the point where the liquid-liquid mixing phase extends ahead, and said channel group is extinguished by further guiding the liquid-liquid mixing phase to the cross-sectional area expansion part. Where, the liquid-liquid mixing phase is formed by using the method of forming a liquid-liquid mixing phase channel group comprising the steps of ejecting the first liquid as droplets into the phase of the second liquid in a two-liquid phase system in which two immiscible liquids oppose each other at an interface; incorporating the droplets of the first liquid into the phase of the first liquid, accompanied by the second liquid around the first liquid by allowing to collide the jet of the droplets with the interface; and forming a continuously connected microfluidic channel group in which the space between the layered droplets of the first liquid are filled with the second liquid in the liquid-liquid mixing phase that grows from the interface as a starting point.

Due to the fluidity and flexibility of the liquid, the soft microfluidic channel of the present invention does not cause narrowing and blocking of the channel due to solids, and loss of contents due to the generation of gases, which are the problems in the conventional hard microfluidic channel (the channel engraved into resin or metal). In addition, since it has an ideal branch structure (a continuously connected three-dimensional network structure), there is no problem in numbering up the hard microfluidic channel, such as the difficulty of flow control at the junction. In other words, it is available to solve all technical issues when applying microfluidic channel devices to large-scale systems such as chemical plants.

At the same time, soft micro flow channels are overwhelmingly low cost and maintenance-free. That is, the soft microfluidic channel generates naturally by the liquid transfer by a general-purpose pump, and naturally disappears naturally only by a simple change in the shape of the container. It has an excellent feature that it can easily control its generation and extinguishment with an extremely simple mechanism. Therefore, it can realize overwhelmingly low cost and does not require channel cleaning for maintenance. In addition, the soft microfluidic channel generated in the liquid-liquid mixing phase is formed at an extremely high population, so that a large processing capacity can be realized.

BRIEF DESCRIPTION OF THE SEVERAL DRAWINGS

FIG. 10 shows the basic mechanism for horizontally guiding the liquid-liquid mixing phase from near the center of the tubular part where the nozzle is installed.

FIG. 11 shows the basic mechanism for horizontally guiding the liquid-liquid mixing phase from above the tubular part where the nozzle is installed.

FIGS. 31A and 31B represent a schematic diagram of two liquid phase installation and liquid-liquid mixing phase generation in the mechanism shown in FIG. 5.

FIGS. 33A and 33B represent a schematic diagram of two liquid phase installation and liquid-liquid mixing phase generation in the mechanism shown in FIG. 7.

FIGS. 34A and 34B represent a schematic diagram of two liquid phase installation and liquid-liquid mixing phase generation in the mechanism shown in FIG. 8.

FIGS. 39A and 39B represent a schematic diagram of two liquid phase installation and liquid-liquid mixing phase generation in the mechanism shown in FIG. 14A.

FIGS. 46A and 46B represent a schematic diagram of two liquid phase installation and liquid-liquid mixing phase generation in the mechanism shown in FIG. 22.

FIGS. 47A and 47B represent a schematic diagram of two liquid phase installation and liquid-liquid mixing phase generation in the mechanism shown in FIG. 23A.

FIGS. 47C and 47D represent a schematic diagram of two liquid phase installation and liquid-liquid mixing phase generation in the mechanism shown in FIG. 23B.

BEST MODE FOR CARRYING OUT THE INVENTION

Figure 1:
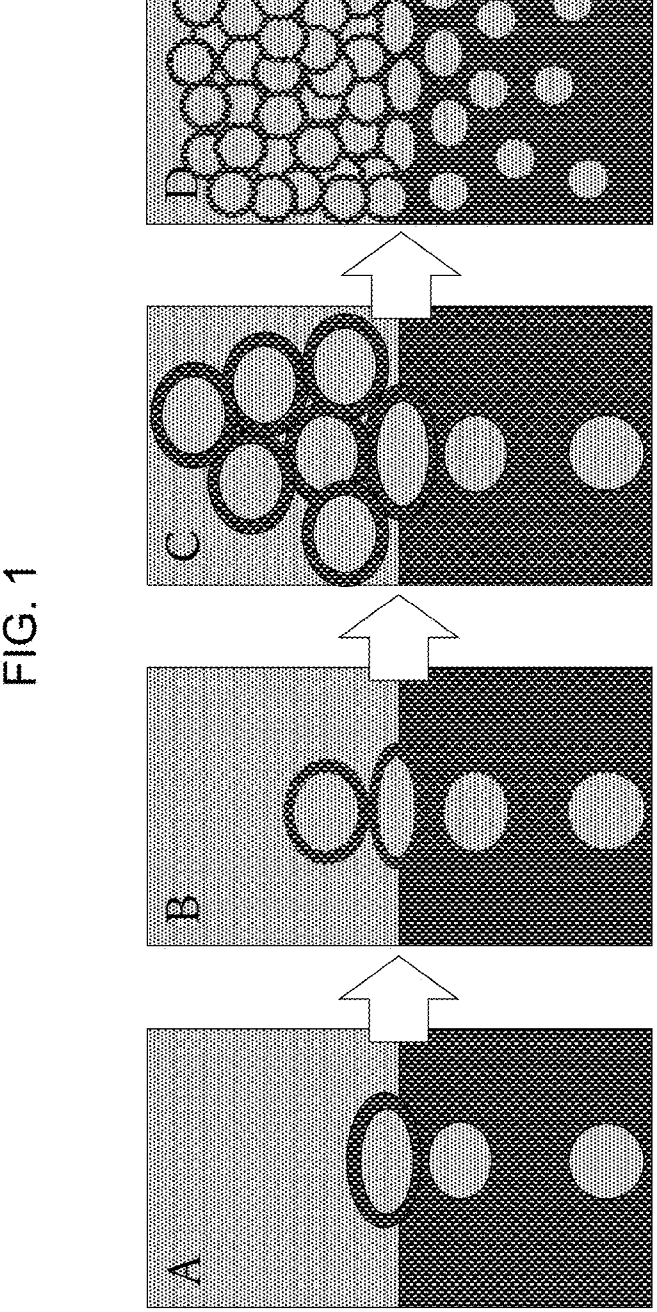
FIG. 1 is a schematic diagram of liquid-liquid mixing phase growth when the first liquid is a light liquid phase and the second liquid is a heavy liquid phase.

The present invention provides a method of forming a liquid-liquid multiphase channel group in a two-liquid phase system in which two immiscible liquids oppose each other at an interface, a method of controlling the formation and extinguishment of a liquid-liquid mixing phase channel group, and a module therefor.

The microfluidic channel with a micrometer-sized diameter can integrate and modularize chemical operations such as mixing, extraction, and separation, enabling faster reactions, smaller devices, and more multifunctional systems. In fact, microfluidic devices using microfluidic channels are extremely effective for analyzing and sensing extremely small amounts of samples and synthesizing small amounts of organics efficiently and quickly, leading to technological innovations as microsystems such as lab-on-a-chip and wearable micro devices.

On the other hand, since the microfluidic channel engraved on conventional resins and metals is likely to cause narrowing and clogging (blocking) due to solid contamination and deposition, there is a problem that the contents of the channel are pushed out at once by the generation of the gas. In particular, when the number of reactors is increased and arranged (numbered up) in parallel to increase capacity for the purpose of mass processing, large-scale and mass production, the narrowing and blocking may occur in any of the many channels or the contents may leak out. As a result, the whole may not function. In addition, it is also a practical problem that accurate flow control at the turning point is difficult. Therefore, the application of microfluidic channel to large systems such as chemical plants has not advanced.

The liquid-liquid mixing phase microfluidic channel of the present invention solves all the problems of the conventional microfluidic channel described above. In addition, the generation and extinguishment of the liquid-liquid mixing phase microfluidic channel can be freely and easily controllable, and furthermore, since the control mechanism of the generation and extinguishment is extremely simple, overwhelmingly low cost and maintenance free can be realized.

In a two-liquid phase system in which two immiscible liquids oppose each other at an interface, the liquid-liquid mixing phase microfluidic channel of the present invention is generated by ejecting the first liquid as droplets into the phase of the second liquid and allowing to collide the jet of the droplets with the interface. More specifically, by this droplet ejection, the droplets of the first liquid are incorporated into the phase of the first liquid, accompanied by the second liquid around it. As a result, a continuously connected microfluidic channel group forming a three-dimensional network structure are generated at high population in the liquid-liquid mixing phase that grows by densely laminating from the interface as a starting point. That is, a continuously connected microfluidic channel group is formed in which the space between the layered droplets of the first liquid are filled with the second liquid.

When the first liquid is a light liquid phase (the liquid phase which has a smaller specific gravity among the two liquid phases), the droplets of the light liquid phase become heavier than the bulk light liquid phase by accompanying the liquid film of the heavy liquid phase around it. Further, when the first liquid is a heavy liquid phase (the liquid phase which has a greater specific gravity among the two liquid phases), the droplets of the heavy liquid phase are lighter than the bulk heavy liquid phase by accompanying the liquid film of the light liquid phase around it. Thus, the decrease in buoyancy or gravity obtained by accompanying the liquid film is the driving force of droplet lamination from the interface.

FIG. 1 schematically shows how the liquid-liquid mixing phase grows from the liquid-liquid interface (the interface between the heavy liquid phase and the light liquid phase) when the first liquid (the liquid ejected as droplets) is a light liquid phase. Thus, a continuously connected high-population channel groups of a three-dimensional network structure is formed as a channel of the second liquid (the heavy liquid phase) around the droplets layered from the liquid-liquid interface to the up direction. Further, when the lamination of the droplets progresses further, a dense droplet layer grows from the original interface position (the interface position when both phases are installed) toward the down direction. That is, the liquid-liquid mixing phase having a high-population channel group develops from the liquid-liquid interface to the up and down directions.

A channel group of the second liquid (the heavy liquid phase) is formed in the liquid-liquid mixing phase developed from the liquid-liquid interface towards the up and down directions. Therefore, for example, when a second liquid (the heavy liquid phase) is introduced from above it by the liquid sending, a flow of the second liquid (the heavy liquid phase) is formed in the formed channel group, and it functions as a microfluidic channel of the second liquid (the heavy liquid phase).

Figure 2:
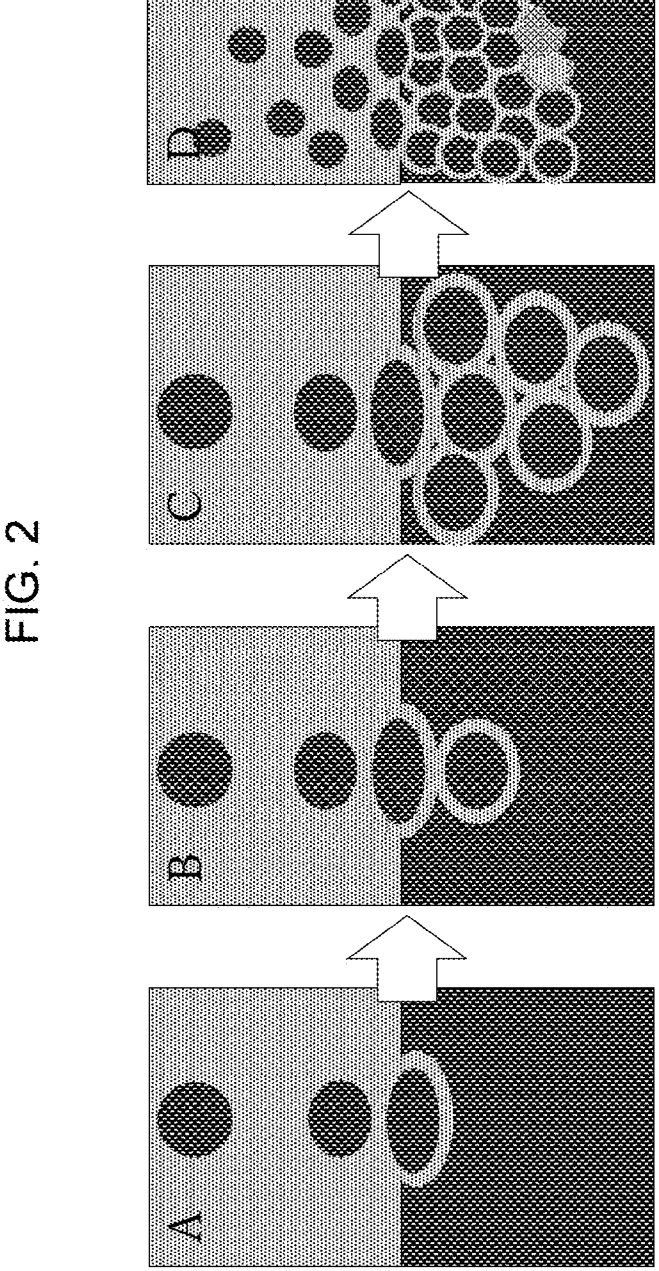
FIG. 2 is a schematic diagram of liquid-liquid mixing phase growth when the first liquid is a heavy liquid phase and the second liquid is a light liquid phase.

FIG. 2 schematically shows how the liquid-liquid mixing phase grows from the liquid-liquid interface when the first liquid (the liquid ejected as droplets) is a heavy liquid phase. Around droplets layered from the liquid-liquid interface to the bottom, a continuously connected high-population channel group of the three-dimensional network structure is formed as a channel of the second liquid (the light liquid phase). Further, as the droplet lamination progresses further, a dense droplet layer grows from the original interface part (the interface part when both phases are installed) toward the up direction. That is, the liquid-liquid mixing phase having a high-population channel group develops from the liquid-liquid interface to the up and down directions.

In the liquid-liquid mixing phase developed from the liquid-liquid interface to the up and down directions, the channel group of the second liquid (the light liquid phase) is formed. Therefore, for example, when the second liquid (the light liquid phase) is introduced from below it by the liquid sending, the flow of the second liquid (the light liquid phase) occurs in the formed channel group, and functions as a microfluidic channel of the second liquid (the light liquid phase).

The size of each droplet described above had a diameter of 0.02 mm to 0.7 mm. Further, the distance between each droplet, that is, the width of the microfluidic channel, was from 2 μm to 200 μm. The discharge of droplets is preferable to carried out by using a nozzle having small tubes or pores, but not limited to. Further, when a nozzle having small tubes or pores is used, the small tubes or pores are preferably in a linear shape having no branches and a constant inner diameter, but not limited to.

Microfluidic channels (called soft microfluidic channels) formed in liquids in this way can be used for microfluidic devices for a wide variety of chemical reactions, such as liquid extraction reactions, catalytic reactions, complex formation reactions, adsorption reactions, ion exchange reactions, organic synthesis reactions, and self-organizing reactions, similar to microfluidic channels (called hard microfluidic channels) engraved into solids such as conventional resins and metals. For example, as one of the features of the microfluidic channel, when compared to mechanical stirring by a stirring blade in the liquid extraction reaction, the specific interface area that is the index of contact efficiency between the aqueous phase and the oil phase is greatly increased.

The soft microfluidic channel can freely control its formation and extinguishment by a simple mechanism. Specifically, by simply changing the cross-sectional area of the part through which the liquid-liquid mixing phase in which the soft microfluidic channel group is formed, the microfluidic channel can be formed at the necessary position, and it can be extinguished in the position where the microfluidic channel does not want to be formed.

That is, by installing the part where the cross-sectional area increases ahead of the direction in which the liquid-liquid mixing phase extends, the liquid-liquid mixing phase is phase-separated, and at the same time, the soft microfluidic channel is disappeared.

When the liquid-liquid mixing phase generated by the droplet ejection passes through the part where the cross-sectional area increases in a vertical direction, the coalescence of droplets proceeds due to the deceleration of the line velocity of the droplets that make up the liquid-liquid mixing phase, quickly and completely disappears, and is separated into the heavy liquid phase and the light liquid phase. That is, the appearance and disappearance of the fine liquid-liquid mixing phase leading to the emulsified state can be freely controlled by an extremely simple container shape that only increases the cross-sectional area in a vertical direction.

On the other hand, the phase separation does not occur even if the cross-sectional area of the part through which the liquid-liquid mixing phase passes is reduced, and conversely, the droplet lamination in the liquid-liquid mixing phase stabilizes, and the formation of the soft microfluidic channel group is promoted. That is, after guiding the liquid-liquid mixing phase to a narrow passage (called a narrow passage), further guiding to the part (called an expansion part) where the cross-sectional area is increased than the narrow passage, the change in the line velocity of the droplet is amplified. Therefore, the generation and extinguishment of soft microfluidic channel can be controlled more efficiently and effectively. When the liquid-liquid mixing phase passes through a narrow passage in which the cross-sectional area is reduced, the line velocity of the droplets in the liquid-liquid mixing phase uniformly increases, so that the coalescence of droplets are suppressed. That is, if the liquid-liquid mixing phase generated by the droplet ejection is led to a narrow passage where the cross-sectional area decreases, and then to the expansion part where the cross-sectional area increases from the narrow passage, the appearance and disappearance of the liquid-liquid mixing phase and thus the soft microfluidic channel group can be controlled more sharply and precisely, and the container volume of the mechanism for extinguishing the liquid-liquid mixing phase can be reduced. In the method of only growing the cross-sectional area of the part where the liquid-liquid mixing phase passes, the volume of the entire reactor inevitably increases because the container volume in its part cannot help being increased.

The liquid-liquid mixing phase generated by the lamination of droplets extends in all directions, such as up, down, forward, back, left and right, and their oblique direction (the direction in which any angle is made from 90 degrees or 180 degrees) according to the shape of the container. But, when the cross-sectional area is increased in the vertical direction at the elongation destination, it separates and disappears. On the other hand, the liquid-liquid mixing phase does not disappear even if the cross-sectional area is reduced in the vertical direction at the destination where the liquid-liquid mixing phase extends.

Further, when the liquid-liquid mixing phase extends horizontally, sufficient phase separation does not occur even if the cross-sectional area is increased in a state of keeping the sideways flow (without turning up and down), and the liquid-liquid mixing phase does not disappear. That is, in order to sufficiently extinguish the liquid-liquid mixing phase, the direction of buoyancy (vertical upward) or gravity (vertically downward) working on the droplets in the liquid-liquid mixing phase and the direction in which the liquid-liquid mixing phase moves must be opposite.

Some examples of a mechanism for controlling the formation and extinguishment of the liquid-liquid multiphase channel group by utilizing such a phenomenon are shown in FIG. 3 to FIG. 23(*c*), but the present invention is not limited to them.

Figure 3:
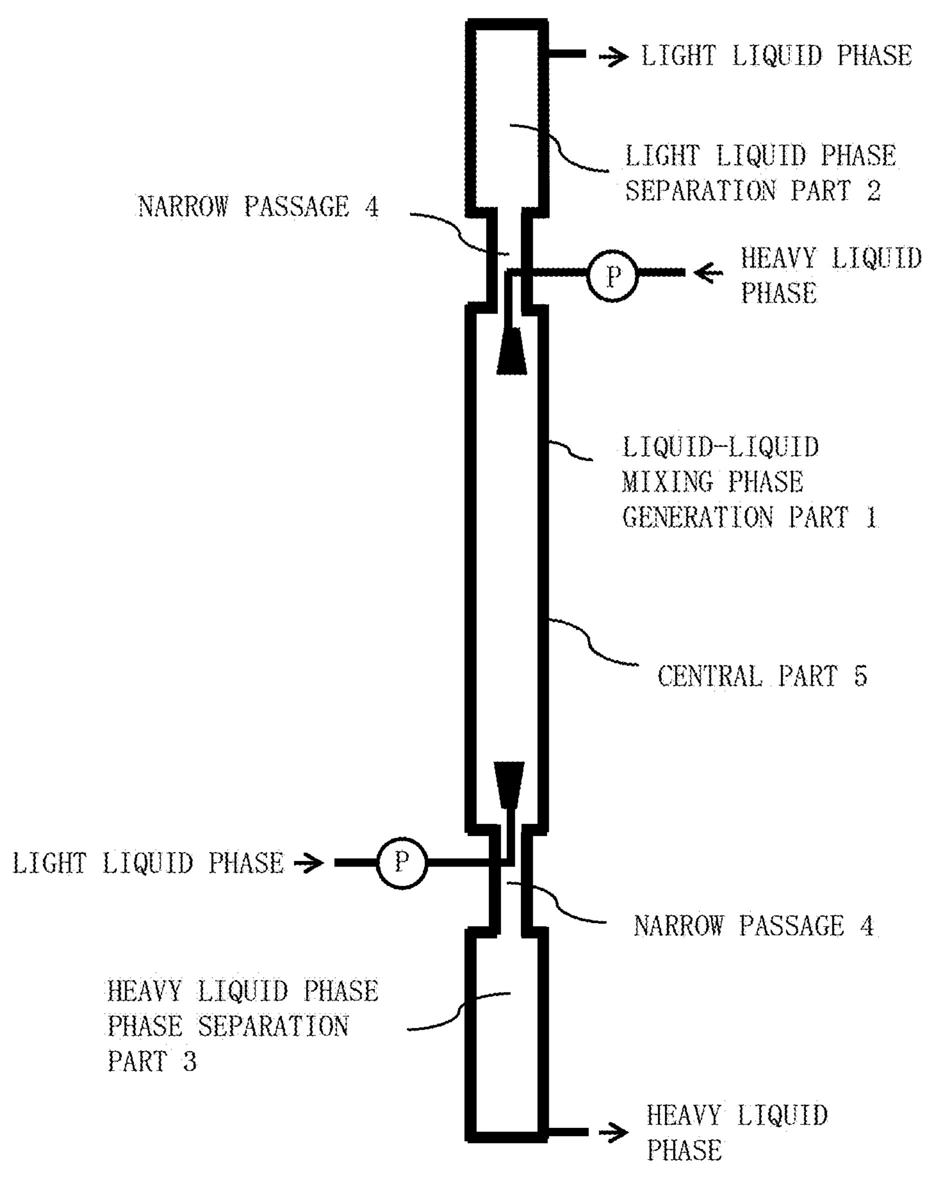
FIG. 3 shows basic mechanism for extinguishing liquid-liquid multiphase at the upper and lower ends.

FIG. 3 shows a basic mechanism (referred to as a basic type) in which droplets are ejected vertically above, below, or both to develop the liquid-liquid mixing phase and extinguish the liquid-liquid mixing phase at the upper and lower ends therein. A narrow passage is arranged vertically for each of the cylindrical parts (referred to as the central part) located in the center, and after that, the expansion part where the cross-sectional area increases again is installed. In addition, there is no limit to the shape of the central part, narrow passage, and expansion part, and for example, any shape such as a cylinder or a square column can be selected.

Further, a heavy liquid phase nozzle is installed above the central part having a constant cross-sectional area, and a light liquid phase nozzle is installed below, and each nozzle is connected to a pump. In addition, the heavy liquid phase separated by disappearing the liquid-liquid mixing phase is discharged from the lower level and the light liquid phase from the up direction.

Further, examples of variations of the mechanism of FIG. 3 are shown in FIG. 4 to FIG. 8 below, but the present invention is not limited to them. In addition, these figures are variations considering only up, down, left and right. In reality, there are variations that consider the front and back in addition to the up, down, left, and right, and also consider these diagonal directions. However, since there is no difference in the principle of generation and extinguishment of the liquid-liquid mixing phase in that the left-right and front-rear directions and these diagonal directions are horizontal, no particular example is given.

Figure 4:
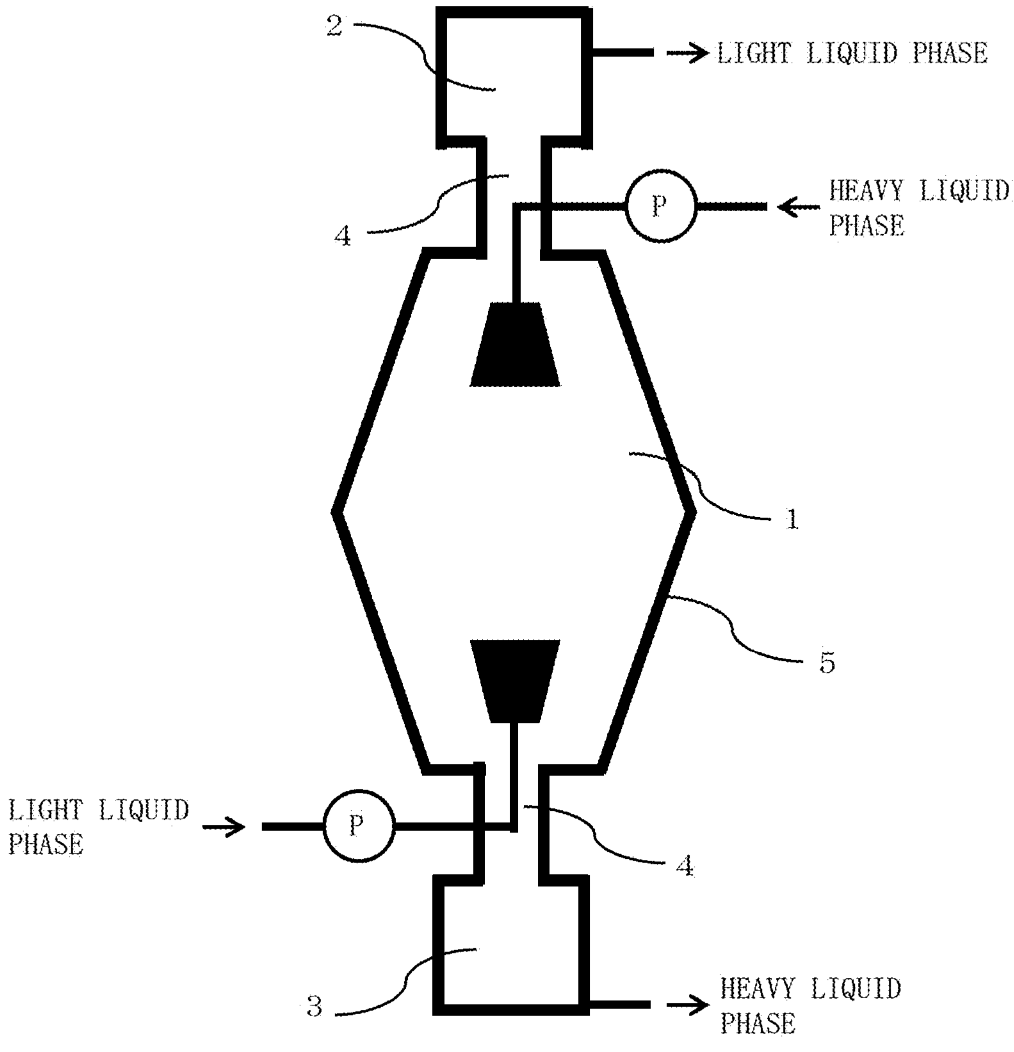
FIG. 4 shows a variation of FIG. 3 (the central part is changed to a hexagonal shape).
Figure 5:
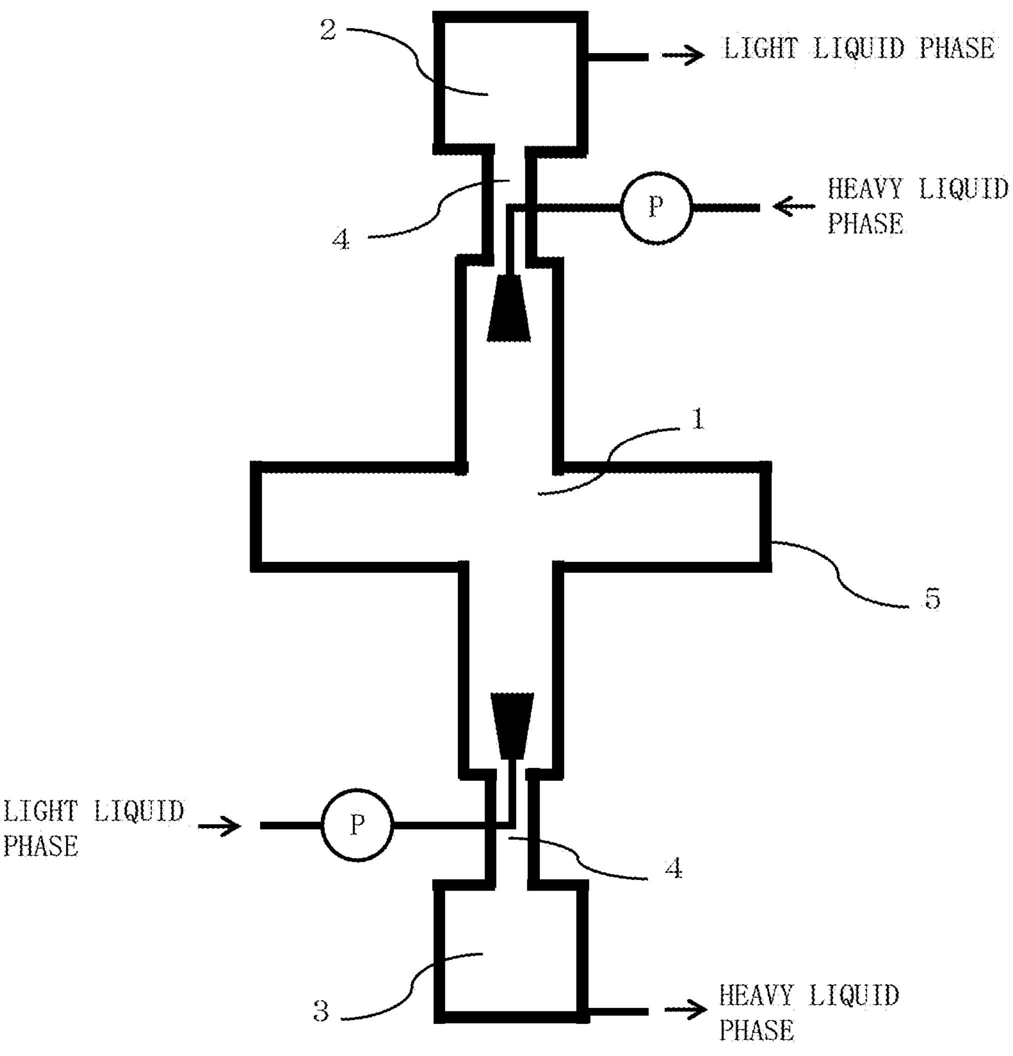
FIG. 5 shows a variation of FIG. 3 (the central part is changed to a cross shape).

FIG. 4 shows a hexagonal shape at the central part, and FIG. 5 shows a cross shape at the central part, and a liquid-liquid mixing phase can be generated according to such a shape. As described above, the liquid-liquid mixing phase is extended in all directions, such as up, down, front, back, left, and right, and diagonal directions (the directions forming an arbitrary angle from 90 degrees or 180 degrees) according to the shape of the container. Regardless of the shape of the central part, the liquid-liquid mixing phase is generated according to the shape.

Figure 6:
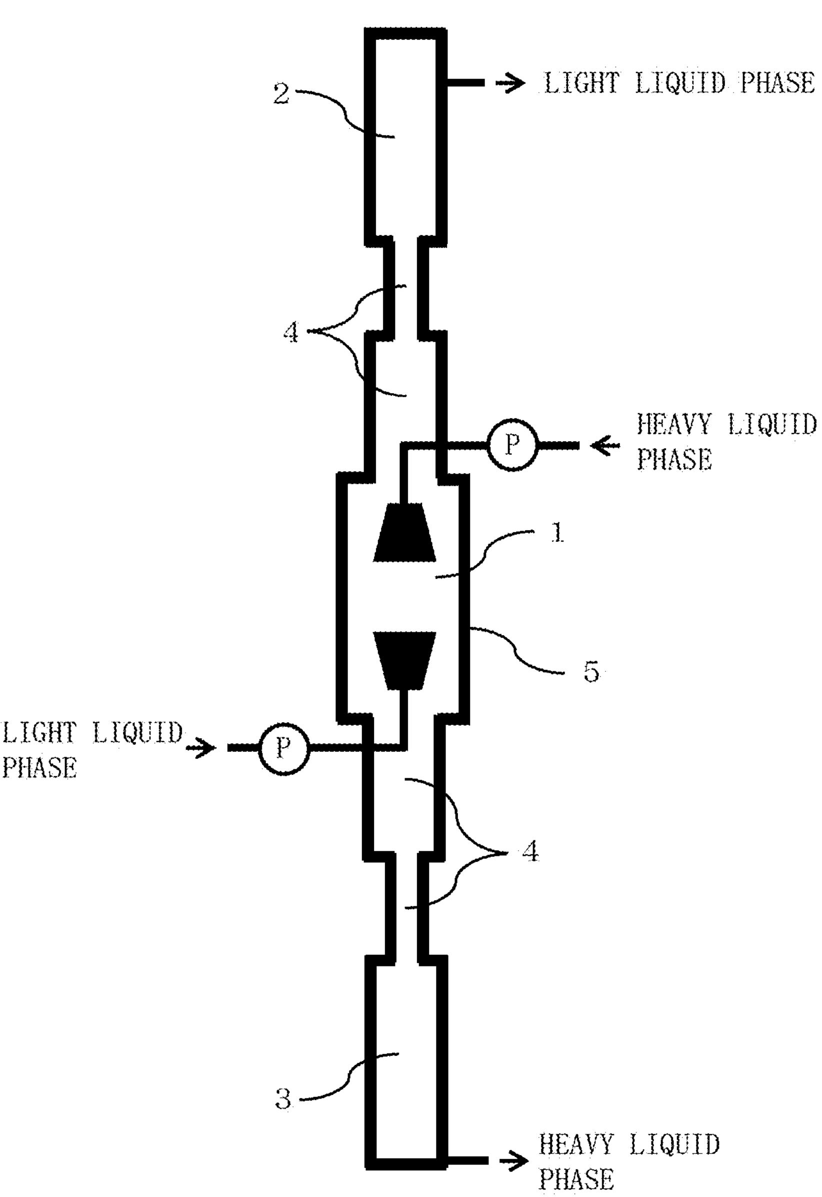
FIG. 6 shows a variation of FIG. 3 (the cross-sectional area of the narrow passage is reduced in two steps).
Figure 7:
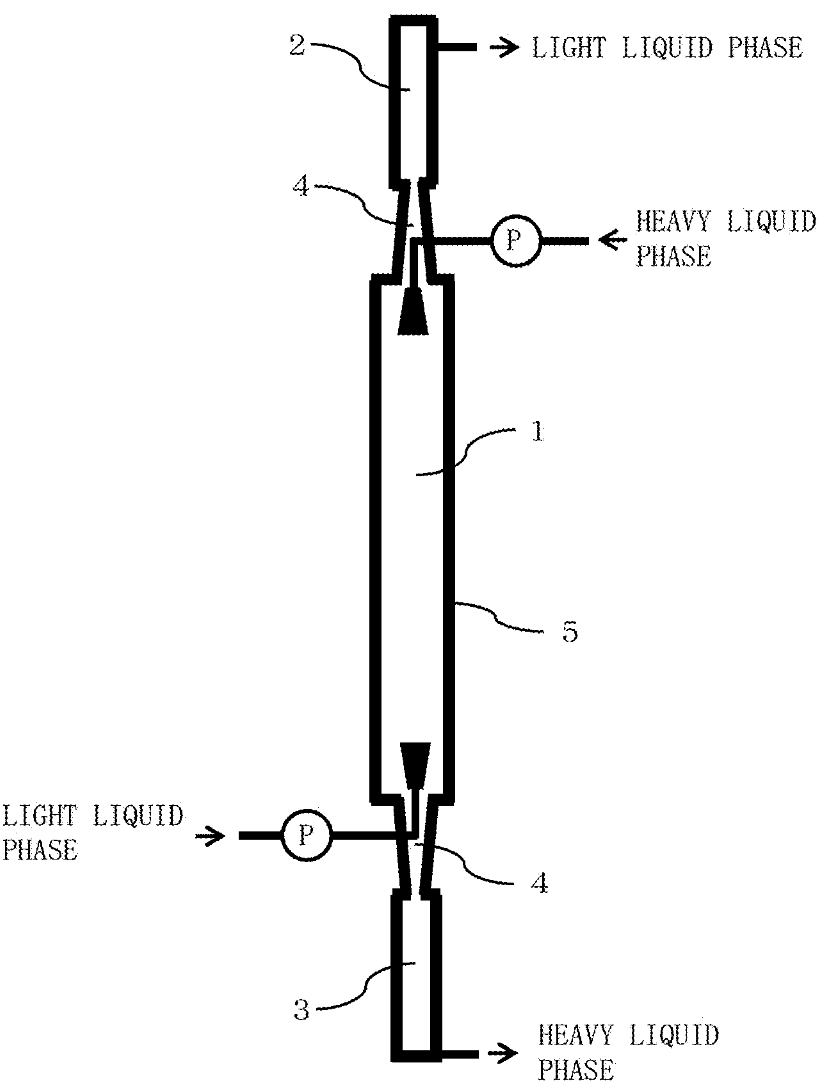
FIG. 7 shows a variation of FIG. 3 (the shape of the narrow passage is changed to a megaphone shape).

The cross-sectional area of the narrow passage can be gradually reduced. As an example, FIG. 6 shows that the cross-sectional area of the narrow passage is reduced in two steps. As compared with FIG. 3 (basic type), the volume ratio of the part where the liquid-liquid mixing phase is extinguished by phase separation (referred to as the phase separation unit) can be made smaller with respect to the part where the liquid-liquid mixing phase is generated (referred to as a liquid-liquid mixing phase generation part). Further, even in the structure as shown in FIG. 7 in which the shape of the narrow passage is shaped like a megaphone in which the cross-sectional area becomes smaller toward the phase separation part, the volume ratio of the phase separation part to the liquid-liquid mixing phase generation part can be made smaller, similar to that in FIG. 6. Further, even in the structure in which the shape of the narrow passage is made into like a megaphone whose the cross-sectional area is reduced toward the phase separation part as shown in FIG. 7, the volume ratio of the phase separation part to the liquid-liquid mixing phase generation part can be reduced as in FIG. 6.

Figure 8:
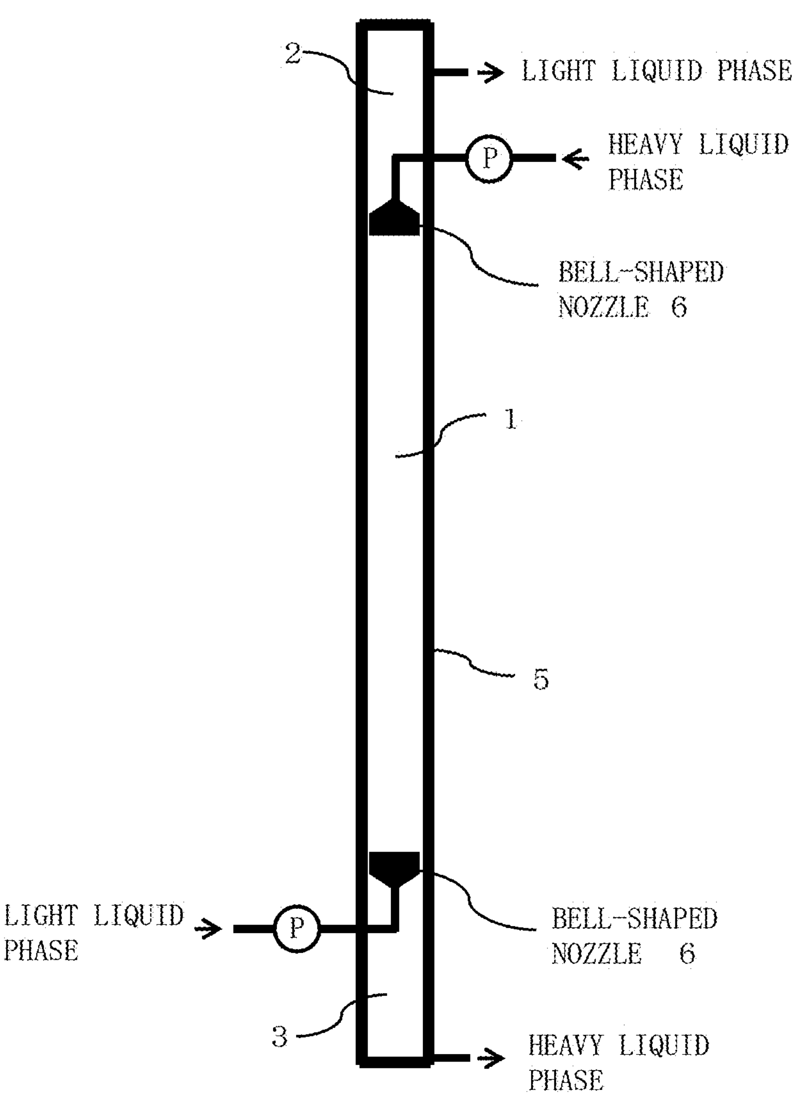
FIG. 8 shows a variation of FIG. 3 (the narrow passage formed by a bell-shaped nozzle).

FIG. 8 shows the simplest shape among the variations of FIG. 3 (basic type), and the container itself is a simple cylinder having a constant cross-sectional area. In the mechanism of FIG. 8, the liquid-liquid mixing phase can be extinguished based on the same principle as in FIG. 3 by utilizing the vertically narrow passage intentionally formed between the bell-shaped nozzle and the vessel wall. The cross section of the above bell-shaped nozzle is not limited to a circle. That is, the shape of the above bell-shaped nozzle is intentionally determined so that a narrow passage may be formed between the container wall surface and its bell-shaped nozzle according to the container shape of the liquid-liquid mixing phase generation part.

Figure 9A:
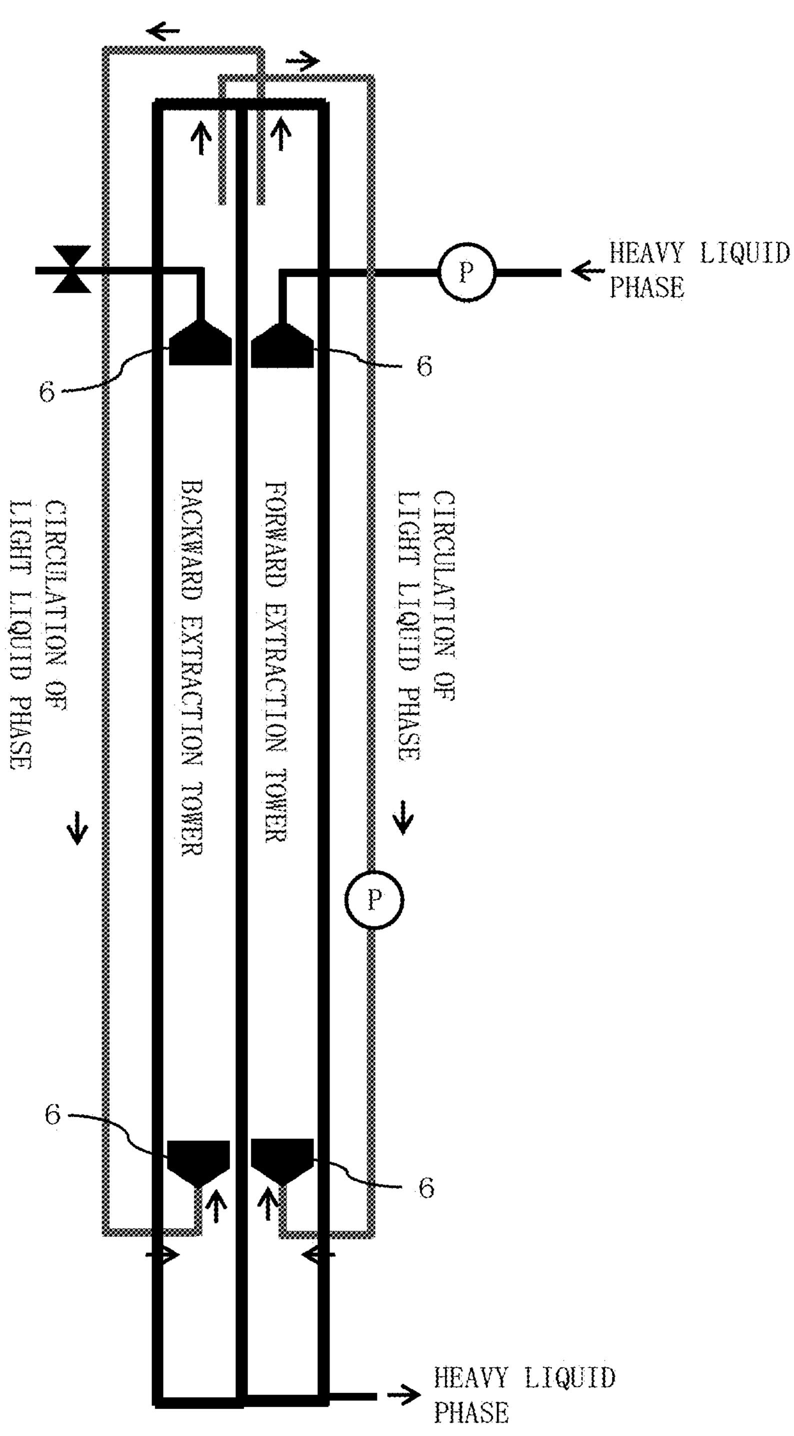
FIG. 9A shows a structure in which two closed containers with the mechanism shown in FIG. 8 are combined.
Figure 9B:
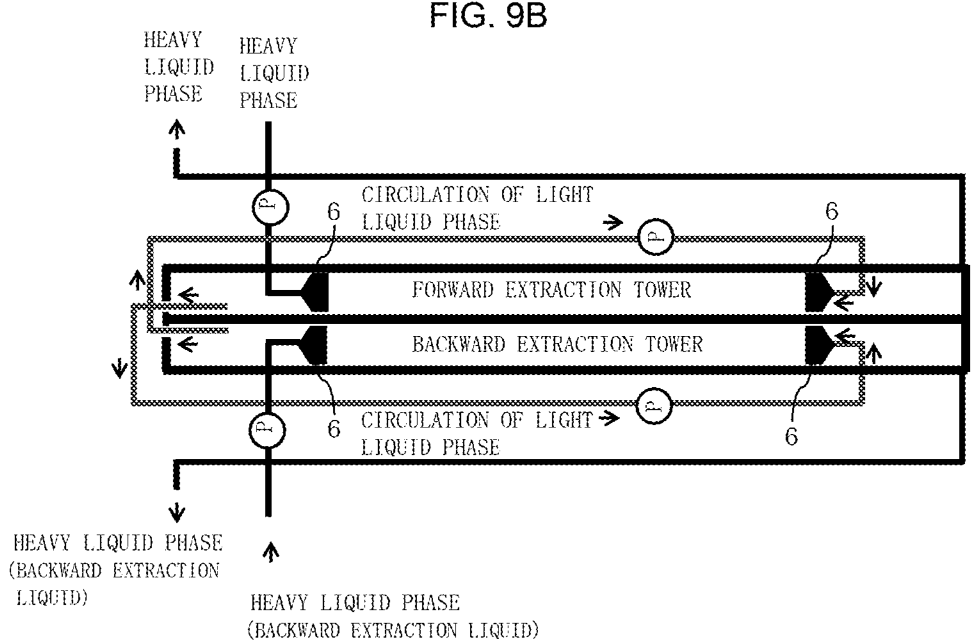
FIG. 9B shows a structure in which two non-sealed containers with the mechanism shown in FIG. 8 are combined.

Because of its simplicity of the shape of FIG. 8, it is easy to make the mechanism that integrates a number of pieces. FIG. 9(*a*) is the structure in which two towers are combined, and can be used, for example, as the mechanism for simultaneously proceeding with forward and backward extraction in liquid-liquid extraction (solvent extraction). FIG. 9(*a*) is the mechanism of a sealed container, and since the introduction and discharge of the heavy liquid phase cannot be simultaneously progressed in the forward extraction tower and the backward extraction tower, when the forward extraction is performed, it is necessary to close the valve for introducing the heavy liquid phase into the backward extraction tower or to keep the heavy liquid phase in a closed circulation state only in the backward extraction tower. That is, if the introduction and discharge of the heavy liquid phase proceed simultaneously in both towers, the pressure balance in the towers is lost and the volume ratio of the two liquid phases cannot be maintained. On the other hand, as shown in FIG. 9(*b*), it is also possible to use the mechanism of a non-sealed container. In this case, the introduction and discharge of the heavy liquid phase can proceed simultaneously in the forward extraction tower and the backward extraction tower, but it is necessary to increase the number of pumps and raise the part of the discharge port of the heavy liquid phase.

Figure 11:
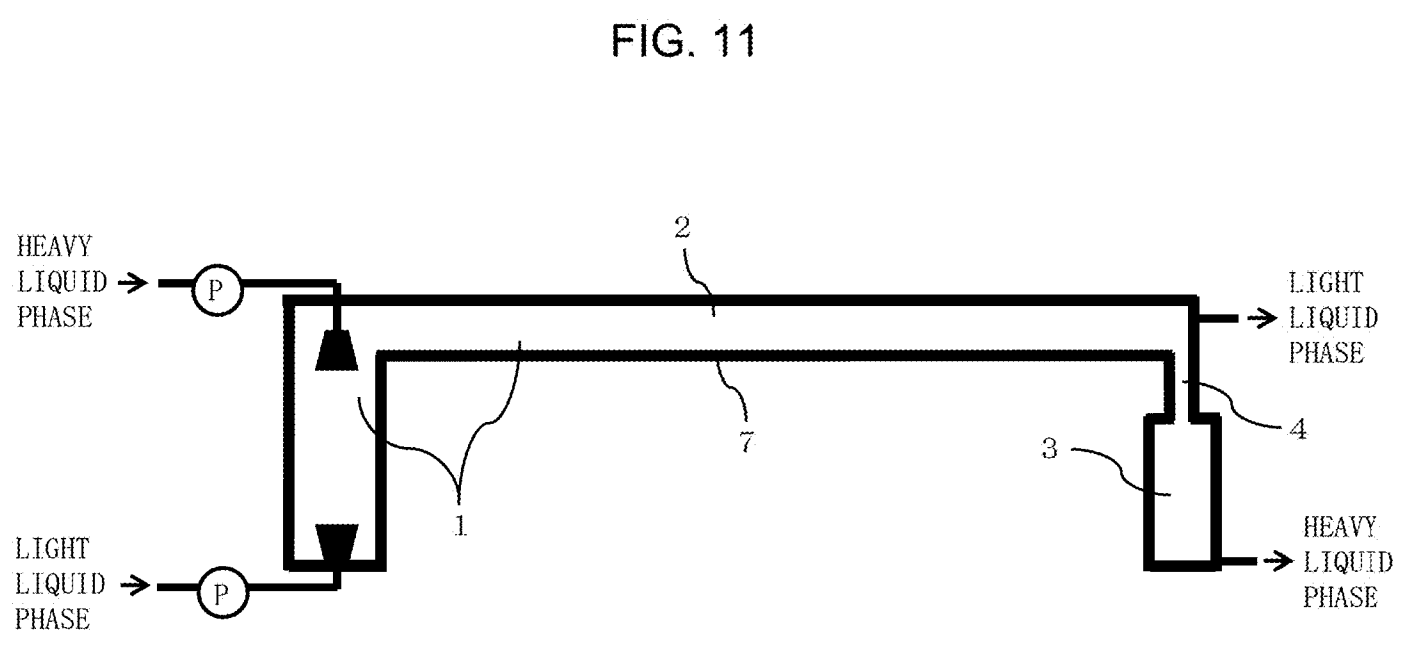
Figure 12:
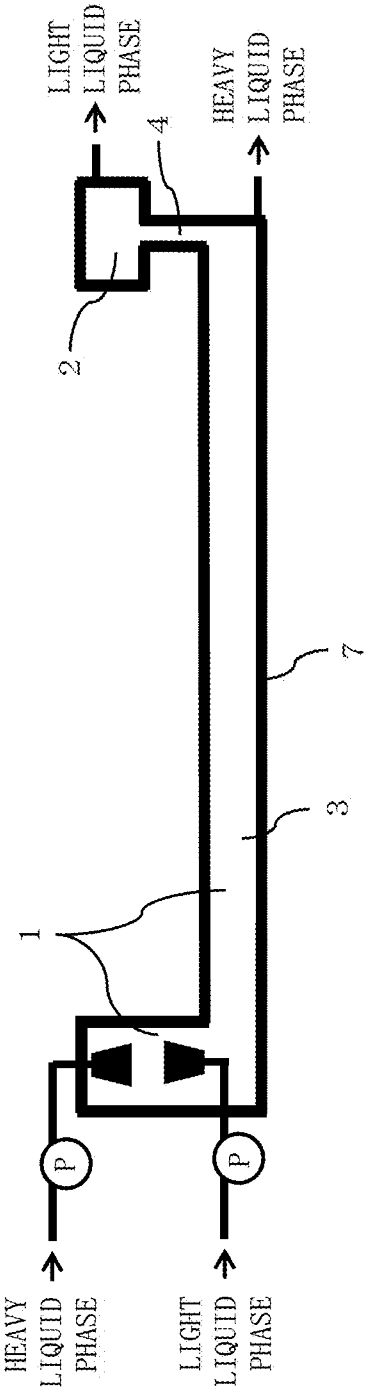
FIG. 12 shows the basic mechanism for horizontally guiding the liquid-liquid mixing phase from below the tubular part where the nozzle is installed.

As described above, the sufficient phase separation does not occur even if the cross-sectional area is increased while the liquid-liquid mixing phase extends in the horizontal direction and the direction of its flow remains horizontal (without changing the direction in the vertical direction). However, it is possible to sufficiently separate the phases (extinguish the liquid-liquid mixing phase) by guiding the liquid-liquid mixing phase to the narrow passage arranged or formed in the vertical direction at the point where the liquid-liquid mixing phase extends in the horizontal direction. FIG. 10 to FIG. 12 show three mechanisms for developing the liquid-liquid mixing phase in the horizontal direction, that is, in one of the front, rear, left, right, and oblique directions in the horizontal plane, and extinguishing the liquid-liquid mixing phase at that end. For these three horizontal mechanisms, variations similar to the vertical mechanism (basic type) shown in FIG. 3 exist for each, but not limited to them. Further, even if the sideways part where the liquid-liquid mixing phase is developed is inclined from the horizontal plane (even if it has a gradient), the mechanism similar to the mechanism shown in FIG. 10 to FIG. 12 can be constructed.

The mechanism for generating the liquid-liquid mixing phase is common in FIG. 10 to FIG. 12, all of which eject droplets vertically above, below, or both to create a liquid-liquid mixing phase. This point is the same as the mechanism shown in FIG. 3 to FIG. 8. FIG. 10 is the mechanism for guiding the flow of the liquid-liquid mixing phase horizontally from the center of the cylindrical part where the nozzles (the heavy liquid phase nozzle and the light liquid phase nozzle) are installed, and extinguishing the liquid-liquid mixing phase in a narrow passage arranged vertically at the end of the flow. Similarly, FIG. 11 is the mechanism in which the flow of the liquid-liquid mixing phase is derived horizontally from the upper side of the cylindrical part where the nozzles are installed, and guides to the narrow passage arranged in a vertical direction. And, FIG. 12 is the mechanism in which the flow of the liquid-liquid mixing phase is derived horizontally from the lower side of the cylindrical part where the nozzles are installed, and guides to the narrow passage arranged in a vertical direction.

Figure 13A:
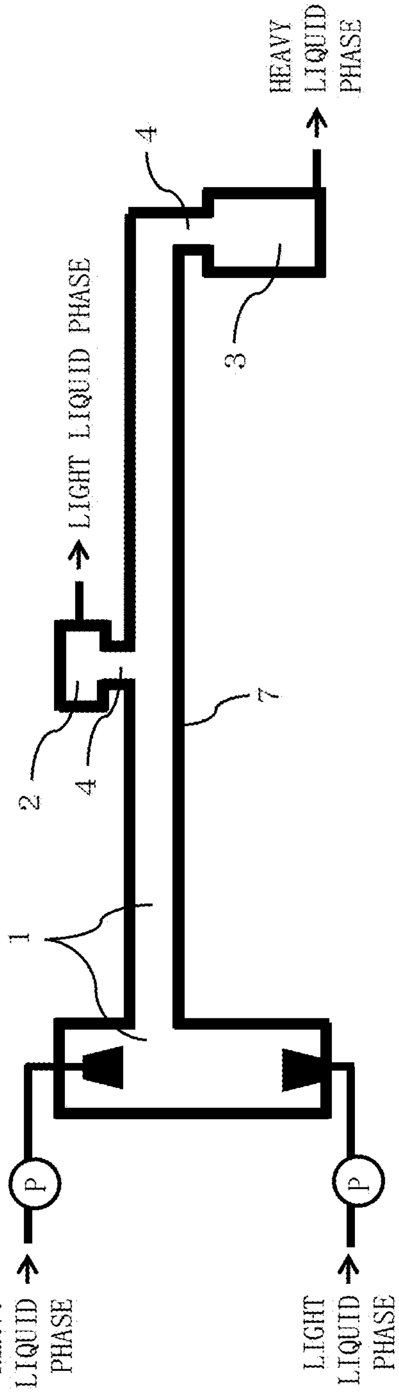
FIG. 13A shows a variation of FIG. 10 (the phase separation part of the light liquid phase is arranged near the center).
Figure 13B:
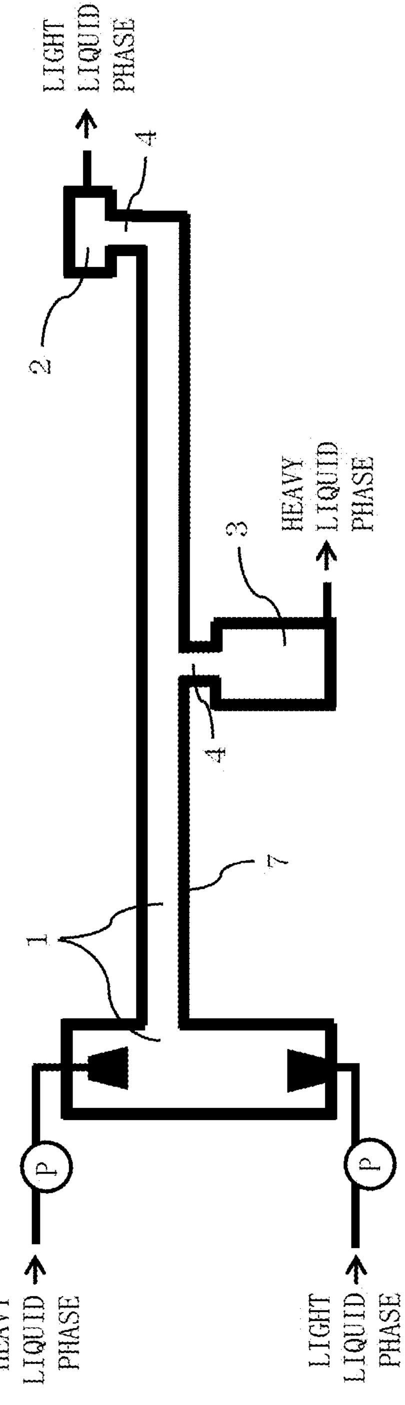
FIG. 13B shows a variation of FIG. 10 (the phase separation part of the heavy liquid phase is arranged near the center).
Figure 13C:
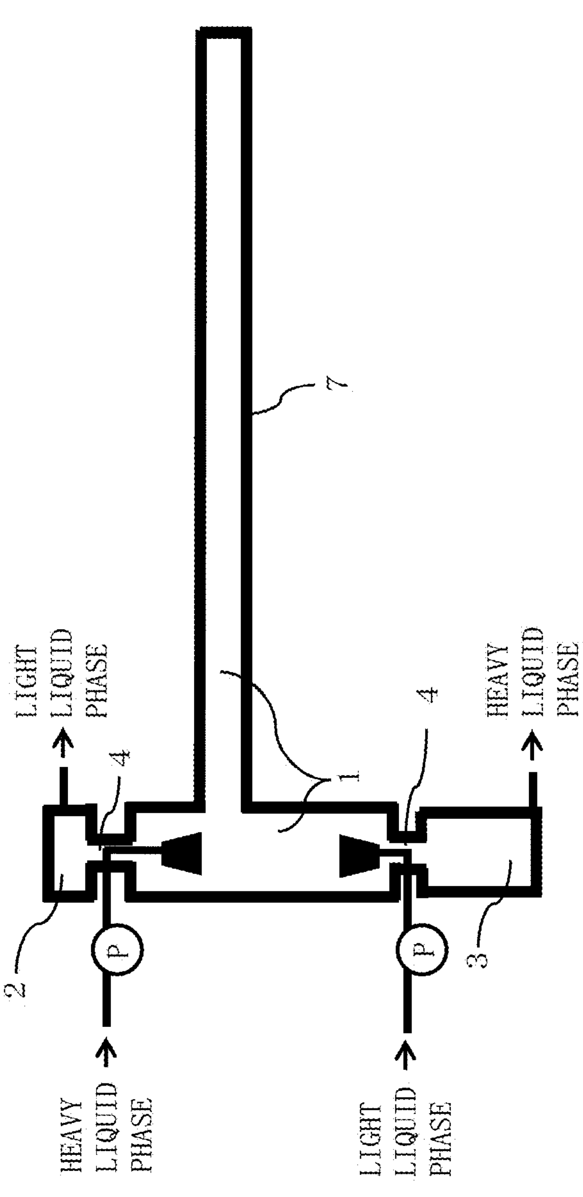
FIG. 13C shows a variation of FIG. 10 (the both phase separation parts are arranged above and below the tubular part where the nozzle is installed).

Further, in the structure shown in FIG. 10, the position where the heavy liquid phase is phase-separated and gathered (the phase separation part of the heavy liquid phase) and the position where the light liquid phase is phase-separated and gathered (the phase separation part of the light liquid phase) do not necessarily need to be close. Therefore, for example, the mechanisms such as FIG. 13(*a*) to FIG. 13(*c*) can also be used. FIG. 13(*c*) can also be regarded as a variation of the shape of the central part of FIG.3. That is, it is the shape in which the central part of FIG. 3 is extended to only one direction of the horizontal plane.

Figure 14A:
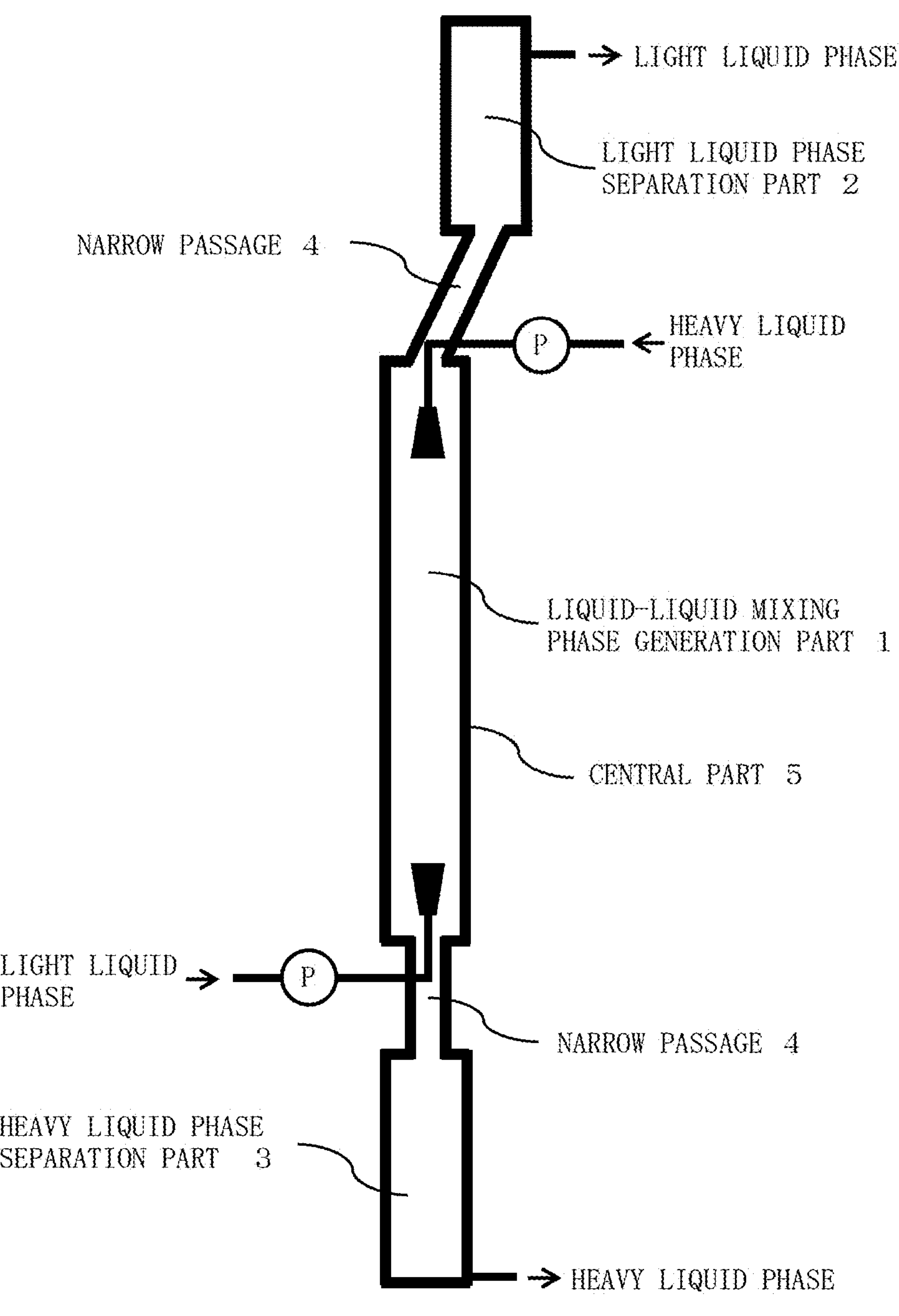
FIG. 14A shows a variation of FIG. 3 (the upper narrow passages arranged diagonally).
Figure 14B:
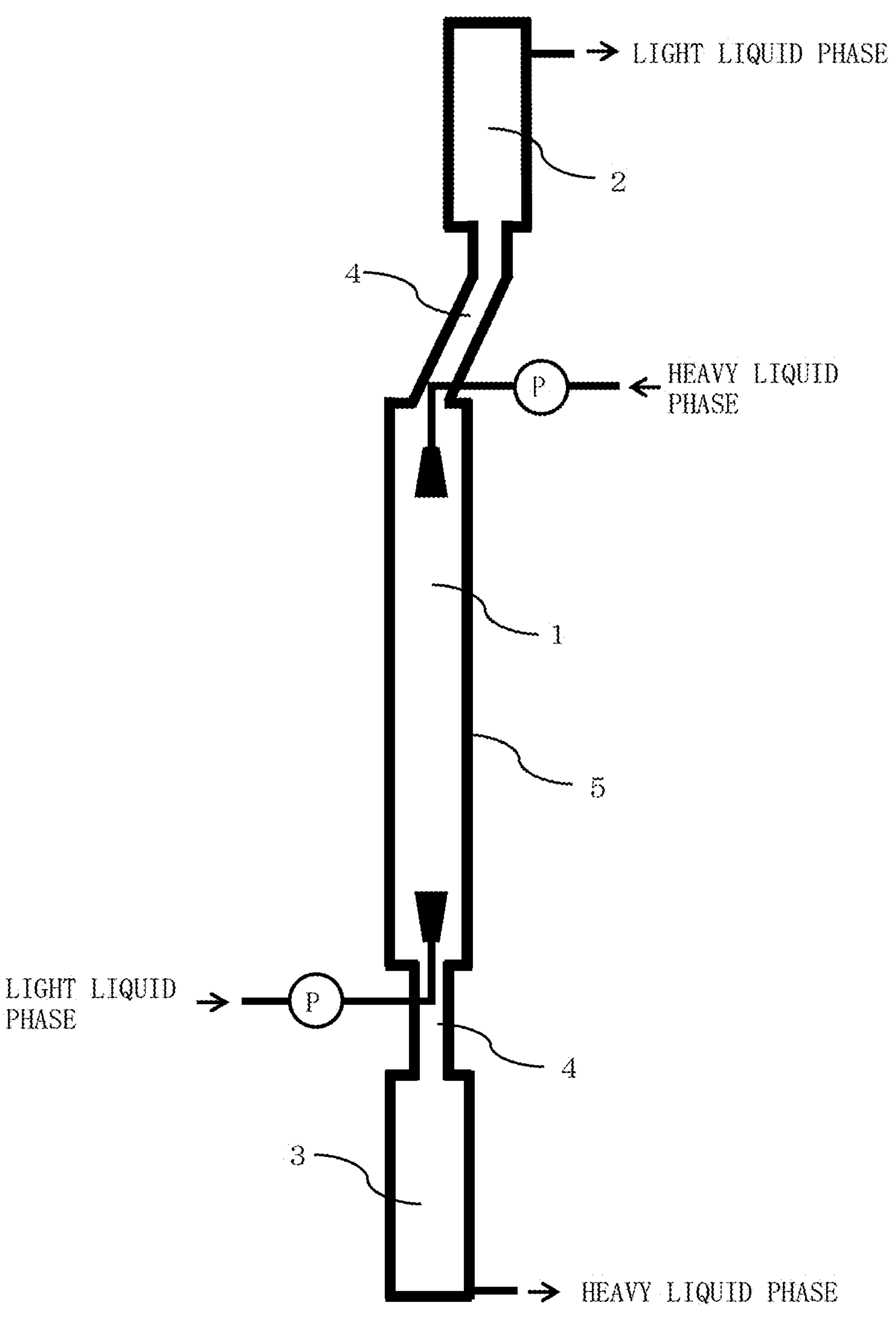
FIG. 14B shows a variation of FIG. 3 (the shape in which the upper narrow passage is combined diagonally and vertically).
Figure 15:
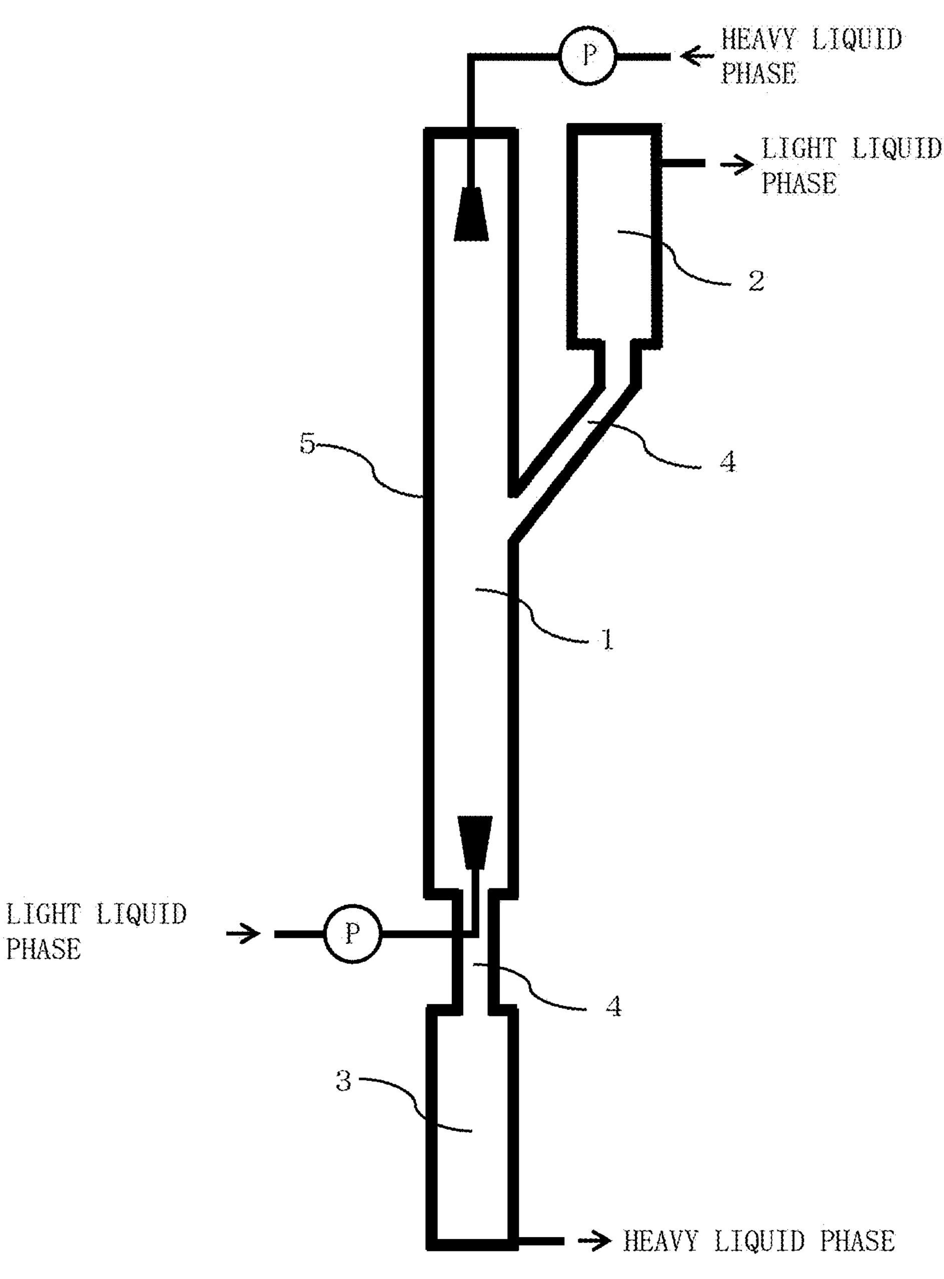
FIG. 15 shows a variation of FIG. 3 (the upper narrow passage is arranged diagonally from the vicinity of the center of the liquid-liquid mixing phase generation part).

Further, the flow of the liquid-liquid mixing phase can be guided in an oblique direction (the direction in which any angle is made from 90 degrees or 180 degrees). As a simple example, FIG. 14(*a*), FIG. 14(*b*), and FIG. 15 show the modification of FIG. 3 (basic type), but not limited to them. In FIG. 14(*a*) and FIG. 14(*b*), a narrow passage guiding the liquid-liquid mixing phase diagonally is installed above the liquid-liquid mixing phase generation part, whereas a light liquid phase after phase separation (after the extinguishment of the liquid-liquid mixing phase) gathers. In FIG. 14(*b*), the narrow passage in the oblique direction becomes a vertical direction at the position close to the phase separation part. Further, in FIG. 15, the narrow passage guiding the liquid-liquid mixing phase in an oblique direction is installed near the center of the liquid-liquid mixing phase generation part, and the light liquid phase after the phase separation (after the extinguishment of the liquid-liquid mixing phase) gathers ahead of the center.

In the mechanisms shown in FIG. 10 to FIG. 12 and FIG. 13(*a*) to FIG. 13 (*c*), the flow directions of the heavy liquid phase and the light liquid phase are the same in the horizontal direction. On the other hand, as a method of developing the liquid-liquid mixing phase in the horizontal direction, it is also possible to make the flow directions of the heavy liquid phase and the light liquid phase opposite to each other. As an example, the mechanisms for generating a liquid-liquid mixing phase in the horizontal direction while bringing the heavy liquid phase and the light liquid phase into counter contact with each other are shown in FIG. 16 to FIG. 18, FIGS. 19 (*a*) and 19(*b*), but not limited to them. As described above, in the variation of the basic type shown in FIG. 3, the shape of the central part can be freely set (for example, hexagonal in FIG. 4, cross in FIG. 5). But FIG. 16 to FIG. 19(*b*) can be regarded as variations of FIG. 3 as well as FIG. 4 and FIG. 5. That is, the mechanisms shown in FIG. 16 to FIG. 19(*b*) can be viewed as the mechanism in which the shape of the central part of the basic type shown in FIG. 3 is made to be horizontally long.

Figure 16:
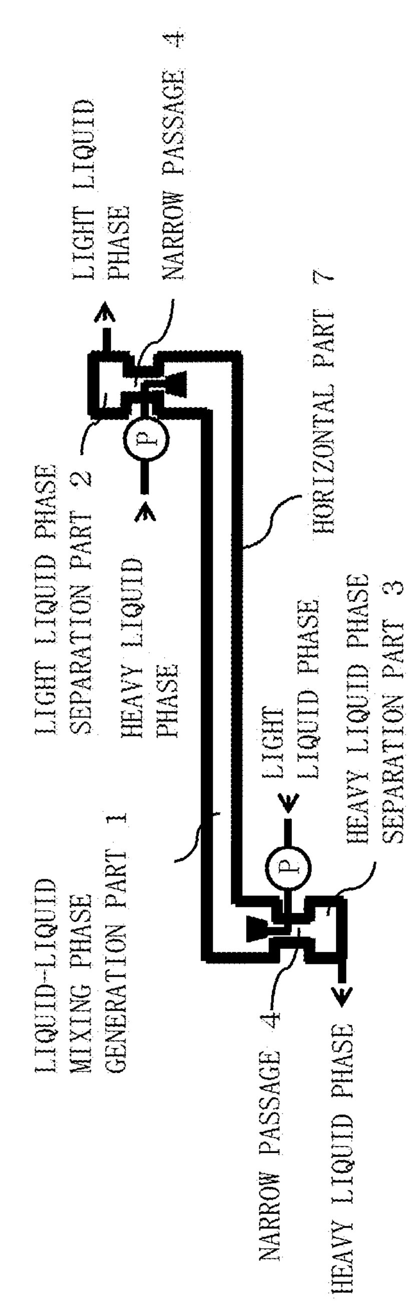
FIG. 16 shows the basic mechanism for horizontally extending the liquid-liquid mixing phase while bringing the heavy liquid phase and the light liquid phase into countercurrent contact with each other.
Figure 17:
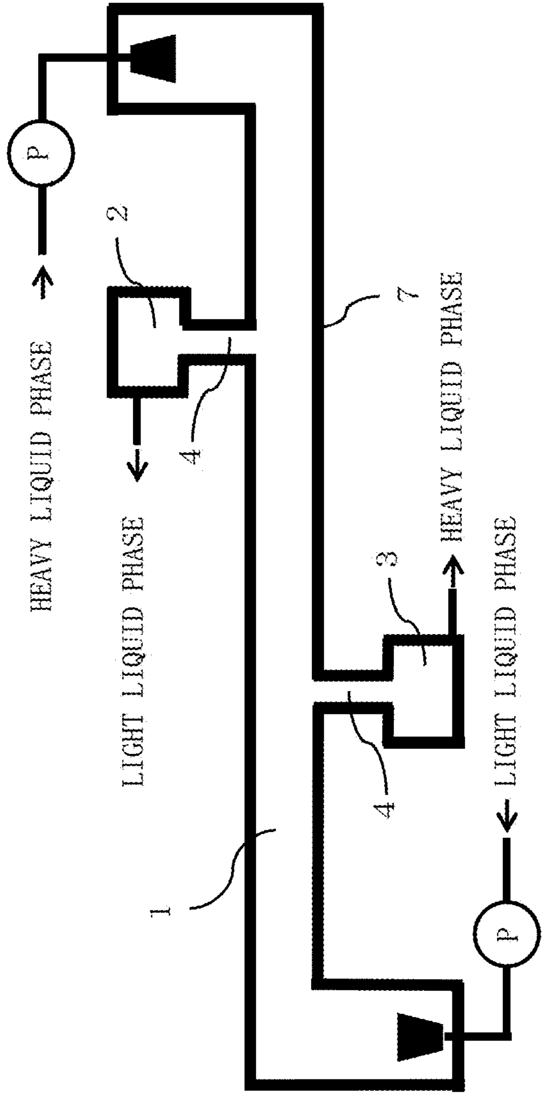
FIG. 17 shows a variation of FIG. 16 (the both phase separation parts are arranged in the horizontal part).
Figure 18:
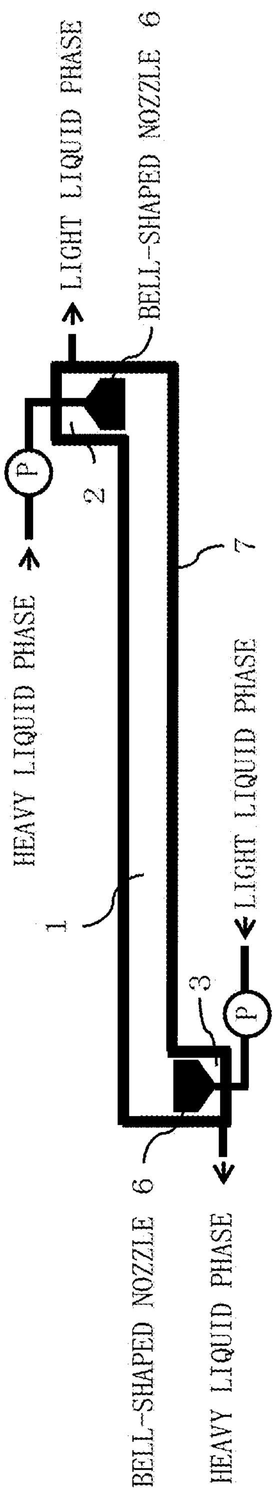
FIG. 18 shows a variation of FIG. 16 (the narrow passage formed by a bell-shaped nozzle).

FIG. 16 is a modified version of FIG. 3 which is a basic type, and the positions where both phases are separated (phase separation part) are arranged above and below the positions where the liquid-liquid mixing phase is generated (liquid-liquid mixing phase generation part). FIG. 17 shows the shape in which the setting position of the phase separation part is changed from up and bottom to left and right. FIG. 18 is the simplest variation of FIG. 8 among the variations of FIG. 3. Further, since the liquid-liquid mixing phase can be guided in an oblique direction, for example, it is possible to use the mechanisms shown in FIG. 19(*a*) and FIG. 19(*b*). The mechanism for generating the liquid-liquid mixing phase in the horizontal direction while facing the flows of both phases to each other is not limited to the above-mentioned examples.

In the countercurrent contact of the heavy liquid phase and the light liquid phase in the horizontal direction, the number of theoretical stages tends to become larger than the countercurrent contact of both phases in the vertical direction where the circulation flow is likely to occur. For example, when any of the mechanisms shown in FIG. 16 to FIG. 19(*b*) are used for the liquid-liquid extraction (solvent extraction), a larger separation coefficient can be obtained in the separation between elements because the number of theoretical stages is larger.

In the mechanism of the countercurrent contact between the heavy liquid phase and the light liquid phase in the horizontal direction, it is also possible to create the light liquid phase and the liquid-liquid mixing phase while introducing two kinds of heavy liquid phases from different positions. For example, in the mechanism shown in FIG. 20, the separation of elements can be performed more efficiently and effectively by using the heavy liquid phase 1 as the liquid to be treated (the aqueous phase to be treated) and the heavy liquid phase 2 as the cleaning solution (the aqueous phase for cleaning and removing co-extracted elements).

Figure 21:
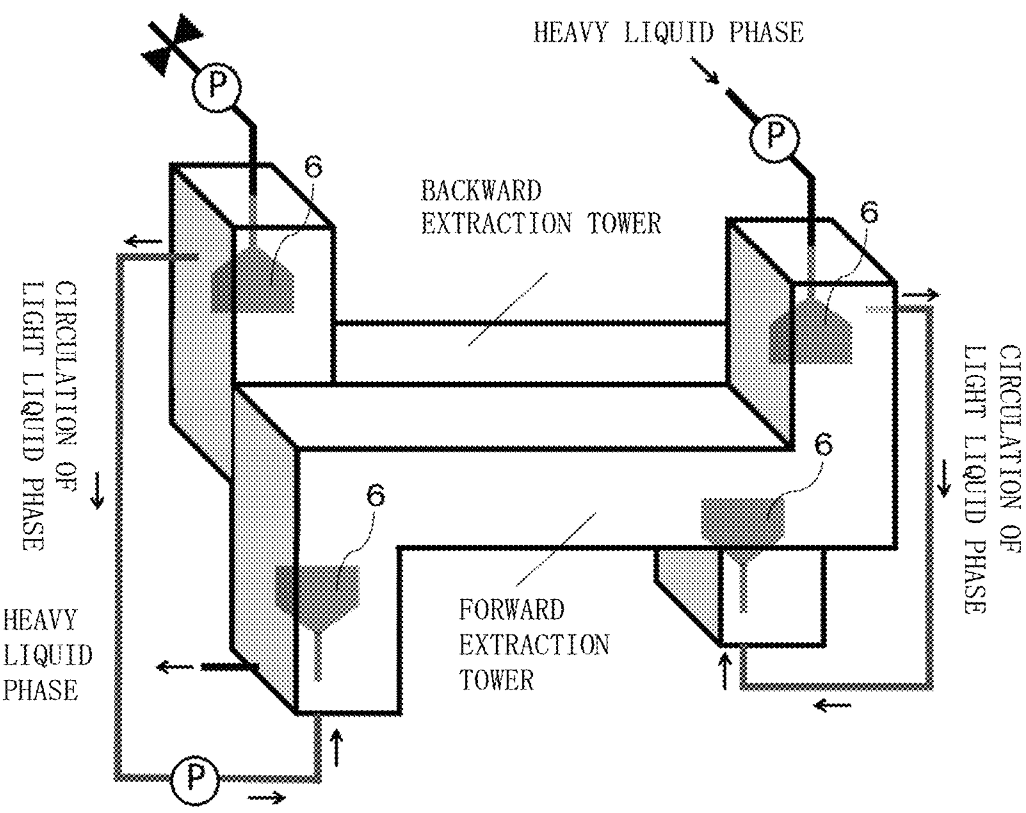
FIG. 21 shows a structure in which two closed containers with the mechanism shown in FIG. 18 are combined.

Further, because of the simplicity of the shape of FIG. 18, it is easy to construct the mechanism in which a plurality of shapes are integrated. For example, FIG. 21 is an example of the structure in which two closed containers are alternately connected. As in the case of the two-tower combination shown in FIG. 9(*a*), it can be used as a mechanism for simultaneously proceeding with the forward extraction and backward extraction in the liquid-liquid extraction (solvent extraction). Further, as in FIG. 9(*b*), non-sealed containers can be combined.

Not only for the shape in the horizontal direction (any of front and back, left and right in the horizontal plane, and these diagonal directions), but also the shape inclined (with a gradient) from the horizontal plane, it is possible to build a mechanism similar to the mechanism shown in FIG. 16 to FIG. 19(*b*). Namely, it can be regarded as a variation of the central part in FIG. 3 even if its shape is inclined (with a gradient) from the horizontal plane.

Figure 22:
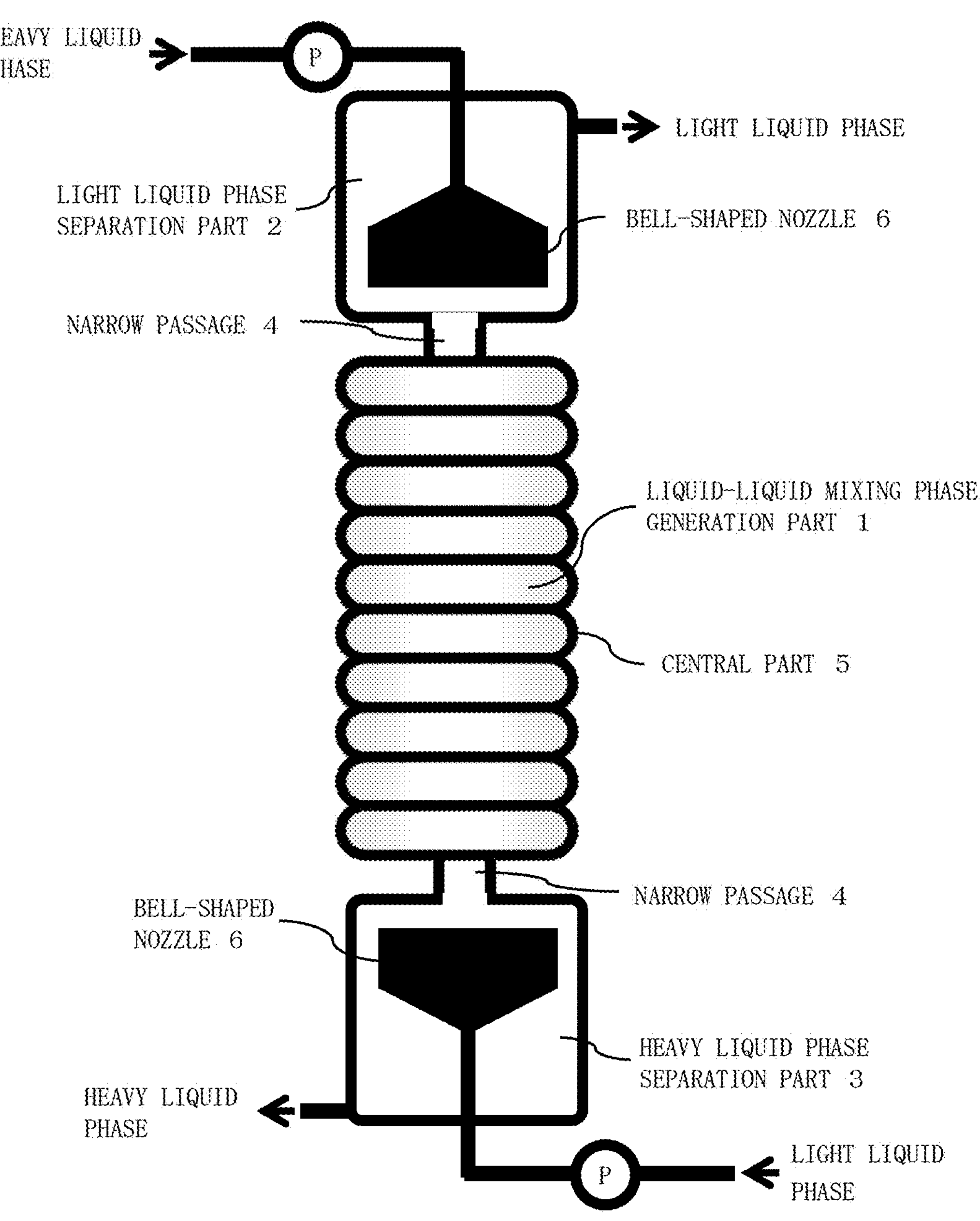
FIG. 22 shows a basic mechanism for extending the liquid-liquid mixing phase in a nearly horizontal direction in a spiral container with close contact between lines.

It is also possible to stack and arrange cylindrical shapes inclined from the horizontal plane in a spiral shape in a connected state. And, it can be regarded as a variation in the central part of FIG. 3 as described above. In particular, in the spiral shape in which the lines are in close contact with each other as shown in FIG. 22, the total length of the part where the liquid-liquid mixing phase extends in a direction close to horizontal can be remarkably increased, so that the number of theoretical plates can be significantly increased. In addition, since the spiral shape can be stacked in the vertical direction, it saves space. FIG. 22 shows an example in which a bell-shaped nozzle is applied to a position where a liquid-liquid mixing phase occurs (the liquid-liquid mixing phase generation part), but not limited to such an example.

The liquid-liquid mixing phase can be developed in any direction, such as up, down, front, back, left, right, and their oblique directions, and the liquid-liquid mixing phase and the number of positions where the soft microfluidic channel group to which it is included disappear by phase separation (phase separation part) can also be freely set. For example, as shown in FIG. 5, the central part can be made into a cross shape, and a narrow passage arranged vertically can be provided at the end of the flow of the liquid-liquid mixing phase developed in the horizontal directions (i.e. front, rear, left, right, and their oblique directions). As an example, FIG. 23(*a*) to FIG. 23(*c*) show mechanisms in which narrow passages are arranged at both ends of the flow of the liquid-liquid mixing phase developed from the cross shape to the left and right, but not limited to them. These figures show examples in which the phase separation parts is made six positions.

Figure 23A:
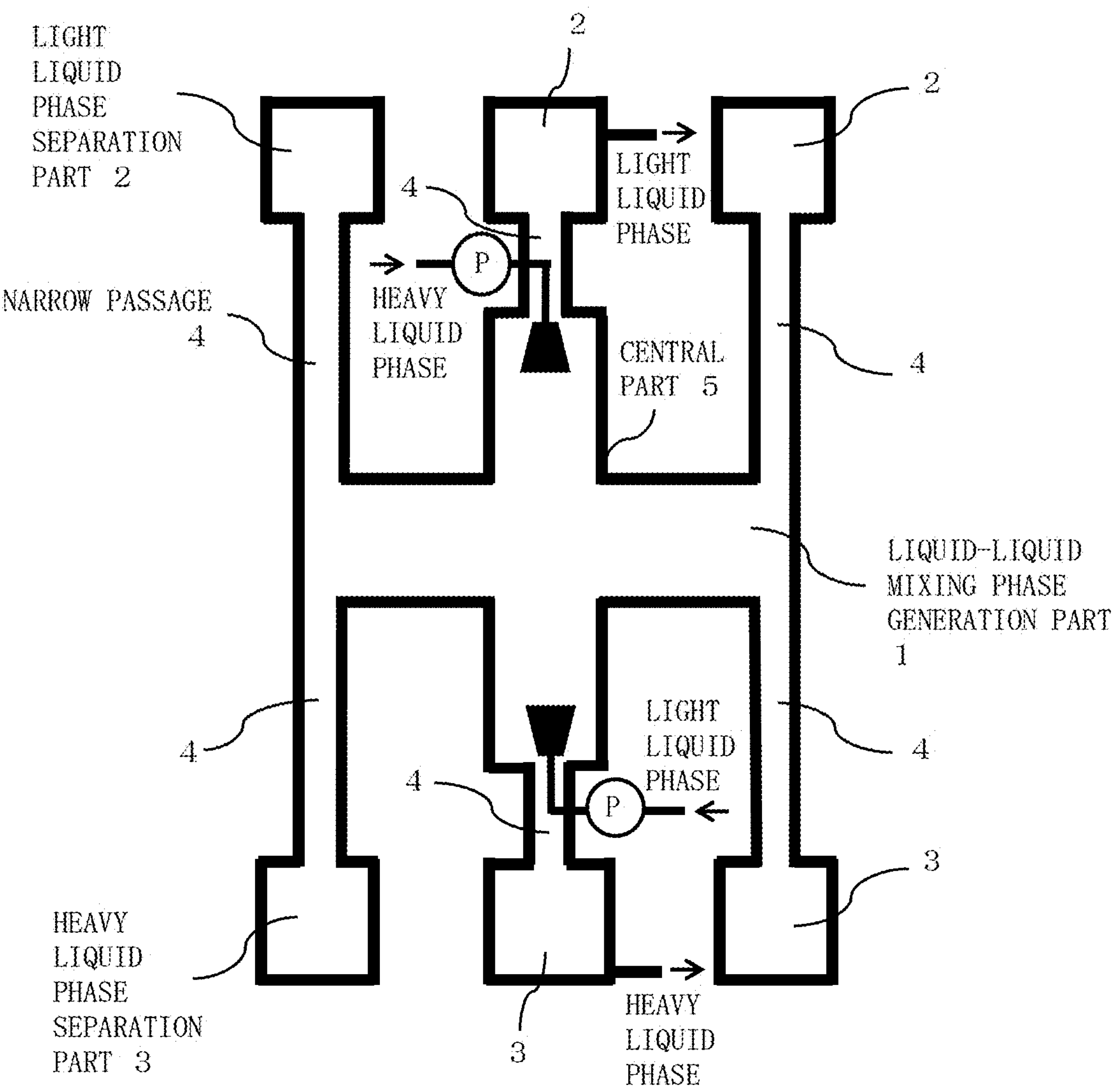
FIG. 23A shows a mechanism in which narrow passages with the same height are arranged at both ends of the liquid-liquid mixing phase extending from the central part of the cross shape to the left and right.
Figure 23B:
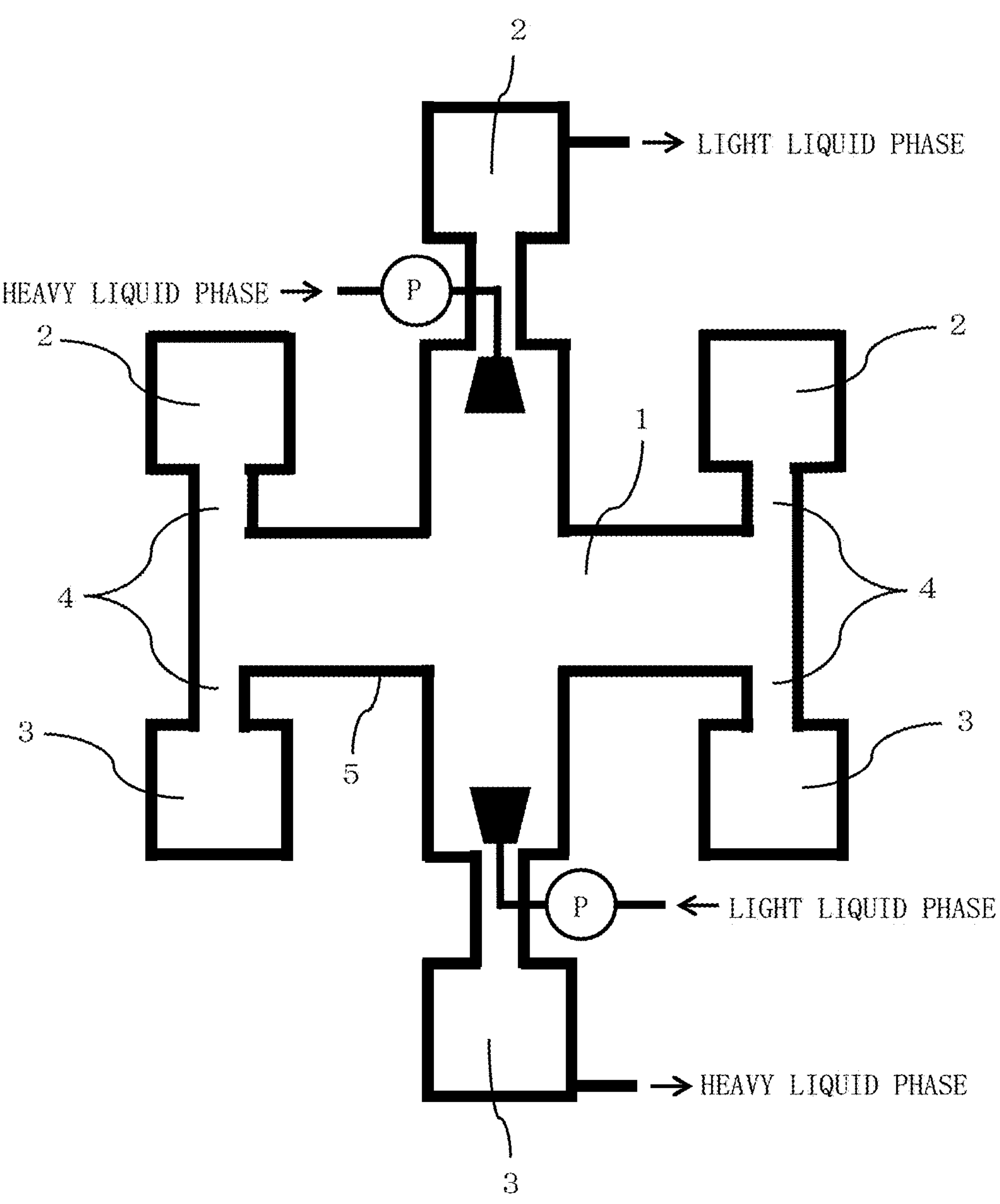
FIG. 23B shows a mechanism in which narrow passages with uneven heights are arranged at both ends of the liquid-liquid mixing phase extending from the central part of the cross shape to the left and right.
Figure 23C:
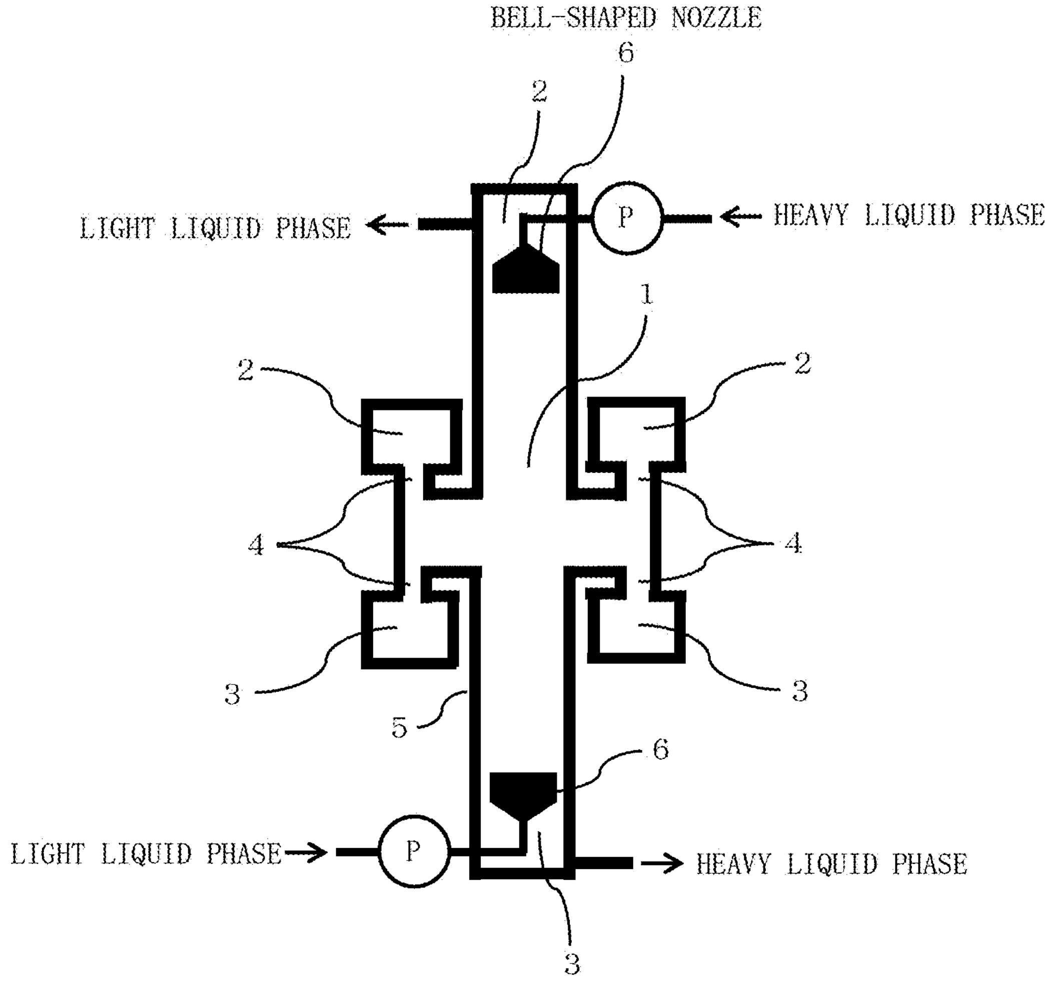
FIG. 23C shows a variation of FIG. 23B (the narrow passage formed by a bell-shaped nozzle).

FIG. 23(*a*) shows a mechanism in which the height of three phase separation parts for the heavy liquid phase and the height of the phase separation parts for the light liquid phase at the same three locations are the same for each.

Further, FIG. 23(*b*) shows a structure in which the height of each of the phase separation parts for the heavy liquid phase is different and the height of each of the phase separation parts for the light liquid phase is also different. FIG. 23(*c*) shows a mechanism in which the narrow passage between the bell-shaped nozzle and the vessel wall is used for phase separation in the same mechanism as in FIG. 23(*b*).

Figure 24:
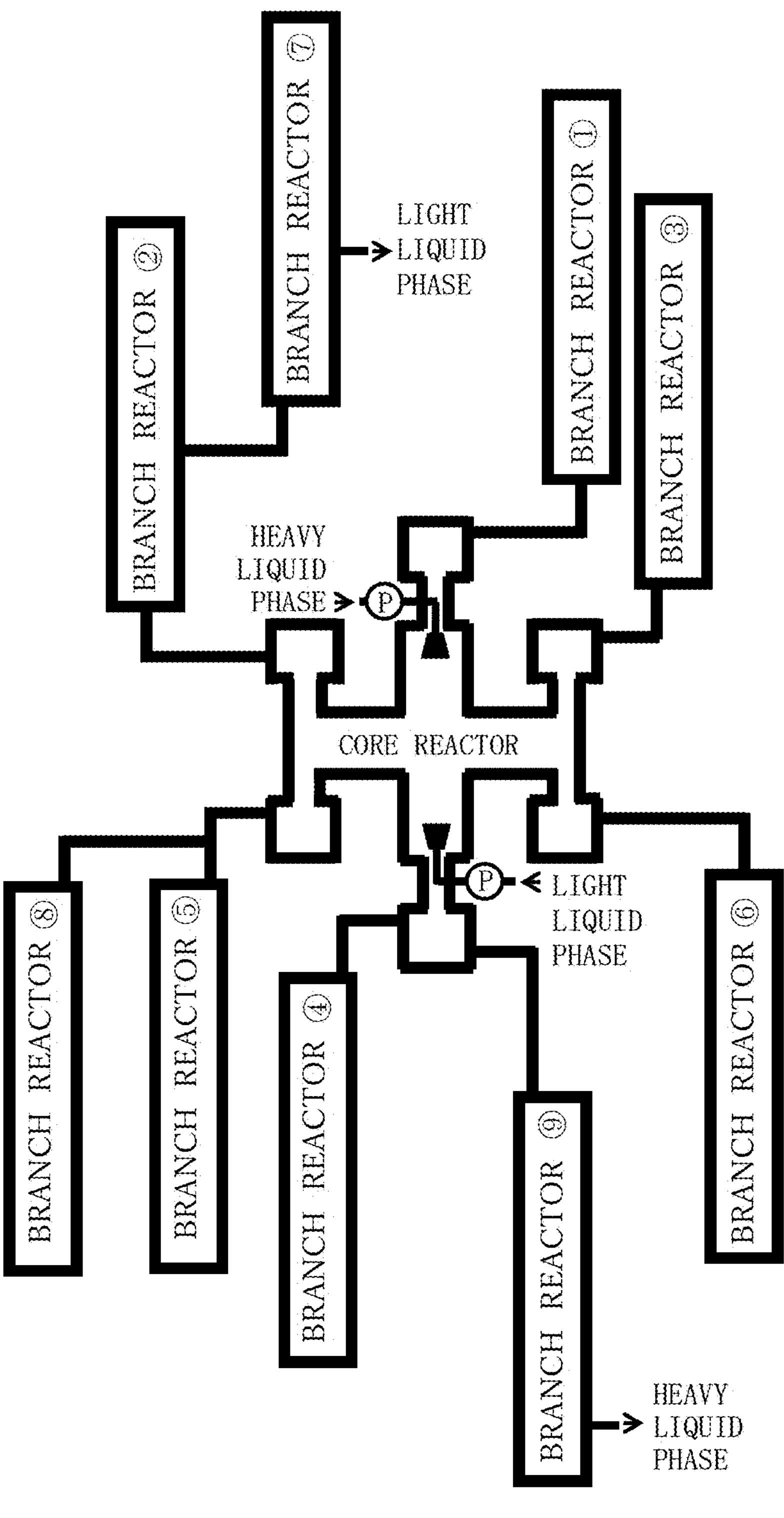
FIG. 24 shows an embodiment of a module in which a branch reactor is installed at six phase separation parts with FIG. 23B as the core reactor.

For example, with FIG. 23(*b*) as the core reactor, a module as shown in FIG. 24 in which a branch reactor for the heavy liquid phase and a branch reactor for the light liquid phase are installed at six pieces of phase separation parts is possible. It is also possible to install a plurality of branch reactors for one phase separation section.

Based on the mechanism shown above, a wide variety of reactor modules can be created by freely combining a continuously connected soft microfluidic channel group (the assembly of soft microfluidic channels) formed in the liquid-liquid mixing phase. That is, by controlling where the soft microfluidic channel is formed and where it is not formed, it is possible to have a specific function for each soft microfluidic channel group.

Hereinafter, the method of forming the liquid-liquid multiphase channel group, the method of controlling the formation and extinguishment of the liquid-liquid mixing phase channel group, and the module thereof according to the present invention will be described using some embodiments, but the present invention is not limited to their embodiments.

Embodiment 1

Lamination Layer of Droplets Upward From Liquid-Liquid Interface.

Using the ion-exchanged water (pure water) as the heavy liquid phase and the solvent containing alkane as the main component (trade name D70) as the light liquid phase, an experiment was conducted in which droplets were layered upward from the liquid-liquid interface. A heavy liquid phase (pure water) and a light liquid phase (D70) having the same volume are provided in a vertically long cylindrical container (horizontal:vertical=1:5) with the lower end closed. Fine droplets of the light liquid phase were ejected from below the container by pumping liquid through a nozzle having a plurality of small tubes, and the jets collided with the liquid-liquid interface.

Figure 25:
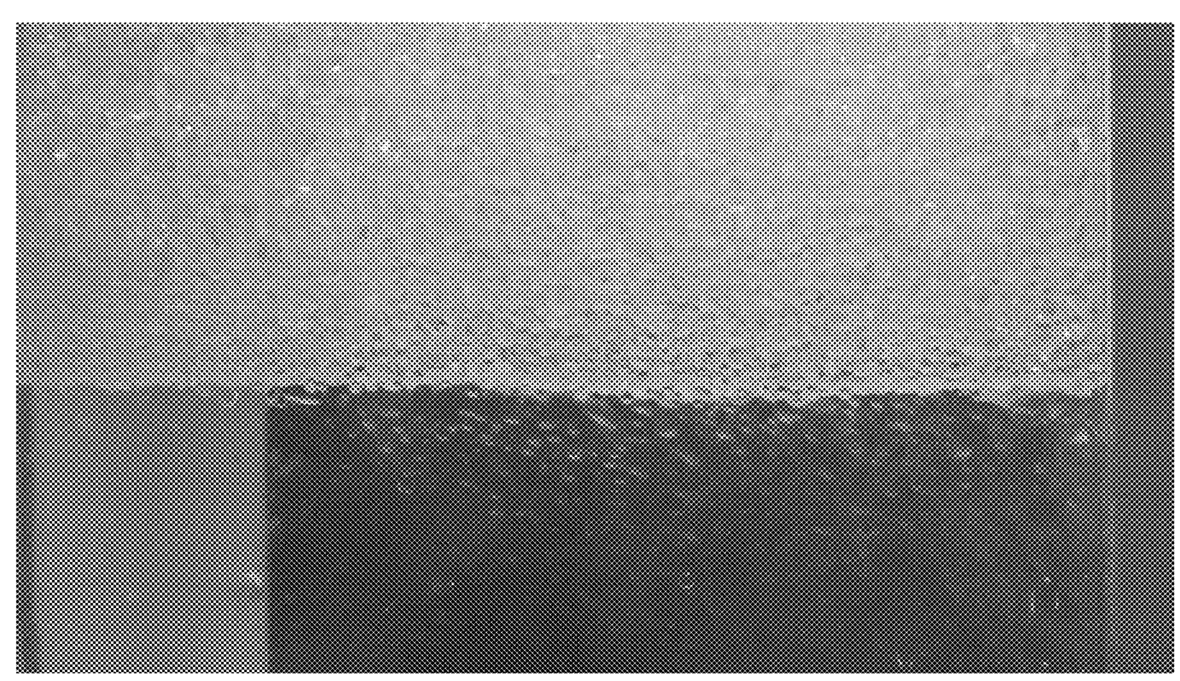
FIG. 25 shows light liquid phase droplets with a heavy liquid phase around them are stacked upward starting from the liquid-liquid interface.

As a result, as schematically shown in FIG. 1, it was found that droplets of the light liquid phase are taken into the light liquid phase with a heavy liquid phase around it, and layered above with the liquid-liquid interface as the start. FIG. 25 shows a state when the state of D shown in FIG. 1 is reached. A similar phenomenon was observed when a nozzle having a plurality of pores was used instead of a nozzle having a plurality of small tubes. Further, the inner diameter of the small tube or pore is preferably 1 mm or less, and when it exceeds 1 mm, the phenomenon of droplets laminating did not occur in many cases. The size of the droplets that determine whether or not this phenomenon occurs depends on the kind of heavy liquid phase and the light liquid phase and its combination. Further, as the droplet lamination progressed further, the dense droplet layers grew from the original interface position (the interface position when both phases were provided) to the bottom, and eventually spread throughout the cylindrical container.

Embodiment 2

Lamination Layer of Droplets Downward From Liquid-Liquid Interface

Using pure water as the heavy liquid phase and D70 as the light liquid phase, an experiment was conducted in which droplets were layered downward from the liquid-liquid interface. Similar to Example 1, a heavy liquid phase (pure water) and a light liquid phase (D70) having the same volume are provided in a vertically long cylindrical container (horizontal:vertical=1:5) with the lower end closed. Fine droplets of the heavy liquid phase were ejected from above the container by pumping liquid through a nozzle having a plurality of small tubes, and the jets collided with the liquid-liquid interface.

Figure 26:
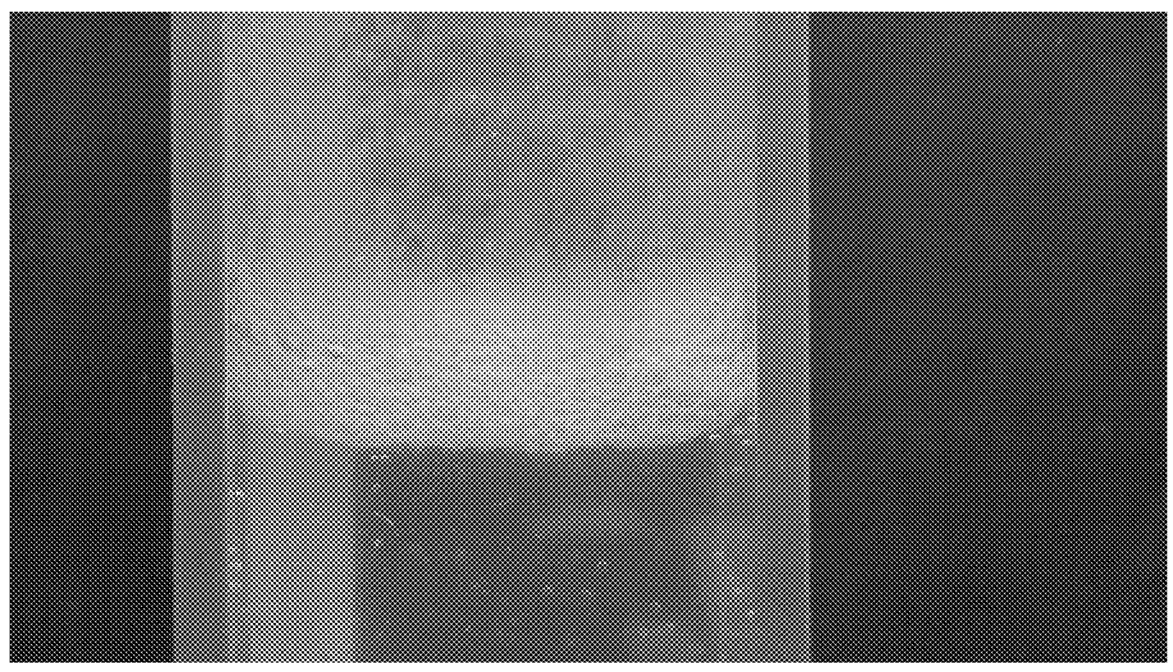
FIG. 26 shows a state in which droplets of a heavy liquid phase accompanied by a light liquid phase are stacked downward starting from the liquid-liquid interface.

As a result, as schematically shown in FIG. 2, it was found that droplets of the heavy liquid phase are taken into the heavy liquid phase with a light liquid phase around it, and layered below with the liquid-liquid interface as the start. FIG. 26 shows a state when the state of D shown in FIG. 2 is reached. A similar phenomenon was observed when a nozzle having a plurality of pores was used instead of a nozzle having a plurality of small tubes. Further, the inner diameter of the small tube or pore is preferably 1 mm or less, and when it exceeds 1 mm, the phenomenon of droplets laminating did not occur in many cases. The size of the droplets that determine whether or not this phenomenon occurs depends on the kind of heavy liquid phase and the light liquid phase and its combination. Further, as the droplet lamination progressed further, the dense droplet layers grew from the original interface position (the interface position when both phases were provided) to the up and down directions, and eventually spread throughout the cylindrical container.

Embodiment 3

Microfluidic Channel Group Formed in Liquid-Liquid Mixing Phase

Figure 27:
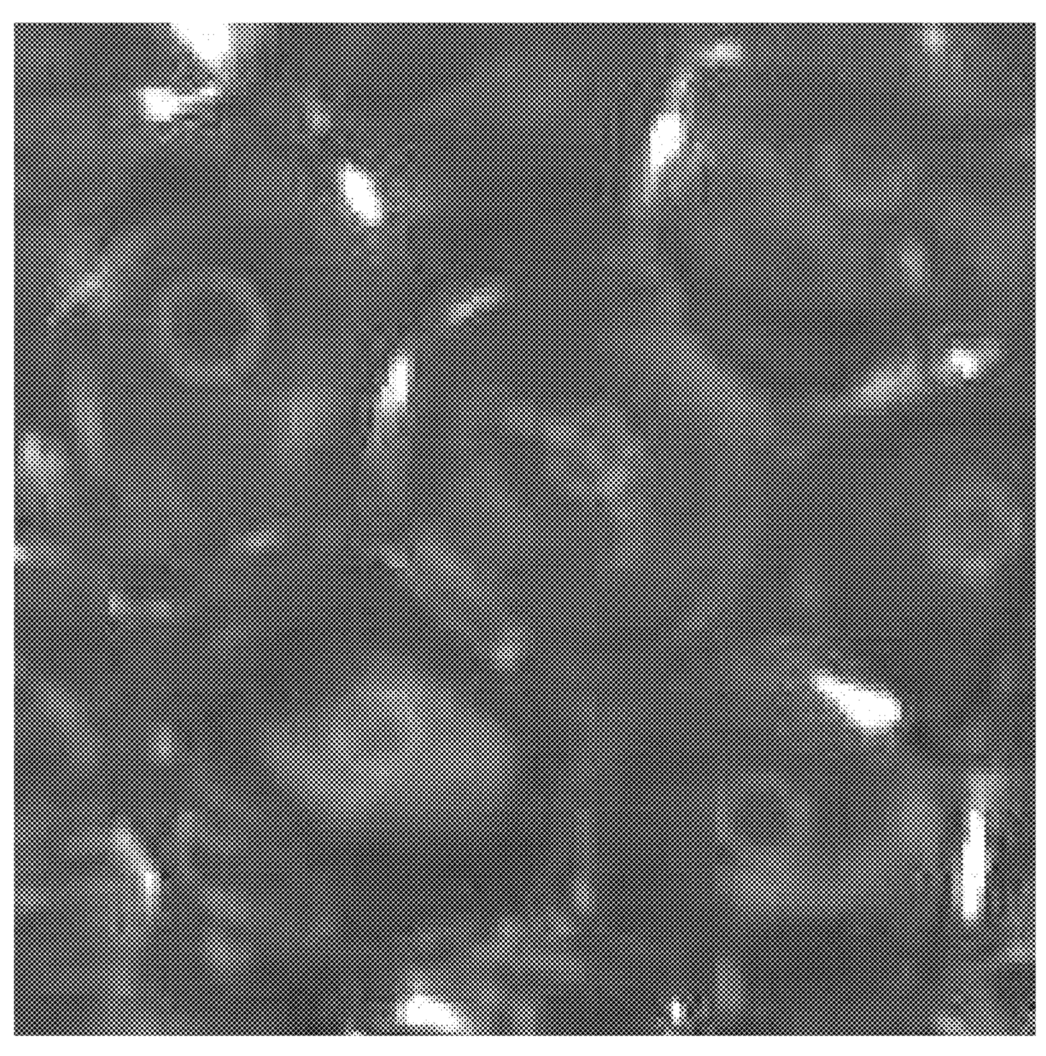
FIG. 27 shows a state in which droplets that form a shape close to a hexagon when densely packed are stacked, and a group of microfluidic channels formed around the droplets.
Figure 28:
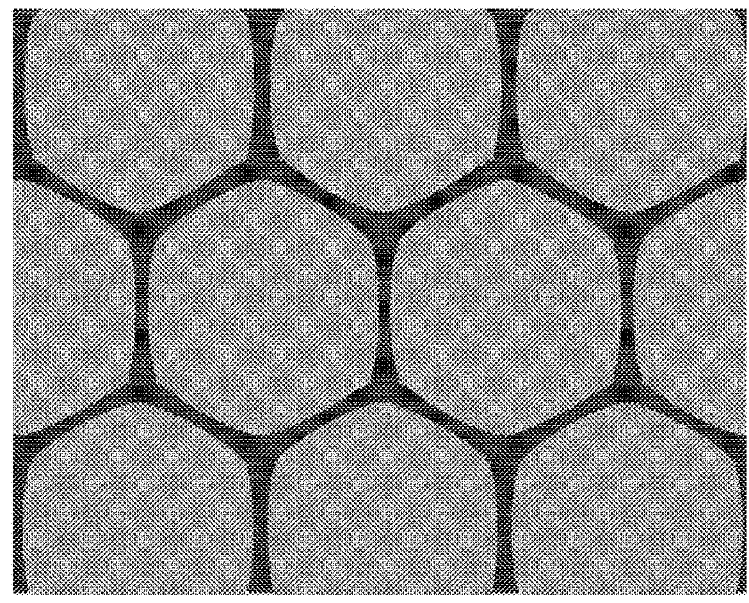
FIG. 28 is a schematic diagram of a group of connected microfluidic channels forming a three-dimensional network structure formed between droplets.
Figures 29A, 29B:
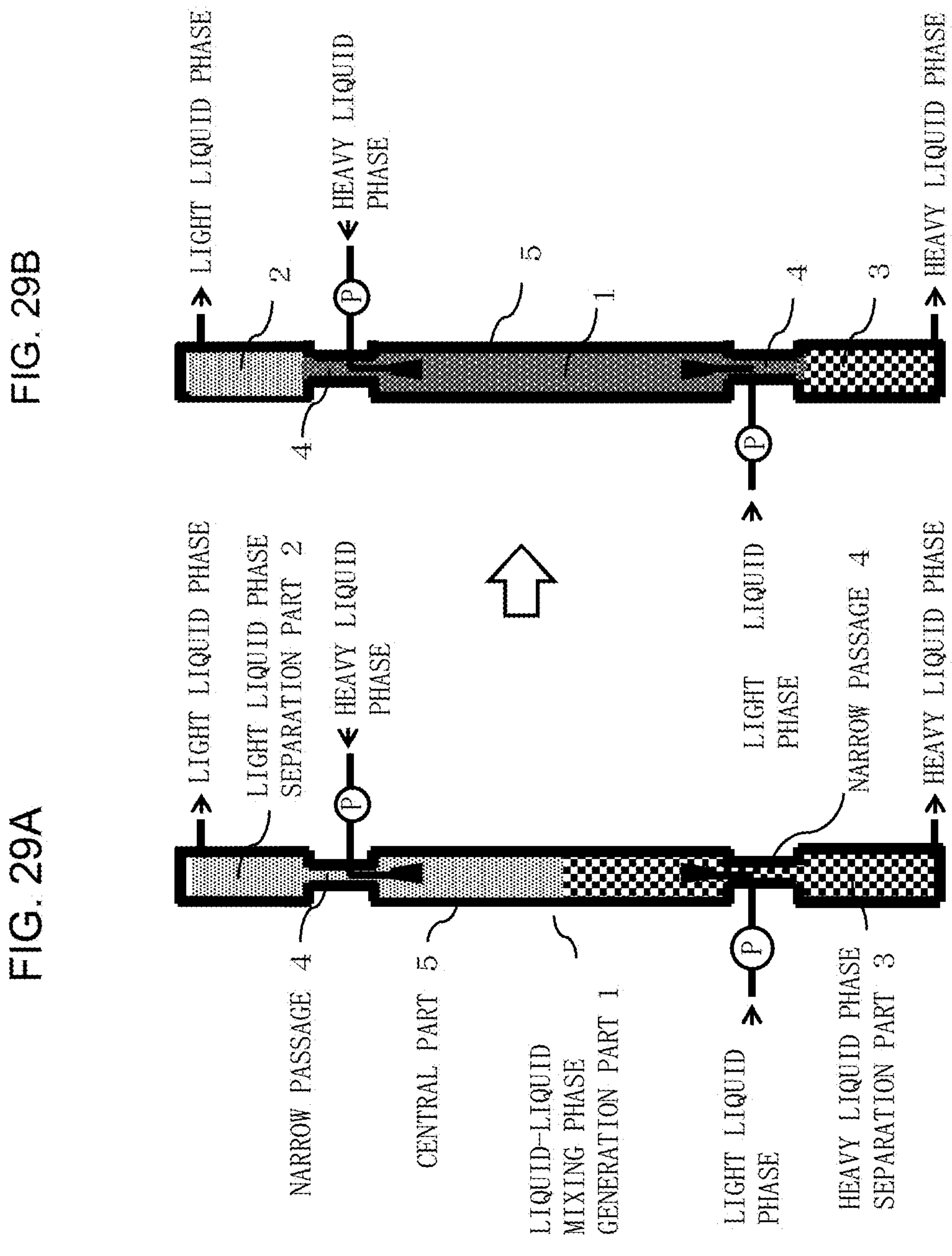
FIGS. 29A and 29B represent a schematic diagram is a schematic diagram of two liquid phase installation and liquid-liquid mixing phase generation in the mechanism shown in FIG. 3.
Figures 30A, 30B:
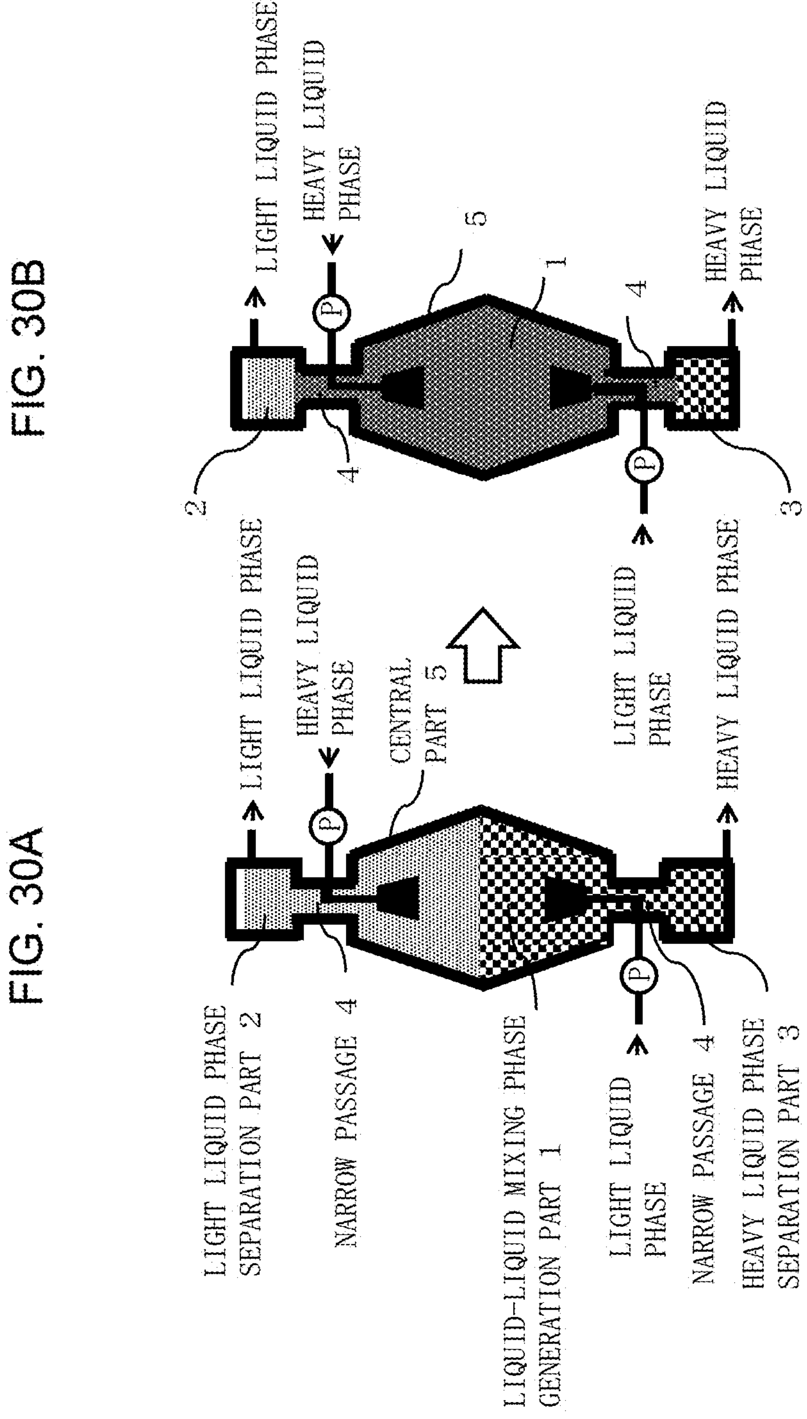
FIGS. 30A and 30B represent a schematic diagram of two liquid phase installation and liquid-liquid mixing phase generation in the mechanism shown in FIG. 4.
Figures 32A, 32B:
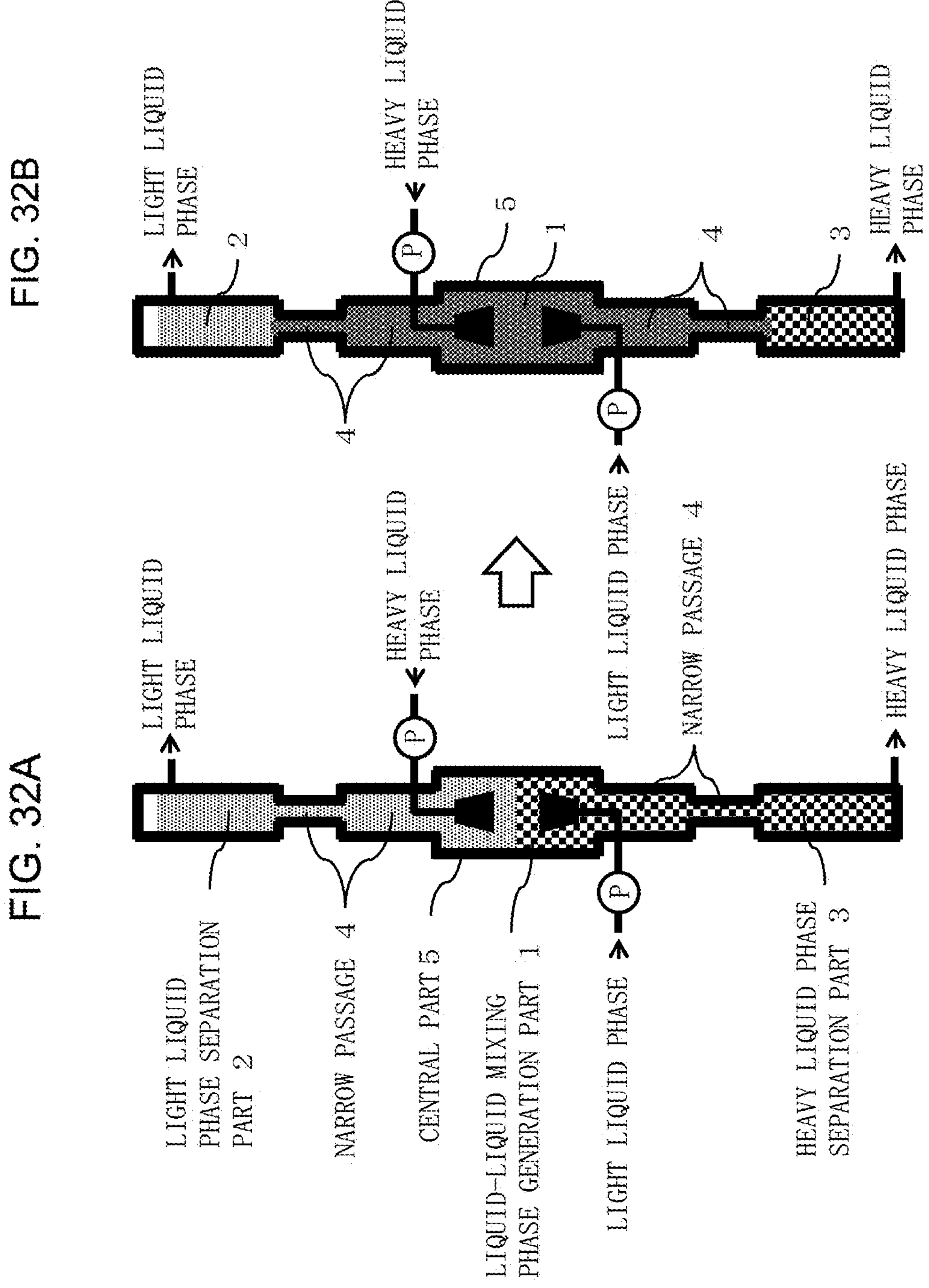
FIGS. 32A and 32B represent a schematic diagram of two liquid phase installation and liquid-liquid mixing phase generation in the mechanism shown in FIG. 6.

FIG. 27 shows an enlarged diagram of a high-population channel group of continuously connected three-dimensional network structure formed in a liquid-liquid mixing phase caused by laminating droplets based on the method shown in embodiment 1. When the droplets are well layered and densely formed, it was found that the droplets had the shape close to a hexagon as shown in FIG. 27. As schematically shown in FIG. 28, the continuously connected microfluidic channel group of the heavy liquid phase (pure water) which forms a three-dimensional network structure is formed between the droplets of the light liquid phase (D70).

Embodiment 4

Generation of Flow in a Liquid-Liquid Mixing Phase Microfluidic Channel

When the micro droplets of the light liquid phase (D70) are ejected from below the vertically long cylindrical container by the method shown in embodiment 1, and at the same time, the heavy liquid phase (pure water) is introduced by pumping liquid from above the container, the flow of heavy liquid phase (fast movement of fluid) in the liquid-liquid multiphase microfluidic channel was observed by a high-speed camera. Further, as the liquid feeding rate of the heavy liquid phase was increased, the flow rate of pure water in the microfluidic channel also increased accordingly. Furthermore, the increase in the liquid transfer rate of the heavy liquid phase promoted the growth of the droplet lamination downward from the original interface position (the interface position when both phases were installed). Similarly, when the minute droplets of the heavy liquid phase (pure water) are ejected from above the vertically long cylindrical container, and at the same time, the light liquid phase (D70) is introduced from below the container by pumping liquid by the method shown in embodiment 2, the flow of the light liquid phase (fast movement of the fluid) in the liquid-liquid multiphase microfluidic channel was observed by a high-speed camera. Further, as the liquid feeding rate of the light liquid phase was increased, the flow velocity of D70 in the microfluidic channel also increased accordingly. Furthermore, the increase in the liquid transfer rate of the light liquid phase promoted the growth of the droplet lamination upward from the original interface position (the interface position when both phases were installed).

Embodiment 5

Comparison With Liquid-Liquid Mixing Phase Generated by Mechanical Stirring by Stirring Blade Rotation A heavy liquid phase (pure water) and a light liquid phase (D70) having the same volume were installed in the same cylindrical container as in embodiment 1, and a stirring blade attached to the tip of the rotating shaft was placed at the interface between the two liquid phases. The liquid-liquid mixing phase generated by mechanical stirring was compared with the liquid-liquid mixing phase generated by laminating droplets based on the droplet ejection shown in embodiment 1.

As a result, in the liquid-liquid mixing phase generated by mechanical stirring, the population of droplets is high near the blade part of the stirring blade, and the population of droplets decreases as the distance from the blade part increases vertically. While, it was found that in the liquid-liquid mixing phase generated by the ejection, the population of the droplets increased sharply from the liquid-liquid interface, and the population further increased upward. In addition, the lamination of droplets grew downward from the original interface part (the interface part when the heavy liquid phase and the light liquid phase were installed), and finally spread over the entire cylindrical container.

As a result of comparing the specific interfacial areas for the entire liquid-liquid mixing phase based on the particle size and distribution of the droplets obtained by the high-speed camera observation, a value more than 5 times that of mechanical stirring by the stirring blade was observed in the liquid-liquid mixing phase caused by droplet ejection. Further, the comparison in the specific interfacial areas between droplet ejection and machine stirring was performed while adjusting the liquid transfer rate by droplet ejection and machine agitation and the stirring blade rotation speed by machine stirring in order that the volume of the generated liquid-liquid mixing phase becomes almost the same. In the case of mechanical agitation, the compatibility (degree of phase separation) is inferior to that of droplet ejection, but the condition that maximizes the population of droplets in the liquid-liquid mixed phase was selected without considering the quality of the phase separation.

From the above, it was clarified that a significantly larger specific interfacial area was obtained in the liquid-liquid mixing phase caused by droplet ejection than in the case of the liquid-liquid mixing phase caused by machine stirring. That is, the effect of the soft microfluidic channel formed in the liquid-liquid mixing phase was shown.

Embodiment 6

Control of Generation and Extinguishment of Liquid-Liquid Mixing Phase (Soft Microfluidic Channel Group)

As shown in embodiments 1 to 5, a soft microfluidic channel group having the continuously connected three-dimensional network structure is formed at an extremely high population inside the liquid-liquid mixing phase generated by droplet ejection. It was found that the soft microfluidic channel group, which has fluidity and flexibility due to liquid, and has an ideal branching structure by nature, can freely control its occurrence and extinguishment by an extremely simple mechanism that only ejects droplets, as shown below.

Regarding the mechanism of FIG. 3 to FIG. 23(*c*), ion-exchanged water (pure water), chlorinated hydrocarbon, or fluorous solvent was used as the heavy liquid phase, and alkane, aromatic, alcohol, ketone, ether, phosphate ester, amine, amide, or pure water (when the fluorous solvent was the heavy liquid phase) were used as the light liquid phase. And, the generation and extinguishment of a liquid-liquid mixing phase (soft microfluidic channel group) was observed. Although the population of droplets in the liquid-liquid mixing phase changed due to differences in the selection and combination of the solvent, conditions such as pH and ionic strength, and the type and structure of the nozzle for ejecting droplets, there was no difference in the area of the generation and extinguishment of liquid-liquid mixing phase. Hereinafter, the generation region of the liquid mixing phase and the extinguishment region thereafter with respect to the mechanisms shown by FIG. 3 to FIG. 23(*c*). The mechanism shown in FIG. 9(*a*), FIG. 9(*b*), and FIG. 21 in which a plurality of elements were combined was not different from that of a single element.

Each of FIG. 29 to FIG. 34 shows the basic type mechanism (shown in FIG. 3) and its variation type mechanism (shown in FIG. 3 to FIG. 8). In each diagram, left side A shows a preparation state in which the heavy liquid phase and the light liquid phase are installed and right side B shows an operation state in which the liquid-liquid mixing phase is occurred. Regardless of the shape of the central part, the liquid-liquid mixing phase disappears when it reaches the phase separation part (heavy liquid phase separation part and light liquid phase separation part). Further, in case that the cross-sectional area of the narrow passage gradually becomes smaller toward the phase separation part (FIG. 32) or it becomes smaller as a megaphone shape (FIG. 33), or a vertical narrow passage is formed between the bell shape nozzle and the vessel wall (FIG. 34), the liquid-liquid mixing phase disappears when it reaches the phase separation part without being affected by the shape of the narrow passage.

In FIG. 35 to FIG. 38(*f*), the liquid-liquid mixing phase generated in the tubular part where both the heavy liquid phase and the light liquid phase nozzle are installed is guided horizontally. Then, the liquid-liquid mixing phase is guided into a small passage placed or formed so that the phase separation is caused (the mechanism of FIG. 10 to FIG. 13(*c*)). Left side A shows a preparation state in which the heavy liquid phase and the light liquid phase are installed, and right side B shows an operation state in which the liquid-liquid mixing phase is occurred.

Figures 35A, 35B:
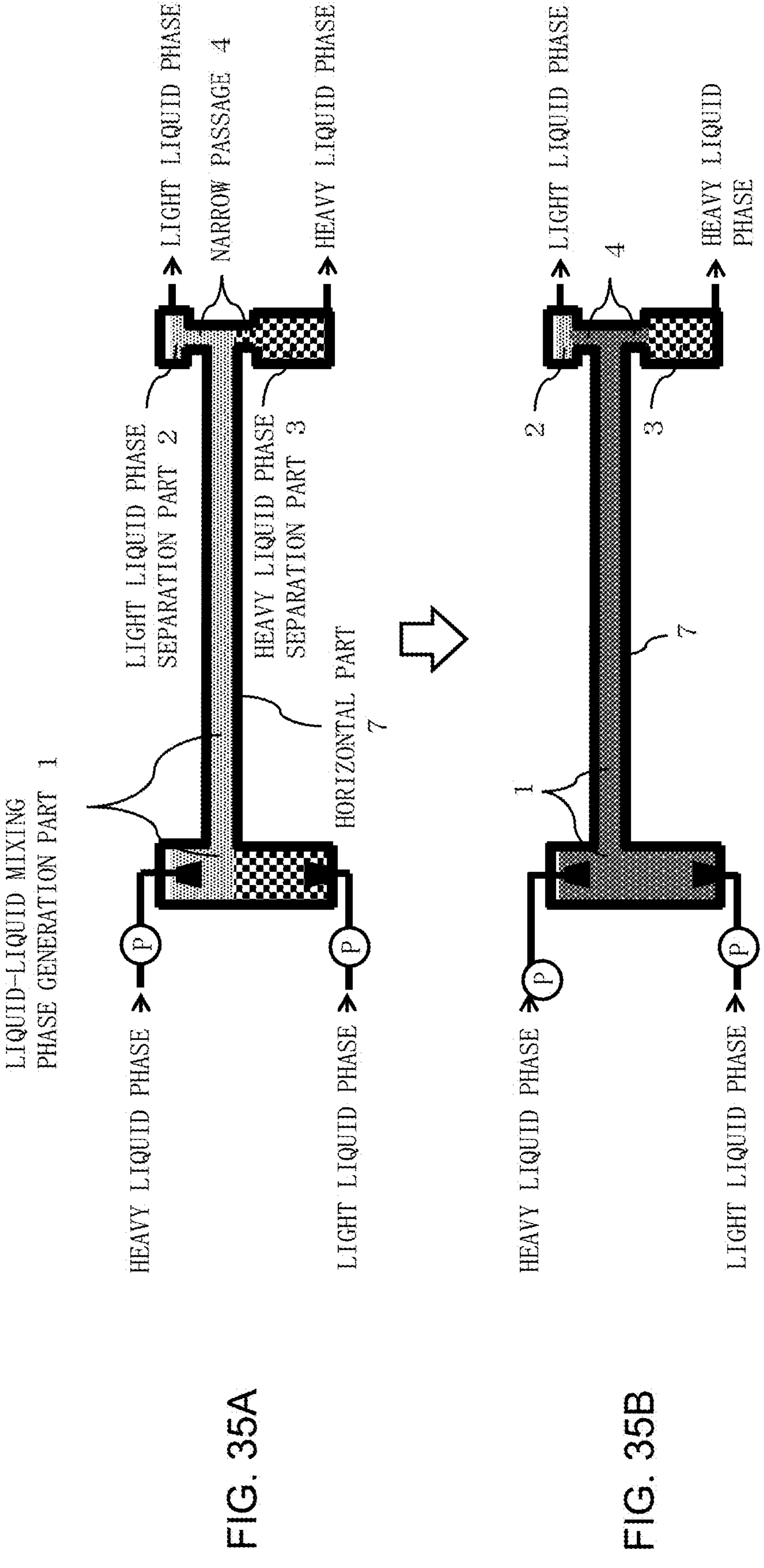
FIGS. 35A and 35B represent a schematic diagram of two liquid phase installation and liquid-liquid mixing phase generation in the mechanism shown in FIG. 10.
Figures 36A, 36B:
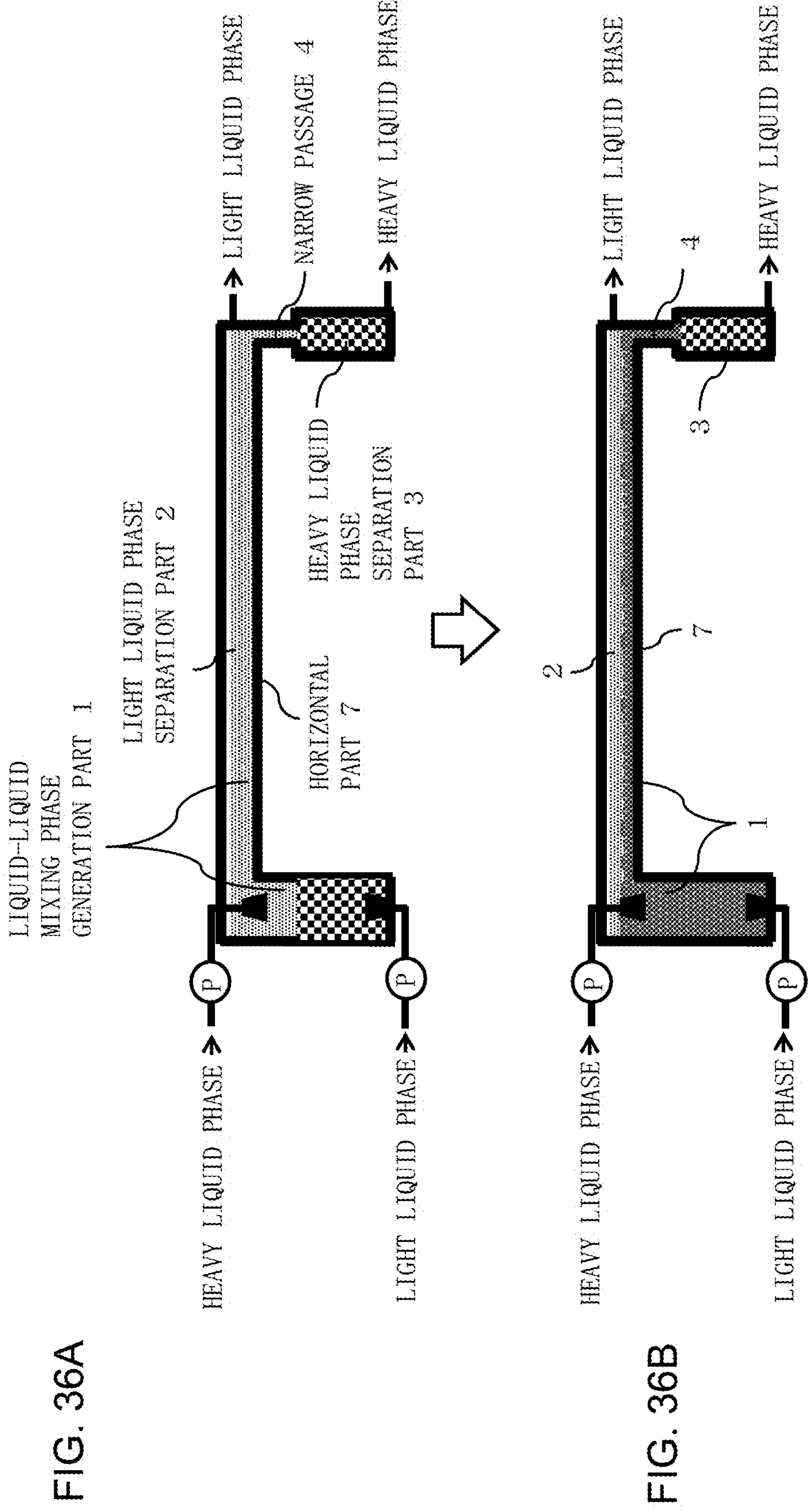
FIGS. 36A and 36B represent a schematic diagram of two liquid phase installation and liquid-liquid mixing phase generation in the mechanism shown in FIG. 11.
Figures 37A, 37B:
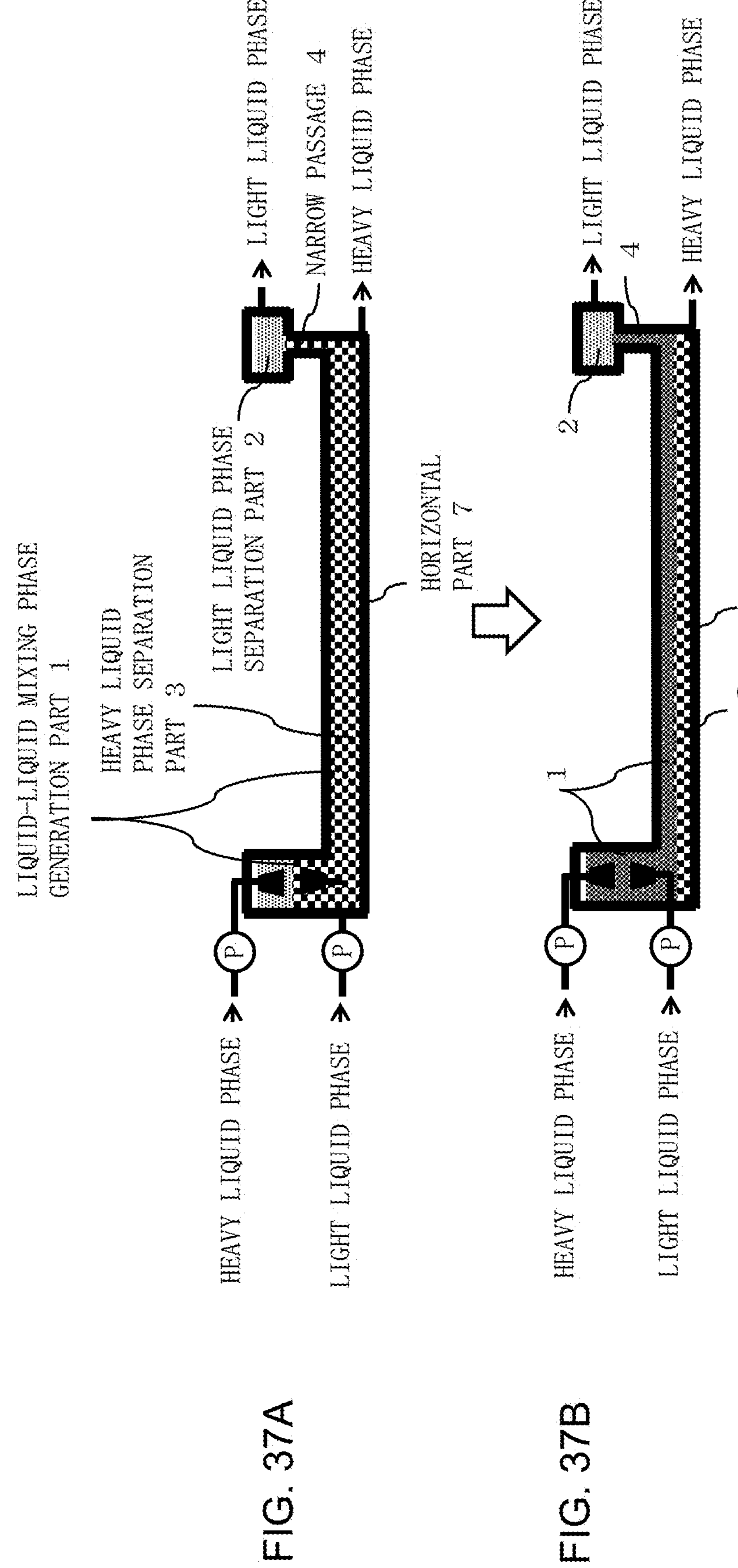
FIGS. 37A and 37B represent a schematic diagram of two liquid phase installation and liquid-liquid mixing phase generation in the mechanism shown in FIG. 12.

FIG. 35 shows the result obtained in the mechanism in which the flow of the liquid-liquid mixing phase is guided in the horizontal direction from the vicinity of the center of the nozzle installation part (the mechanism of FIG. 10). In this mechanism, the liquid-liquid mixing phase disappeared when the flow of the liquid-liquid mixing phase passed through a narrow passage arranged or formed in the vertical direction and reached the phase separation parts installed above and below the narrow passage. FIG. 36 shows the result obtained in the mechanism in which the flow of the liquid-liquid mixing phase is guided in the horizontal direction from above the nozzle installation part (the mechanism of FIG. 11). In FIG. 11, only the narrow passage guiding to the phase separation part (heavy liquid phase separation part) of the heavy liquid phase is provided. The narrow passage is not provide, which guides to the phase separation part (light liquid phase separation part) of the light liquid phase. In this case, the phase separation of the light liquid phase occurred at the horizontal part where the flow of the liquid-liquid mixing phase shifts in the horizontal direction. That is, as shown in FIG. 36, it was found that the liquid-liquid mixing phase generation part and the light liquid phase separation part coexist in the horizontal part. FIG. 37 shows the result obtained in the mechanism (the mechanism of FIG. 12) in which the flow of the liquid-liquid mixing phase is guided in the horizontal direction from below the nozzle installation part. In FIG. 12, only a narrow passage guiding to the phase separation part (light liquid phase separation part) of the light liquid phase is provided. And, the narrow passage is not provide, which guides to the phase separation part (heavy liquid phase separation part) of the heavy liquid phase. In this case, the phase separation of the heavy liquid phase occurred at the horizontal part where the flow of the liquid-liquid mixing phase shifts in the horizontal direction. That is, as shown in FIG. 37, it was found that the liquid-liquid mixing phase generation part and the heavy liquid phase separation part coexist in the horizontal part.

Figures 38A, 38B:
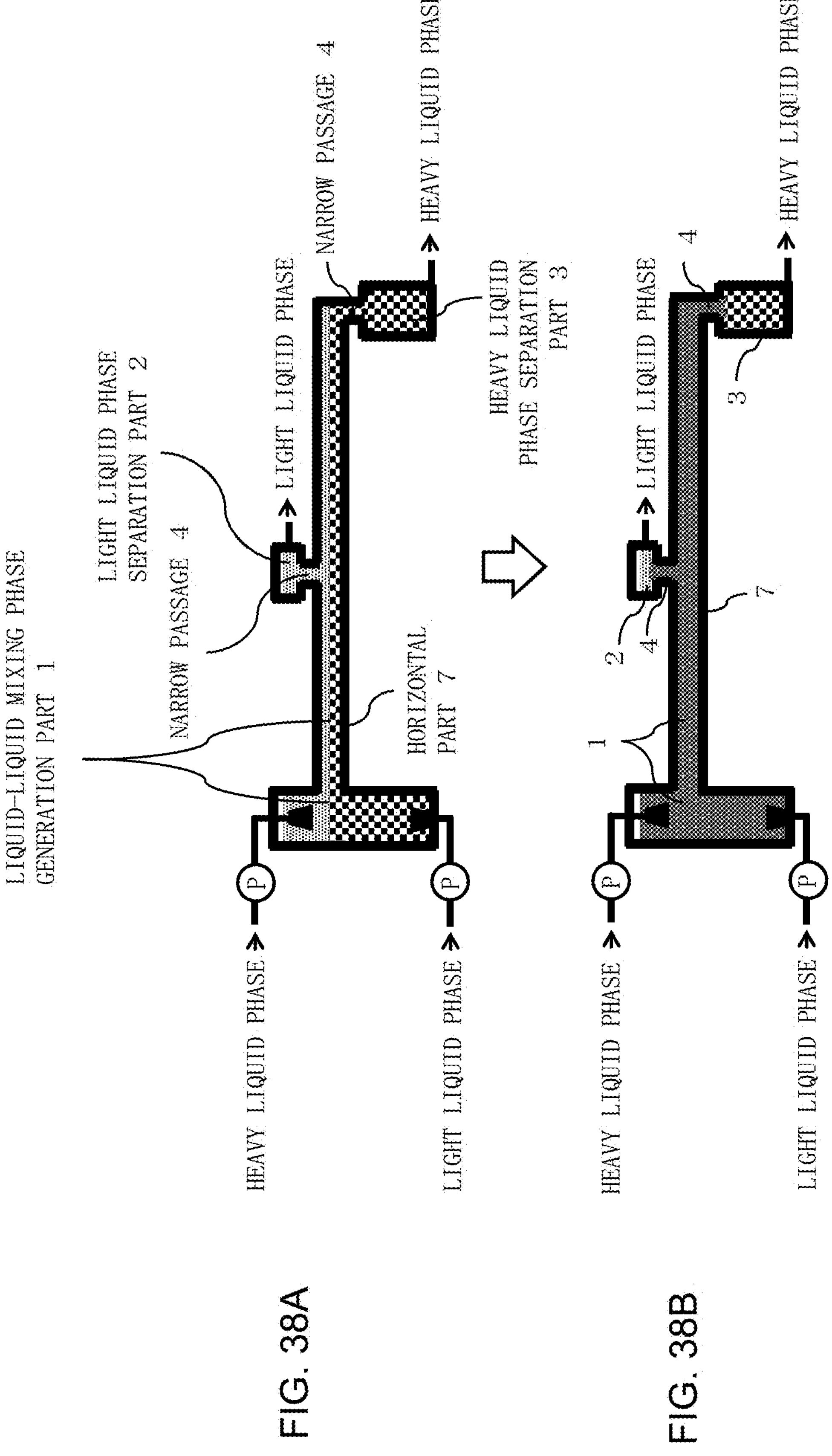
FIGS. 38A and 38B represent a schematic diagram of two liquid phase installation and liquid-liquid mixing phase generation in the mechanism shown in FIG. 13A.
Figures 38C, 38D:
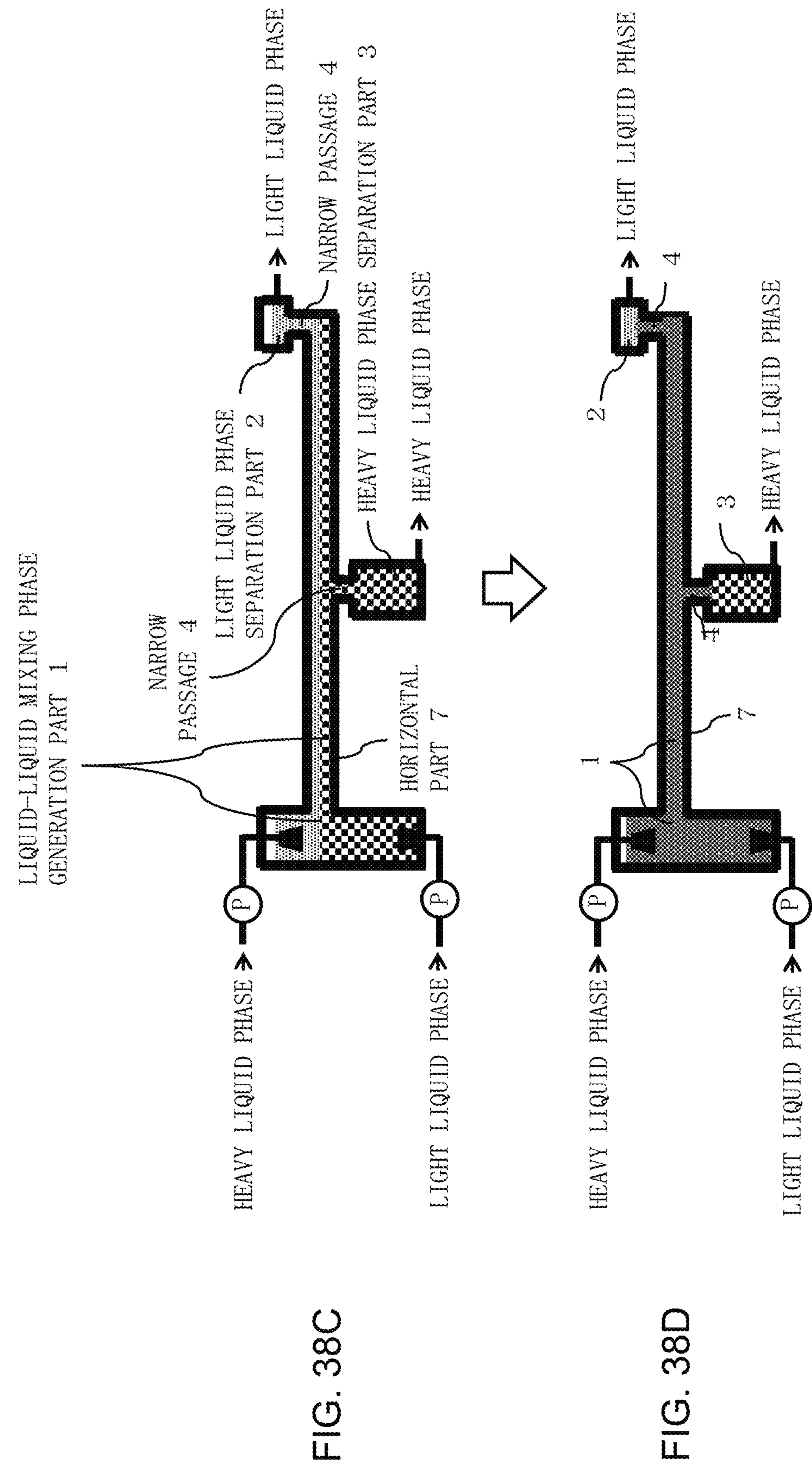
FIGS. 38C and 38D represent a schematic diagram of two liquid phase installation and liquid-liquid mixing phase generation in the mechanism shown in FIG. 13B.
Figures 38E, 38F:
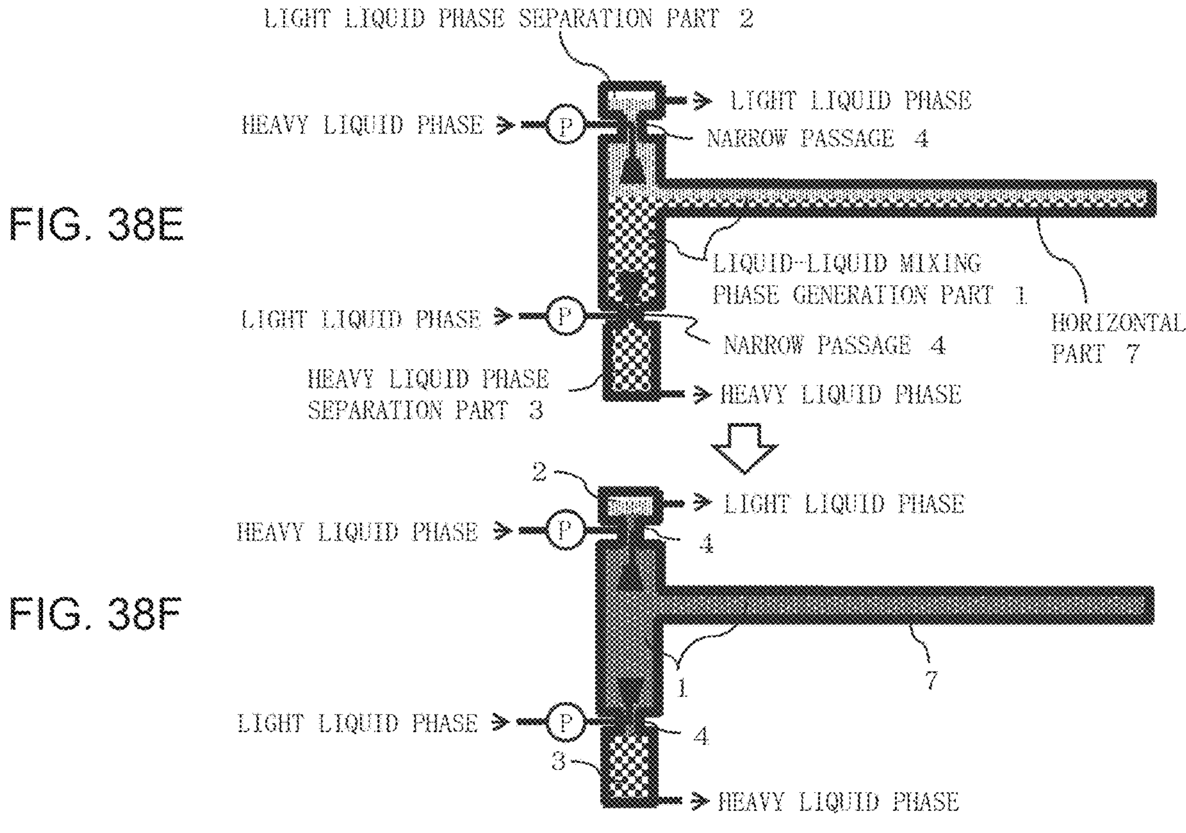
FIGS. 38E and 38F represent a schematic diagram of two liquid phase installation and liquid-liquid mixing phase generation in the mechanism shown in FIG. 13C.

FIG. 38(*a*) to FIG. 38(*f*) show the results obtained in the mechanism shown in FIG. 13(*a*) to FIG. 13(*c*), which are variations of FIG. 10. FIG. 38(*a*) and FIG. 38(*b*) show the result obtained in the mechanism in which the light liquid phase separation part and the narrow passage guiding thereto are arranged at a horizontal part, and FIG. 38(*c*) and FIG. 38(*d*) show the result obtained in the mechanism in which the heavy liquid phase separation part and the narrow passage guiding thereto are arranged at a horizontal part. FIG. 38(*e*) and FIG. 38(*f*) exemplify the result obtained in the mechanism in which the light liquid phase separation part and the narrow passage guiding thereto are arranged above the nozzle installation part, and the heavy liquid phase separation part and the narrow passage guiding thereto are arranged below the nozzle installation part. In either case, as in FIG. 35, the liquid-liquid mixing phase disappeared when the flow of the liquid-liquid mixing phase passed through a narrow passage and reached the phase separation part installed above and below it.

Figures 39C, 39D:
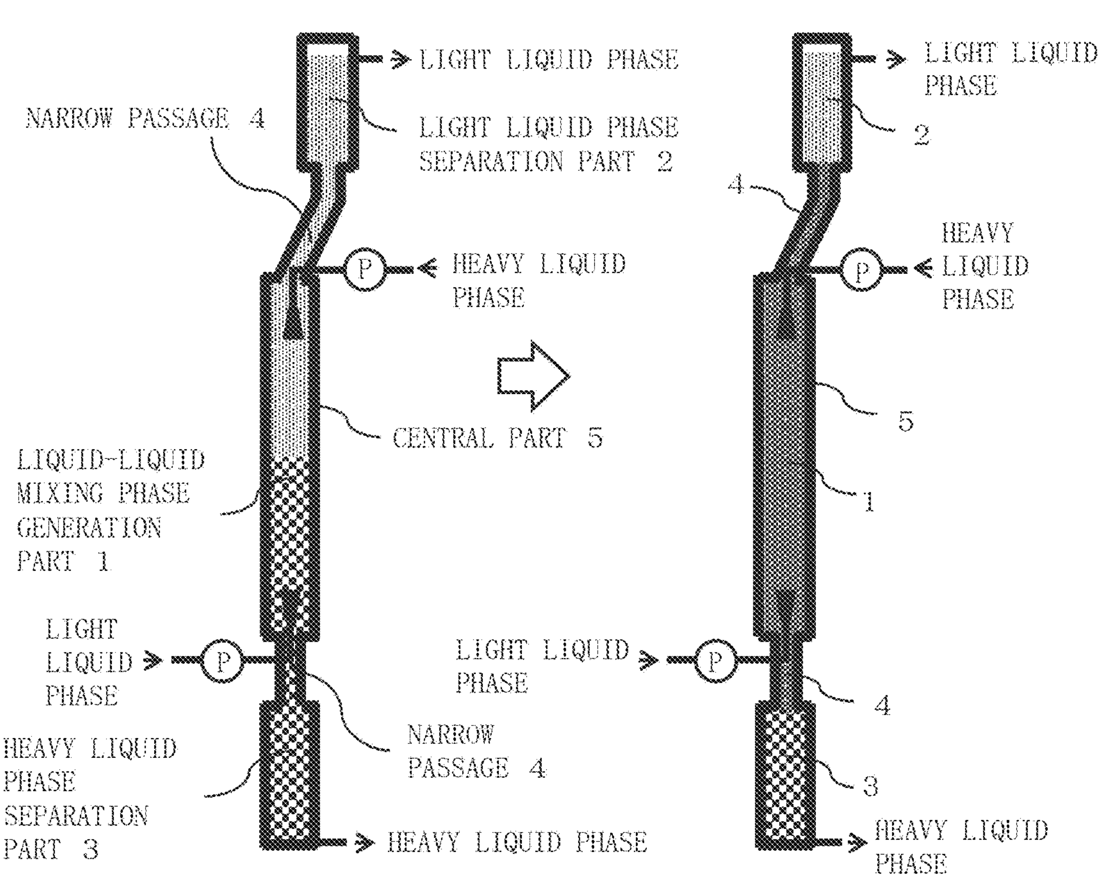
FIGS. 39C and 39D represent a schematic diagram of two liquid phase installation and liquid-liquid mixing phase generation in the mechanism shown in FIG. 14B.
Figures 40A, 40B:
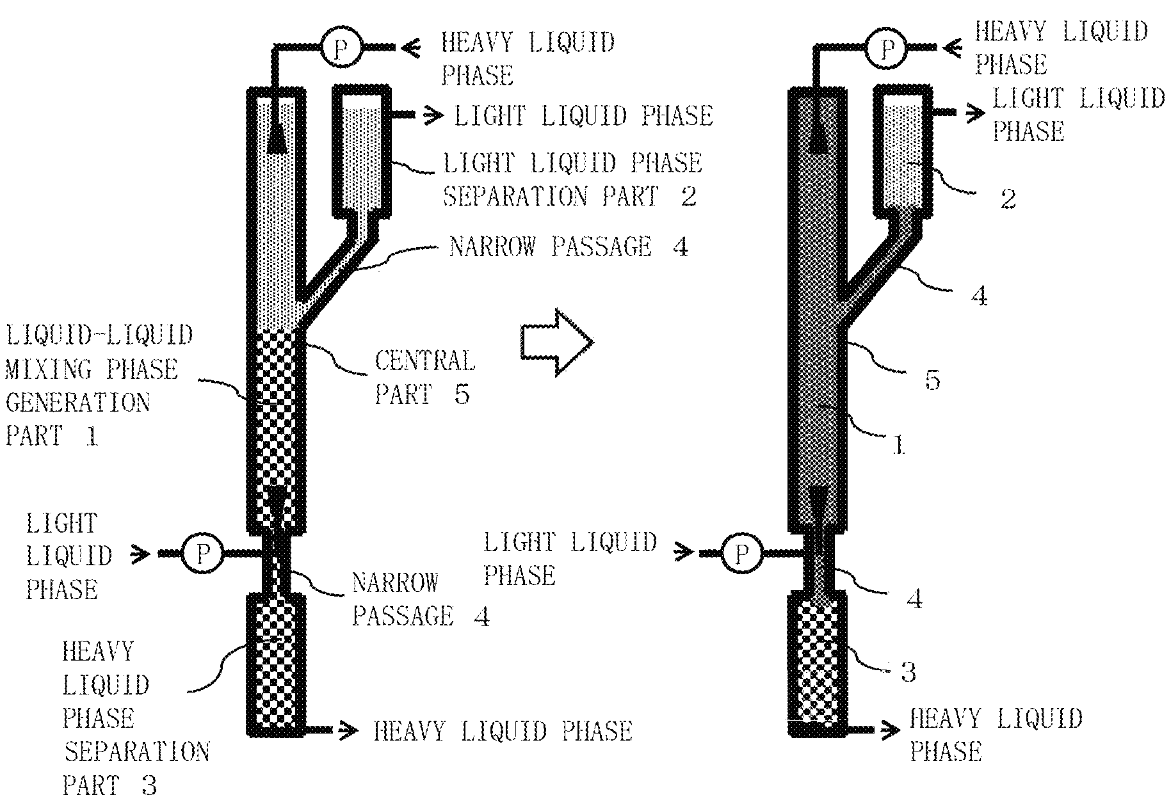
FIGS. 40A and 40B represent a schematic diagram of two liquid phase installation and liquid-liquid mixing phase generation in the mechanism shown in FIG. 15.

FIG. 39(*a*) to FIG. 40 show variations of FIG. 3. These figures show examples in which the upper narrow passage is provided in an oblique direction (the direction in which any angle is made from 90 degrees or 180 degrees), that is, these figures show the results obtained in the mechanisms shown in FIG. 14(*a*), FIG. 14(*b*), and FIG. 15. In any case, as in FIG. 29, even when the narrow passage is arranged in an oblique direction, the liquid-liquid mixing phase disappeared when the flow of the liquid-liquid mixing phase passed through the narrow passage and reached the phase separation part installed above and below it.

Figures 41A, 41B:
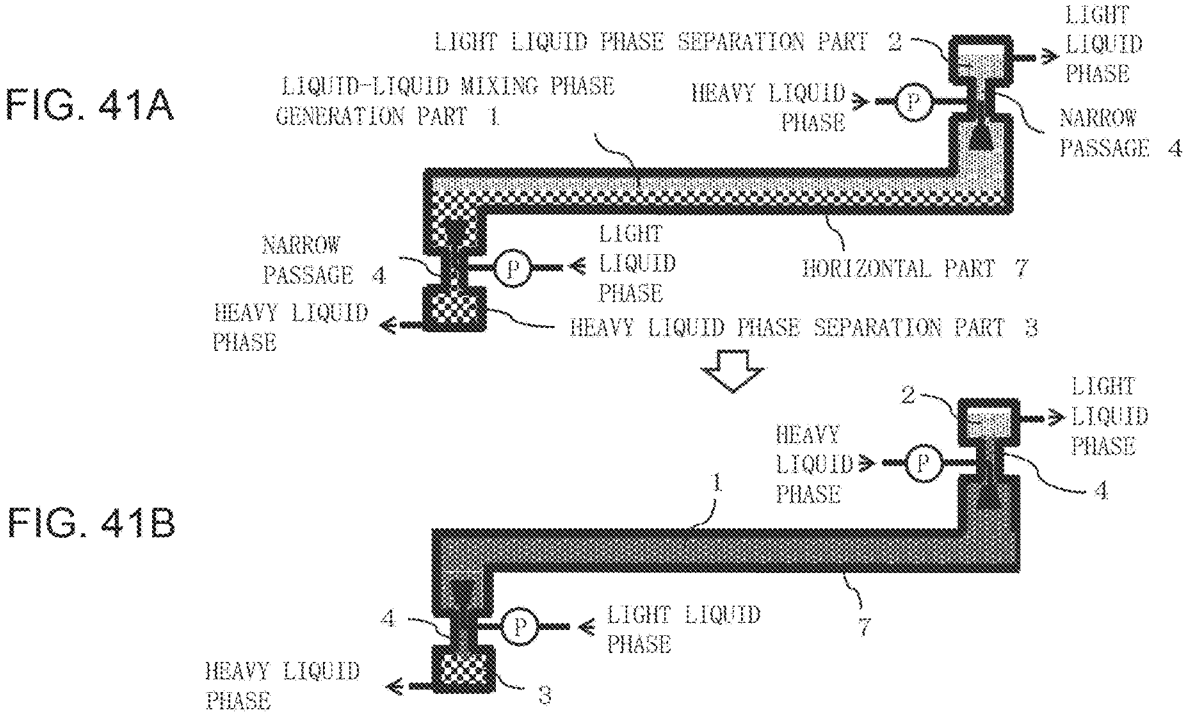
FIGS. 41A and 41B represent a schematic diagram of two liquid phase installation and liquid-liquid mixing phase generation in the mechanism shown in FIG. 16.
Figures 42A, 42B:
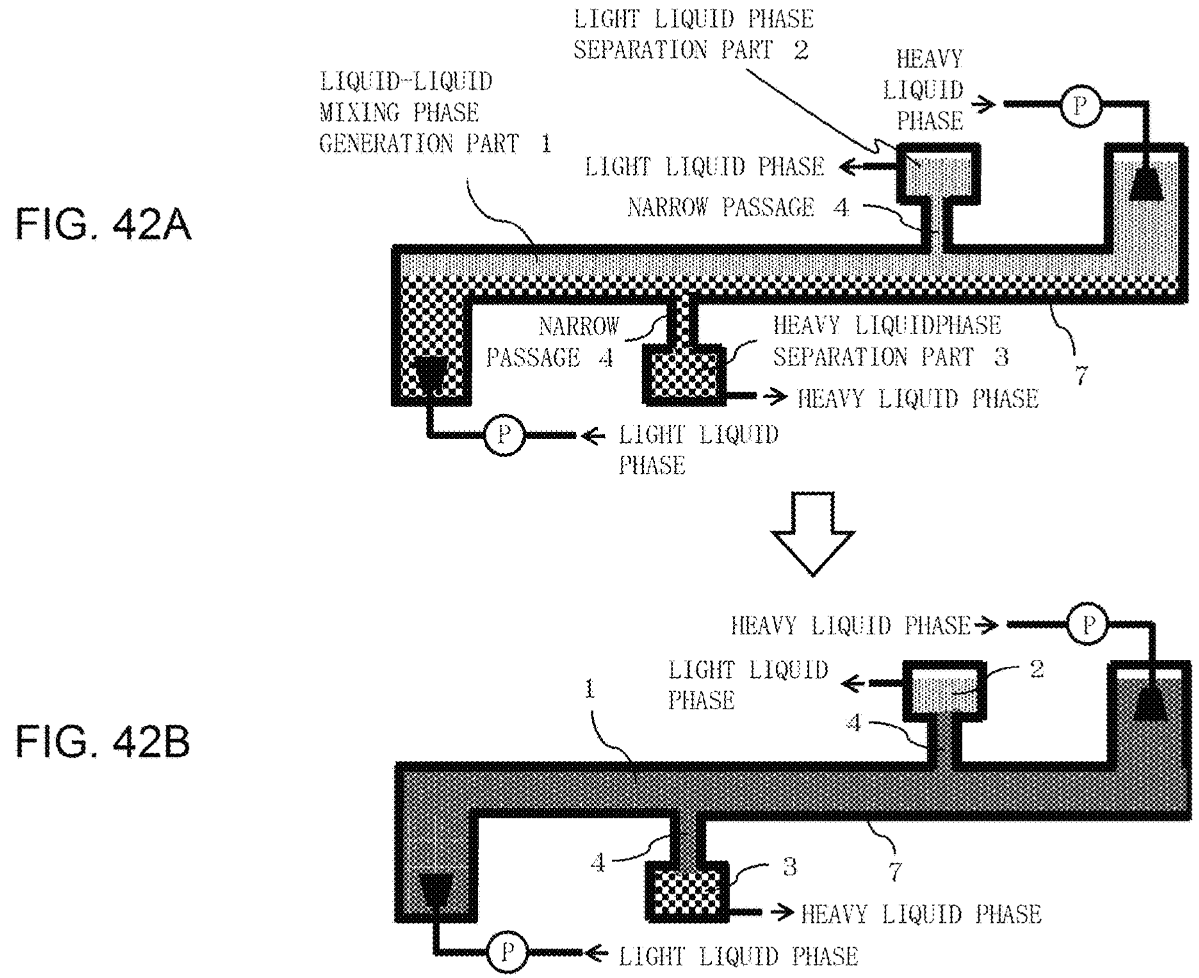
FIGS. 42A and 42B represent a schematic diagram of two liquid phase installation and liquid-liquid mixing phase generation in the mechanism shown in FIG. 17.
Figures 43A, 43B:
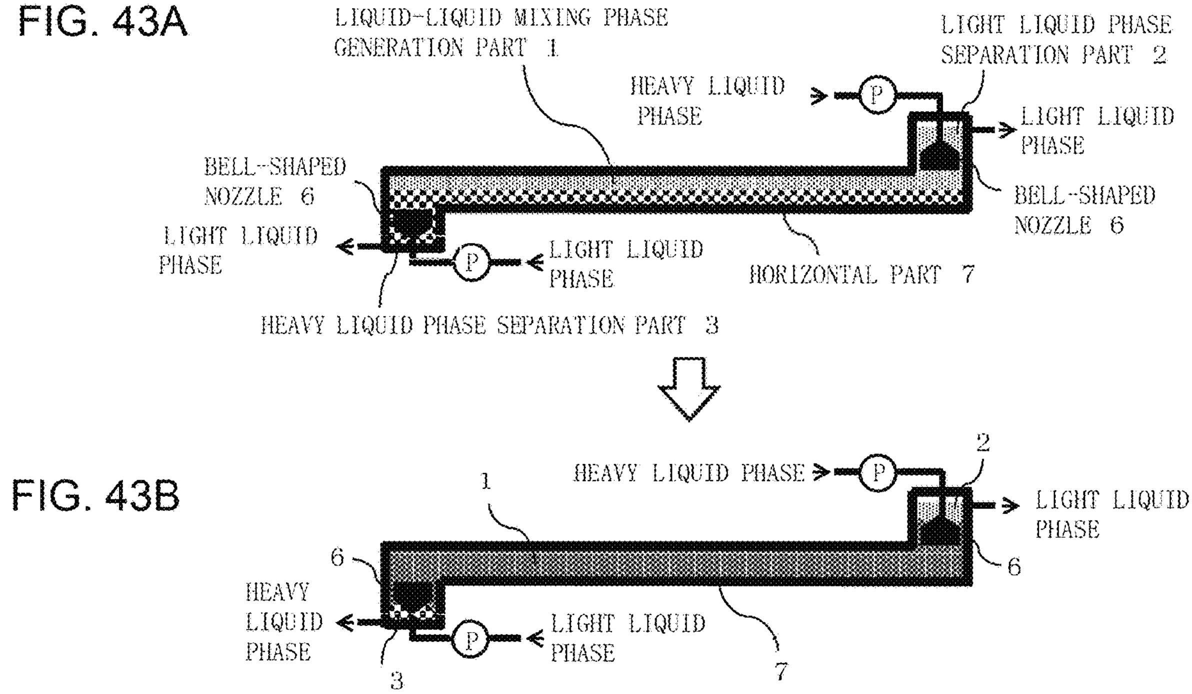
FIGS. 43A and 43B represent a schematic diagram of two liquid phase installation and liquid-liquid mixing phase generation in the mechanism shown in FIG. 18.

FIG. 41(*a*) to FIG. 43(*b*) show variations of FIG. 3. These figures show the results obtained in the mechanisms in which the liquid-liquid mixing phases is generated in the horizontal direction while facing the flow of both phases to each other, that is, these figures show the results obtained in the mechanisms shown in FIG. 16 to FIG. 18. For such a mechanism, as with the other mechanisms described above, the liquid-liquid mixing phase disappeared when the flow of the liquid-liquid mixing phase passed through the narrow passage and reached the phase separation part installed above and below it.

Figure 19A:
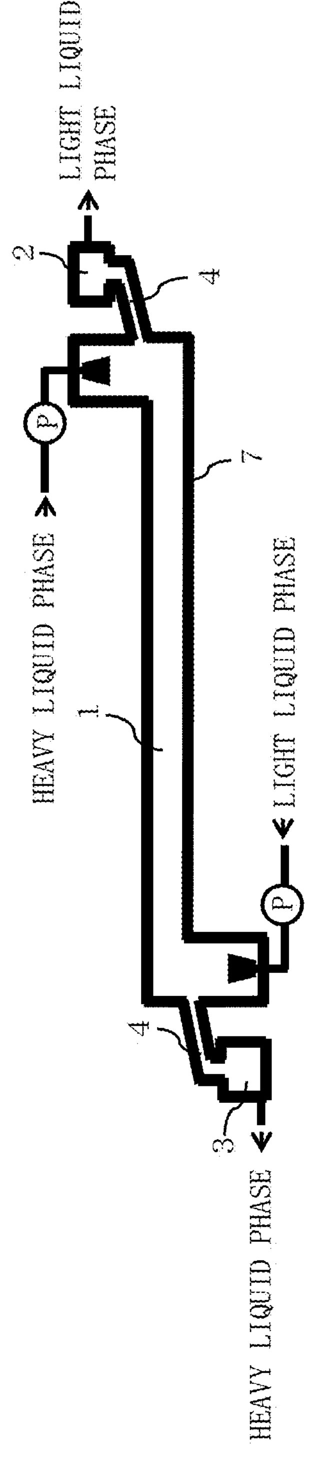
FIG. 19A shows a variation of FIG. 16 (the both phase separation parts are arranged diagonally from the up and down of the horizontal part to the outside)
Figure 19B:
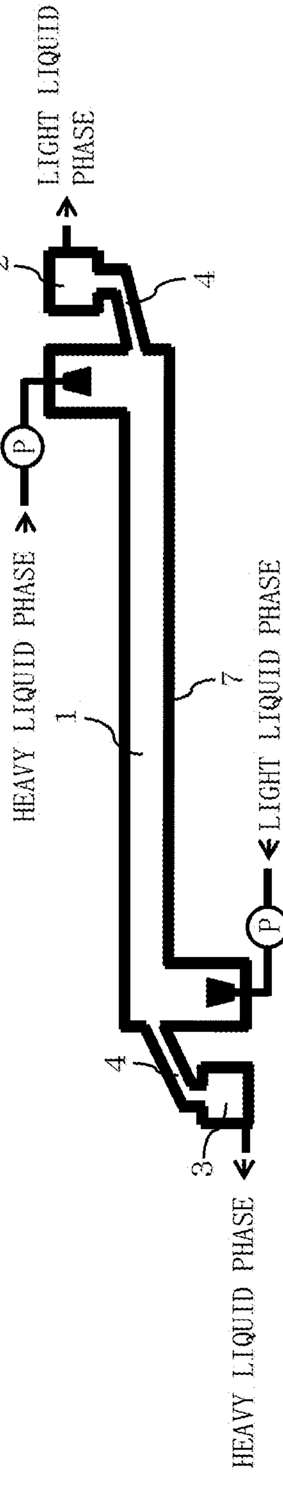
FIG. 19B shows a variation of FIG. 16 (the both phase separations are arranged diagonally outward from the side of the horizontal part)
Figures 44A, 44B:
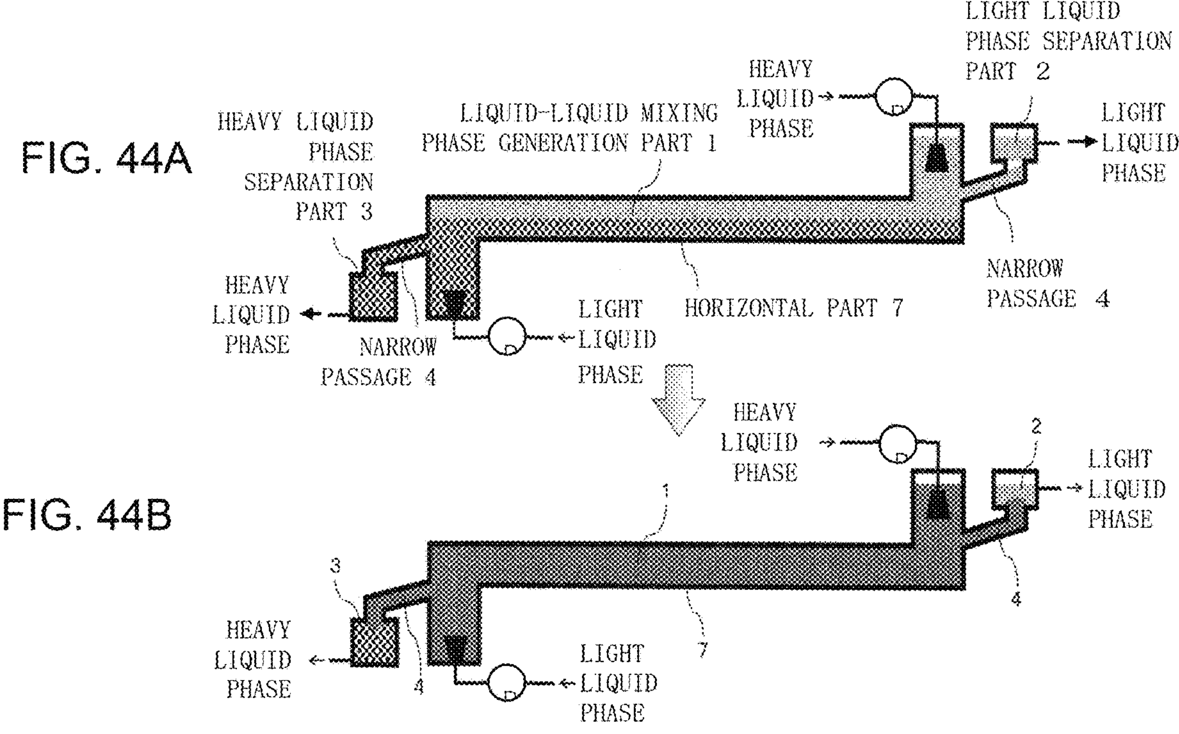
FIGS. 44A and 44B represent a schematic diagram of two liquid phase installation and liquid-liquid mixing phase generation in the mechanism shown in FIG. 19A.
Figures 44C, 44D:
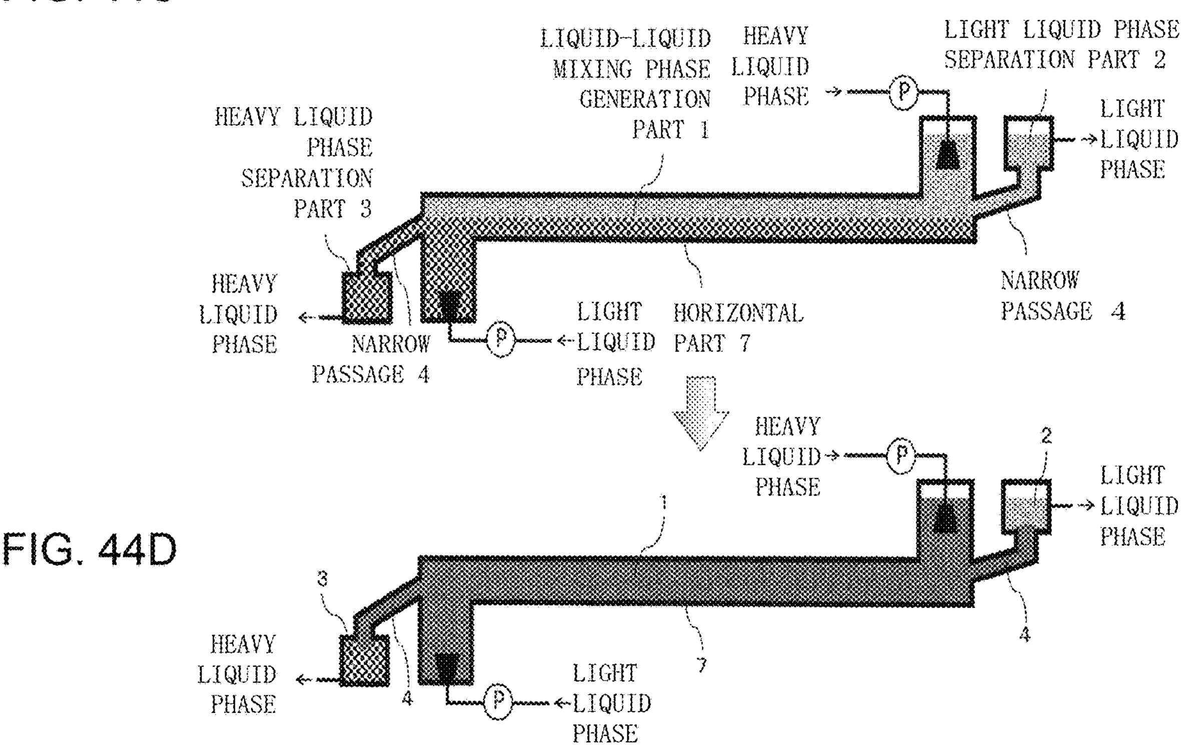
FIGS. 44C and 44D represent a schematic diagram of two liquid phase installation and liquid-liquid mixing phase generation in the mechanism shown in FIG. 19B.

FIG. 44(*a*) and FIG. 44(*b*) show the results obtained in the mechanism in which the liquid-liquid mixing phase is guided in an oblique direction and disappears at the phase separation part installed ahead as shown in FIG. 19(*a*) and FIG. 19(*b*). In such a mechanism, as with other mechanisms in which a narrow passage is installed diagonally, the liquid-liquid mixing phase flows through the oblique narrow passage, and disappears when reached the phase separation part installed above and below the narrow passage.

Figure 20:
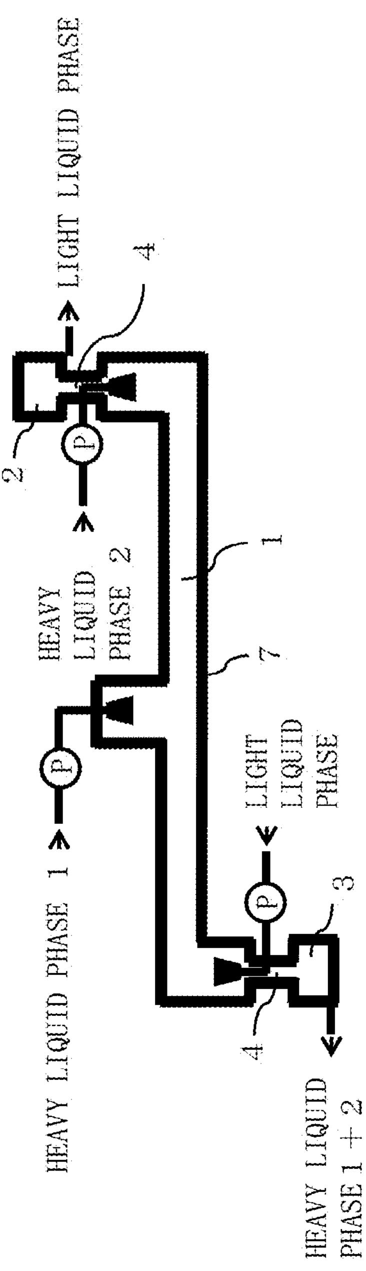
FIG. 20 shows a variation of FIG. 16 (two types of heavy liquid phases can be introduced from different parts)
Figures 45A, 45B:
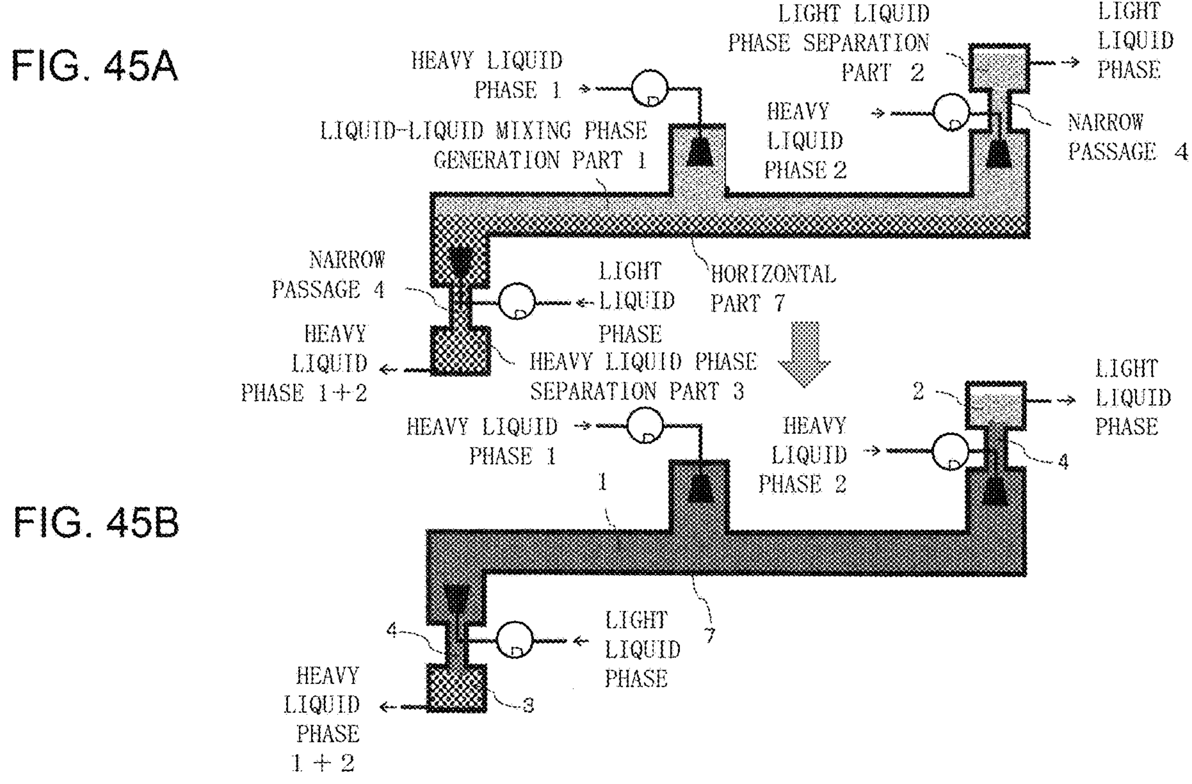
FIGS. 45A and 45B represent a schematic diagram of two liquid phase installation and liquid-liquid mixing phase generation in the mechanism shown in FIG. 20.

FIG. 45(*a*) and FIG. 45(*b*) show the result obtained in the mechanism in which the liquid-liquid mixing phase is generated by horizontally introducing two types of heavy liquid phases from different parts and bringing it into the countercurrent contact with the light liquid phase as shown in FIG. 20. Regardless of the number of the introduction parts of the heavy liquid phase, as with the other mechanisms described above, the liquid-liquid mixing phase has disappeared when it passes through the narrow passage and reaches the phase separation part installed above and below it.

FIG. 46(*a*) and FIG. 46(*b*) show the result obtained in the mechanism in which the liquid-liquid mixing phase is generated by bringing the heavy liquid phase and the light liquid phase into countercurrent contact in a spiral shape in which the lines are in close contact with each other as shown in FIG. 22. As described above, even when the central part has a spiral shape, the liquid-liquid mixing phase disappeared when the flow of the liquid-liquid mixing phase passes through the narrow passage and reaches the phase separation parts located above and below the narrow passage. Where, in FIG. 46, the above narrow passage points the passage between the bell-shaped nozzle and the vessel wall.

Figures 47E, 47F:
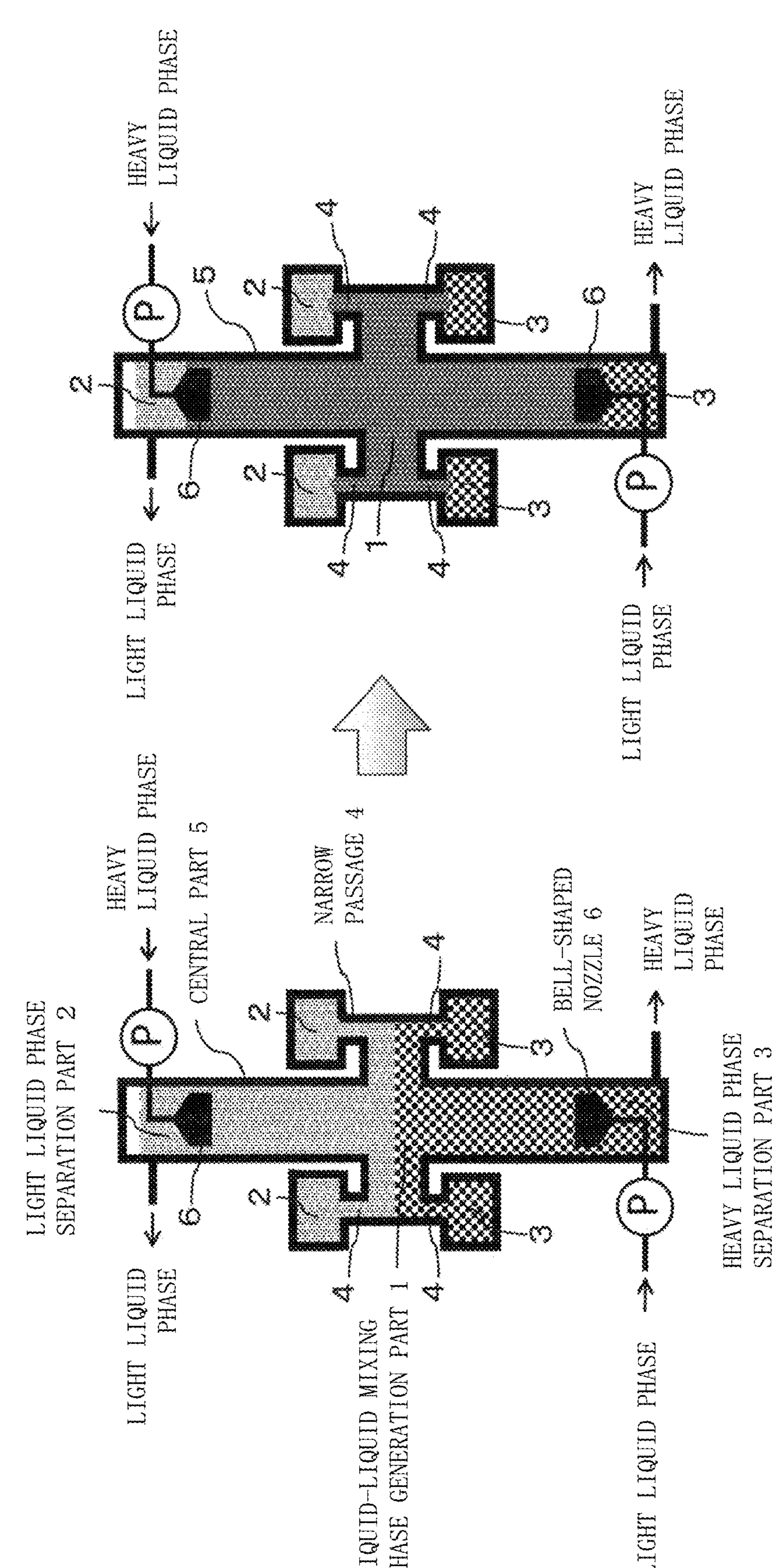
FIGS. 47E and 47F represent a schematic diagram of two liquid phase installation and liquid-liquid mixing phase generation in the mechanism shown in FIG. 23C.

FIG. 47(*a*) to FIG. 47(*f*) show the results obtained in the mechanisms shown in FIG. 23(*a*) to FIG. 23(*c*) as examples of container structures having a number of phase separation parts. Even if the number of phase separation parts increases, the phenomenon that the liquid-liquid mixing phase disappears when the flow of the liquid-liquid mixing phase passes through a narrow passage and reaches the phase separation parts located above and below it is common, and it was also found that the height at which the phase separation part is located does not need to be the same.

Embodiment 7

Figure 48:
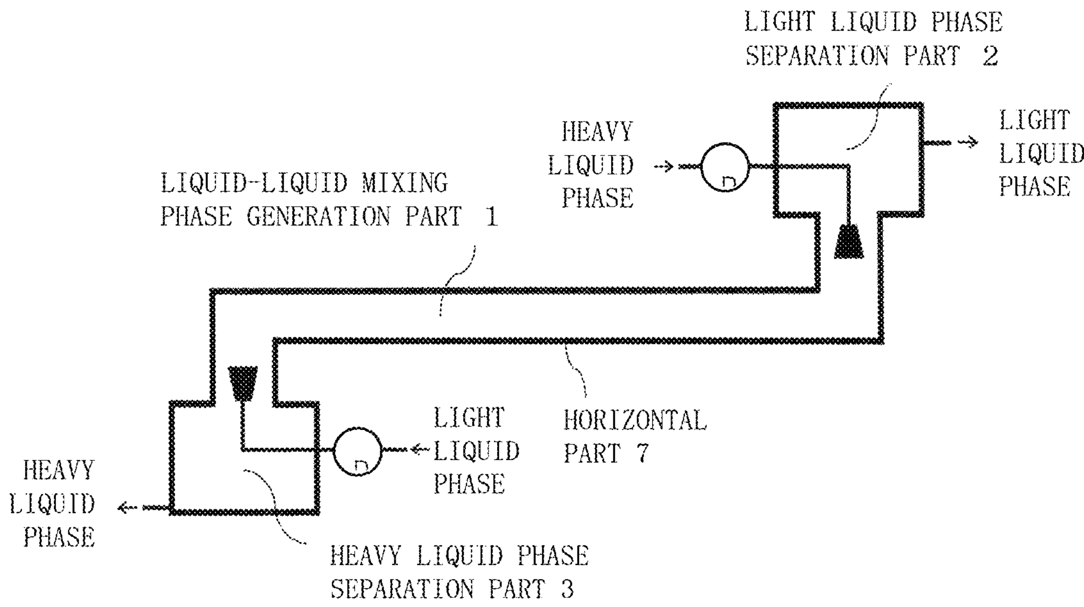
FIG. 48 shows a mechanism similar to FIG. 16 that does not have a narrow passage.
Figures 49A, 49B:
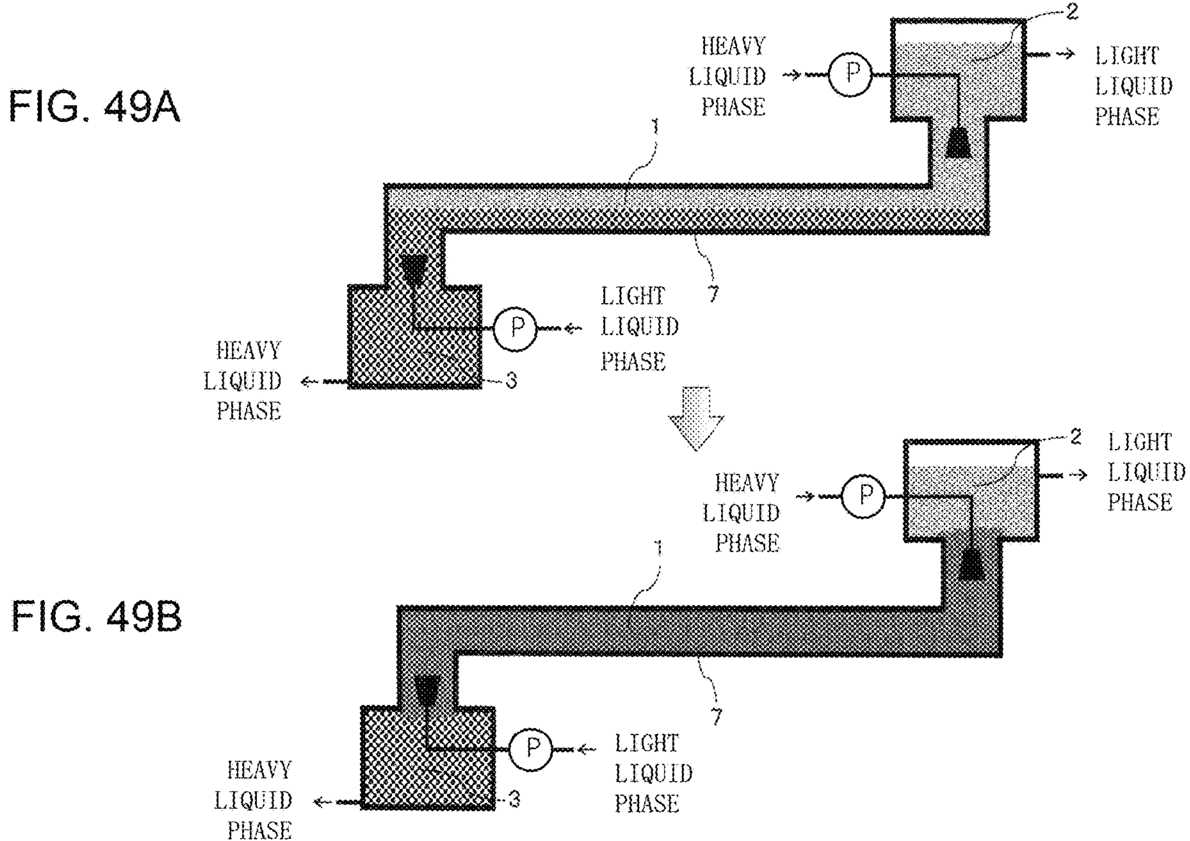
FIGS. 49A and 49B represent a schematic diagram of two liquid phase installation and liquid-liquid mixing phase generation in the mechanism shown in FIG. 48.

Control of Generation and Extinguishment of Liquid-Liquid Multiphase With a Mechanism That Does Not Have a Narrow Passage Even with a mechanism that does not have the narrow passage as shown in FIG. 48, it was possible to develop the liquid-liquid mixing phase in the horizontal direction while facing the flow directions of the heavy liquid phase and the light liquid phase to each other. The region where the liquid-liquid mixing phase generates and the region where it disappears are shown in FIG. 49. However, it was found that it was inferior in sensitivity and precision with respect to the control of the generation and extinguishment of the liquid-liquid mixing phase as compared with the mechanism having a narrow passage (for example, FIG. 16). Further, as can be seen from FIG. 48, it was inevitable that the volume of the field (phase separation part) where the liquid-liquid mixing phase was phase-separated and disappeared became larger than that in FIG.16.

The mechanism without a narrow passage can be applied to all the mechanisms shown in FIG. 3 to FIG. 23(*c*), but in each case, it was the same as described above in comparison with the mechanism having a narrow passage.

INDUSTRIAL APPLICABILITY

By using a method of forming a liquid-liquid mixing phase flow group, and a method of controlling the formation and extinguishment of the liquid-liquid mixing phase flow group, and its module, according to the present invention, a new microfluidic channel (called a soft microfluidic channel) that does not cause narrowing and blocking of the channel due to solid contamination or deposition, and outflow of the channel contents due to the generation of the gas, can be applied to various chemical reactions. Like conventional microfluidic channels, soft microfluidic channels can be applied to a wide variety of chemical reactions, such as liquid-liquid extraction reactions, catalytic reactions, complex formation reactions, adsorption reactions, ion exchange reactions, organic synthesis reactions, and self-organizing reactions, and can be used as micro reactors (microfluidic devices). In conventional micro reactors, the problem caused by mixing and deposition of solids and generation of gases is fatal when the micro reactor is used for mass processing, large-scale and mass production. That is, if the blocking or the narrowing of the channel occurs in any of the large systems having a large number of flow routes, the entire system may not function. If these problems are solved with the advent of soft micro flow channels, it can be expected that the application of micro reactor technology to large-scale systems will advance dramatically.

Unlike microfluidic channel (called hard microfluidic channel) engraved on conventional solids (resins, metals, etc.), soft microfluidic channel that occur in liquids are fluid and flexible, so that the aforementioned problems inevitably of hard microfluidic channel can be solved. The problem of the conventional hard microfluidic channel becomes especially remarkable in the numbering-up in which the number of reactors is increased and arranged in parallel in case that the micro reactor is larger. The soft microfluidic channel is a channel having a micrometer-sized diameter formed between droplets in a liquid-liquid mixing phase caused by accumulation of droplets, and forms a group of dense branch flow routes and develops in three dimensions in all directions. In the numbering-up of micro reactors using a hard microfluidic channel, since the liquid sending is performed simultaneously to a large number of reactors in which the channels are branched and arranged in parallel, the flow rate change and the clogging due to solid components at the junction become problems, but such a problem does not occur in the soft microfluidic channel that occurs naturally in a three-dimensional network shape.

The channel length and channel diameter of the soft microfluidic channel depend on the droplet size and the population of the droplets. If droplets having different particle sizes are systematically generated and accumulated to form a channel, a more complex channel design is also possible. However, in the case of the soft microfluidic channel, it is a design for a mass of microfluidic channel, so to speak, a dense branch channel group, instead of designing for an individual channel like a hard microfluidic channel.

The mass of the soft microfluidic channel (called a soft microfluidic channel group) can be easily spontaneously generated by an extremely simple mechanism. In order to engrave the soft microfluidic channel, precise micro-fabrication techniques such as conventional hard microfluidic channel are unnecessary, and a compact three-dimensional network-like microfluidic channel group can be formed easily at an overwhelmingly low cost. Moreover, this three-dimensional network type microfluidic channel group is easily extinguished naturally using the change of the container shape. That is, it is possible to freely design where soft microfluidic channel groups occur and where they disappear. At the same time, this means virtually maintenance-free. This is because it is not necessary to clean the fine channel, and solid components and the like can be removed very easily by eliminating the channel itself.

The module of the microfluidic device consisting of the soft microfluidic group has the following features. Low initial cost due to an extremely simple mechanism that does not require a high-performance ultra-low pulsating pump and does not require the micro-fabrication, low running costs that do not require a system to monitor the blocking and narrowing of the channel and the outflow of the channel contents, and low maintenance costs due to virtually maintenance-free in addition to the simplicity of the mechanism. That is, the soft microfluidic channel realizes an overwhelmingly low cost for all initials, running, and maintenance compared to the conventional hard microfluidic channel.

In addition, the liquid base material (droplets) into which the soft microfluidic channel is engraved also functions as the field for chemical reactions. For example, it is efficient if all the reaction product can be recovered at once by the phase separation after collecting the reaction product into this base material and shifting it to another reactor for recovering the reaction product. Further, if necessary, there is a way of not using the base material as the reaction field. Thus, the industrial applicability of the soft microfluidic channel is further increased by selecting the type of liquid that becomes the base material (droplet) on a case-by-case.

EXPLANATION OF SIGN

1: Liquid-liquid mixing phase generation part
2: Light liquid phase separation part
3: Heavy liquid phase separation part
4: Narrow passage
5: Central part
6: Bell-shaped nozzle
7: Horizontal part

What is claimed is:

1. A method of controlling formation and extinguishment of a liquid-liquid mixing phase channel group in a light liquid phase and a heavy liquid phase, by using a container which comprises a cylindrical central part where two immiscible light and heavy liquid phases oppose each other at an interface, and a liquid-liquid mixing phase of the two immiscible light and heavy liquid phases is generated by droplet ejection and is developed through a cylindrical horizontal part; a cylindrical narrow passage arranged vertically in a destination of the liquid-liquid mixing phase developed through the cylindrical horizontal part; and a cylindrical cross-sectional area expansion part arranged beyond the cylindrical narrow passage, the method comprising:

ejecting the light liquid phase or the heavy liquid phase as droplets into the heavy liquid phase or the light liquid phase, respectively;

causing a jet of the droplets to collide with the interface, forming droplets in the light liquid phase or the heavy liquid phase accompanied with the heavy liquid phase or the light liquid phase around the droplets of the light liquid phase or the heavy liquid phase, respectively, in the light liquid phase or the heavy liquid phase, and growing a layer of droplets above and below the interface starting from the interface;

forming a continuous liquid-liquid mixing phase channel in which gaps between the droplets of the light liquid phase or the heavy liquid phase layered by growth are filled with the heavy liquid phase or the light liquid phase, respectively;

guiding the continuous liquid-liquid mixing phase channel through the cylindrical horizontal part; and then extinguishing the liquid-liquid mixing phase channel by guiding the horizontally guided liquid-liquid mixing channel to the cylindrical narrow passage and then to the cylindrical cross-sectional area expansion part.

2. The method of controlling the formation and extinguishment of the liquid-liquid mixing phase channel group according to claim 1, wherein the droplet ejection of the droplets is carried out by using nozzles with small tubes or pores.

3. The method of controlling the formation and extinguishment of the liquid-liquid mixing phase channel group according to claim 1, wherein the cylindrical narrow passage is provided vertically in up and down directions at a destination of the liquid-liquid mixing phase developed through the cylindrical horizontal part.

4. The method of controlling the formation and extinguishment of the liquid-liquid mixing phase channel group according to claim 3, wherein the droplet ejection of the droplets is carried out by using nozzles with small tubes or pores.

* * * * *